United States Patent
Jung et al.

(10) Patent No.: US 10,972,854 B2
(45) Date of Patent: Apr. 6, 2021

(54) METHOD FOR TRANSMITTING AUDIO SIGNAL AND OUTPUTTING RECEIVED AUDIO SIGNAL IN MULTIMEDIA COMMUNICATION BETWEEN TERMINAL DEVICES, AND TERMINAL DEVICE FOR PERFORMING SAME

(71) Applicant: SAMSUNG ELECTRONICS CO., LTD., Suwon-si (KR)

(72) Inventors: Kyung-hun Jung, Seoul (KR); Byeong-hoon Kwak, Uiwang-si (KR); Ho-sang Sung, Seoul (KR); Eun-mi Oh, Seoul (KR); Jong-hoon Jeong, Hwaseong-si (KR); Ki-hyun Choo, Seoul (KR); Betlehem Terence, Eden Prairie, MN (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/343,606

(22) PCT Filed: Mar. 7, 2017

(86) PCT No.: PCT/KR2017/002420
§ 371 (c)(1),
(2) Date: Apr. 19, 2019

(87) PCT Pub. No.: WO2018/074677
PCT Pub. Date: Apr. 26, 2018

(65) Prior Publication Data
US 2019/0335287 A1    Oct. 31, 2019

(30) Foreign Application Priority Data
Oct. 21, 2016 (KR) .................. 10-2016-0137701

(51) Int. Cl.
*H04S 7/00* (2006.01)
*G06F 3/16* (2006.01)
(Continued)

(52) U.S. Cl.
CPC .............. *H04S 7/303* (2013.01); *G06F 3/165* (2013.01); *H04N 7/142* (2013.01); *H04R 1/406* (2013.01);
(Continued)

(58) Field of Classification Search
USPC ........................................... 348/14.01–14.09
See application file for complete search history.

(56) References Cited

U.S. PATENT DOCUMENTS

| 8,184,069 B1 | 5/2012 | Rhodes |
| 8,587,631 B2 | 11/2013 | Etter |

(Continued)

FOREIGN PATENT DOCUMENTS

| JP | 2008-193676 A | 8/2008 |
| JP | 2009-60220 A | 3/2009 |

(Continued)

OTHER PUBLICATIONS

International Search Report dated Jul. 10, 2017 by the International Searching Authority in counterpart International Patent Application No. PCT/KR2017/002420.

(Continued)

*Primary Examiner* — Maria El-Zoobi
(74) *Attorney, Agent, or Firm* — Sughrue Mion, PLLC

(57) ABSTRACT

Provided are a method and an apparatus for increasing call quality while reducing consumption of bit rates in immersive multimedia communication. A method of transmitting, by a terminal device, an audio signal to a counterpart terminal device, includes: extracting head tracking information of a user of the counterpart terminal device from a (Continued)

packet received from the counterpart terminal device; predicting a head direction of the user of the counterpart terminal device after a predetermined time period, based on the extracted head tracking information; generating audio output signals by combining audio input signals received via a plurality of microphones, based on the predicted head direction; and transmitting information about the predicted head direction and a sound frame in which the audio output signals are compressed, to the counterpart terminal device.

20 Claims, 55 Drawing Sheets

(51) Int. Cl.
| | | |
|---|---|---|
| *H04N 7/14* | (2006.01) | |
| *H04R 1/40* | (2006.01) | |
| *H04R 3/00* | (2006.01) | |
| *H04S 3/00* | (2006.01) | |

(52) U.S. Cl.
CPC ............ *H04R 3/005* (2013.01); *H04S 3/008* (2013.01); *H04S 2400/01* (2013.01); *H04S 2400/13* (2013.01); *H04S 2400/15* (2013.01); *H04S 2420/01* (2013.01); *H04S 2420/11* (2013.01)

(56) References Cited

U.S. PATENT DOCUMENTS

| | | | |
|---|---|---|---|
| 9,161,149 B2 | 10/2015 | Visser et al. | |
| 9,361,898 B2 | 6/2016 | Visser et al. | |
| 9,767,618 B2* | 9/2017 | Najaf-Zadeh | H04S 7/303 |
| 2010/0328419 A1* | 12/2010 | Etter | H04N 21/44218 |
| | | | 348/14.08 |
| 2012/0113209 A1 | 5/2012 | Ritchey et al. | |
| 2013/0117377 A1* | 5/2013 | Miller | G06F 3/017 |
| | | | 709/205 |
| 2014/0354515 A1 | 12/2014 | LaValle et al. | |
| 2015/0002542 A1 | 1/2015 | Chan et al. | |
| 2016/0036987 A1* | 2/2016 | Cartwright | H04M 3/568 |
| | | | 381/17 |
| 2016/0217760 A1* | 7/2016 | Chu | H04N 13/279 |
| 2016/0241980 A1* | 8/2016 | Najaf-Zadeh | G06F 3/038 |
| 2018/0093177 A1* | 4/2018 | Tokubo | A63F 13/211 |
| 2018/0310114 A1* | 10/2018 | Eronen | H04R 1/406 |

FOREIGN PATENT DOCUMENTS

| | | |
|---|---|---|
| JP | 2009-303021 A | 12/2009 |
| JP | 2012-213013 A | 11/2012 |
| JP | 2016-48898 A | 4/2016 |
| KR | 10-2009-0007882 A | 1/2009 |
| KR | 10-2013-0045281 A | 5/2013 |

OTHER PUBLICATIONS

Written Opinion dated Jul. 10, 2017 by the International Searching Authority in counterpart International Patent Application No. PCT/KR2017/002420.
Search Report dated Oct. 9, 2019 by the European Patent Office in counterpart European Patent Application No. 17862018.3.
Marc Aubreville, Dipl.-Ing et al., "Measuring Directionality of Modern Hearing Aids", Canadian Audiologist, vol. 2, Issue 3, 2015, http://www.canadianaudiologist.ca/measuring-directionality-of-modern-hearing-aids. (8 pages total).
D. Singer et al., "A General Mechanism for RTP Header Extensions", https://tools.ietf.org/rfc/rfc5285.txt, Jul. 2008. (14 pages total).
3GPP TS 23.203 V16.1.0 (Jun. 2019), "3rd Generation Partnership Project;Technical Specification Group Services and System Aspects;Policy and charging control architecture(Release 16)", Jun. 2019. (263 pages total).
3GPP TR 26.918 V16.0.0 (Dec. 2018),"3rd Generation Partnership Project;Technical Specification Group Services and System Aspects;Virtual Reality (VR) media services over 3GPP(Release 16)", Dec. 2018. (129 pages total).
3GPP TR 26.950 V15.0.0 (Jun. 2018), "3rd Generation Partnership Project;Technical Specification Group Services and System Aspects;Study on surround sound codec extension for Packet Switched Streaming (PSS) and Multimedia Broadcast/Multicast Service (MBMS)(Release 15)", Jun. 2018. (25 pages total).
Communication dated Sep. 29, 2020 issued by the Korean Intellectual Property Office in counterpart Korean Application No. 10-2016-0137701.
Communication dated Dec. 15, 2020 issued by the European Intellectual Property Office in counterpart European Application No. 17 862 018.3.

* cited by examiner

FIG. 4
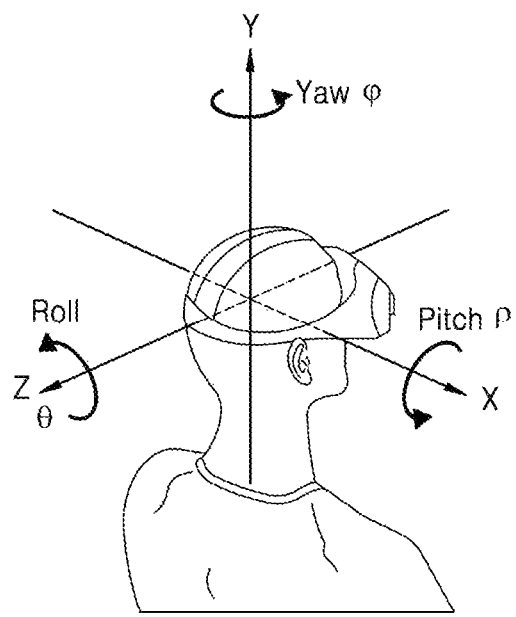
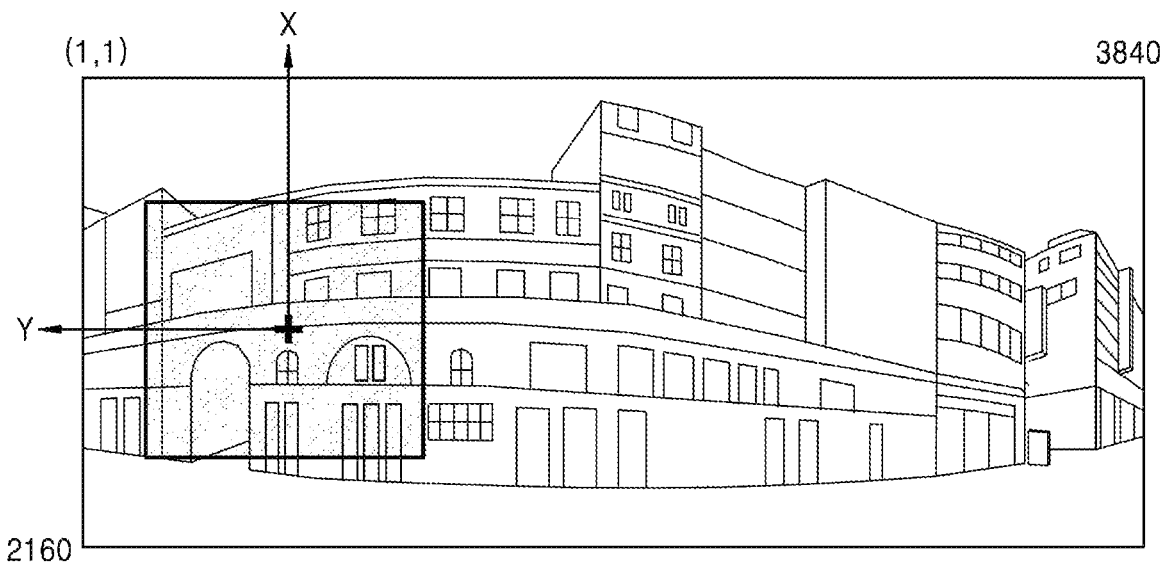

FIG. 5
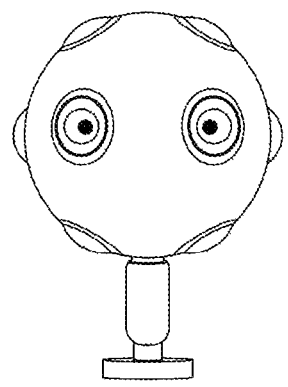
501
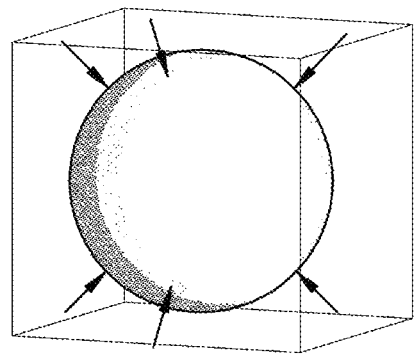
502

FIG. 6
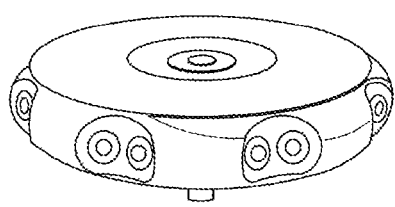
601
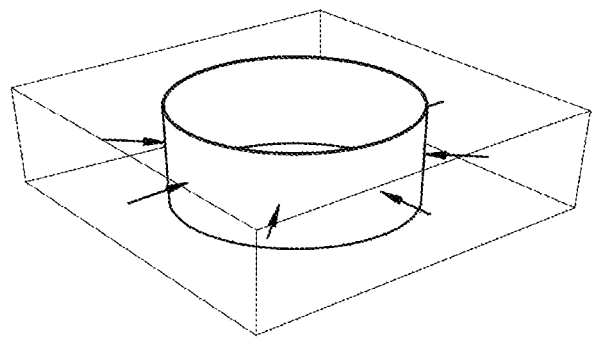
602

FIG. 7
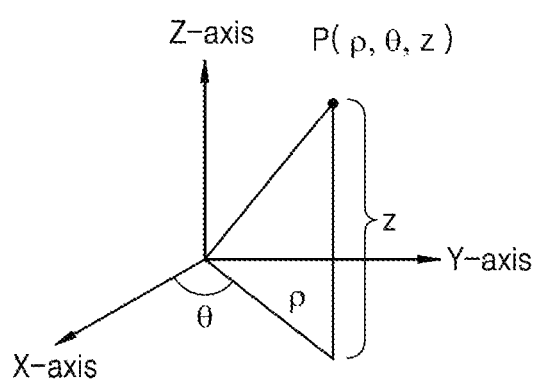
Cylindrical Coordinate
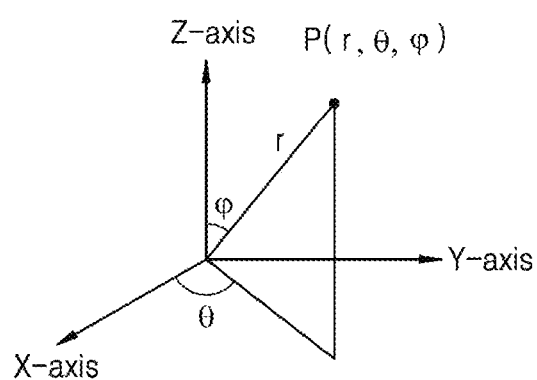
Spherical Coordinate

FIG. 10

SDP Offer (HMD + TERMINAL DEVICE A)

```
m=audio 49154 RTP/AVP 97
b=AS: 68
b=RS:0
b=RR:2000
a=rtpmap:97 EVS/16000/2
a=fmtp:97 br= 24.4 ;bw= nb-fb
a=extmap:4/sendrecv urn:head-tracking 3
a=sendrecv m=video 49152 RTP/AVP 98
b=AS: 15000
b=RS:0
b=RR:2000
a=rtpmap:98 H265/90000
a=fmtp:98 profile-id=1; level-id=153
a=imageattr:98 recv [x=3840,y=2160] [x=1920,y=1080]
a=recvonly
...
```

SDP Answer (CAMERA + TERMINAL DEVICE B)

```
m=audio 49154 RTP/AVP 97
b=AS: 68
b=RS:0
b=RR:2000
a=rtpmap:97 EVS/16000/2
a=fmtp:97 br= 24.4 ;bw= nb-fb
a=extmap:4/sendrecv urn:head-tracking yaw[8] roll[8] pitch[8]
a=sendrecv m=video 49152 RTP/AVP 98
b=AS: 10000
b=RS:0
b=RR:2000
a=rtpmap:98 H265/90000
a=fmtp:98 profile-id=1; level-id=153
a=imageattr:98 send [x=3840,y=2160]
a=sendonly
...
```

FIG. 11

SDP Offer (HMD + TERMINAL DEVICE A)

```
...
m=audio 49154 RTP/AVP 97
b=AS: 68
b=RS:0
b=RR:2000
a=rtpmap:97 EVS/16000/2
a=fmtp:97 br= 24.4 ;bw= nb-fb
a=extmap:4/sendrecv urn:head-tracking 3
a=sendrecv m=video 49152 RTP/AVP 98
b=AS: 15000
b=RS:0
b=RR:2000
a=rtpmap:98 H265/90000
a=fmtp:98 profile-id=1; level-id=153
a=imageattr:98 recv [x=3840,y=2160] [x=1920,y=1080]
a=recvonly
...
```

⇧

SDP Answer (CAMERA + TERMINAL DEVICE B)

```
...
m=audio 49154 RTP/AVP 97
b=AS: 68
b=RS:0
b=RR:2000
a=rtpmap:97 EVS/16000/2
a=fmtp:97 br= 24.4 ;bw= nb-fb
a=extmap:4/sendrecv urn:head-tracking yaw[8] pitch[8]
a=sendrecv m=video 49152 RTP/AVP 98
b=AS: 10000
b=RS:0
b=RR:2000
a=rtpmap:98 H265/90000
a=fmtp:98 profile-id=1; level-id=153
a=imageattr:98 send [x=3840,y=2160]
a=sendonly
...
```

FIG. 12

SDP Offer (HMD + TERMINAL DEVICE A)

```
m=audio 49154 RTP/AVP 97
b=AS: 68
b=RS:0
b=RR:2000
a=rtpmap:97 EVS/16000/2
a=fmtp:97 br= 24.4 ;bw= nb-fb
a=extmap:4/sendrecv urn:head-tracking 2
a=sendrecv
...
m=video 49152 RTP/AVP 98
b=AS: 15000
b=RS:0
b=RR:2000
a=rtpmap:98 H265/90000
a=fmtp:98 profile-id=1; level-id=153
a=imageattr:98 recv [x=3840,y=2160] [x=1920,y=1080]
a=recvonly
...
```

⇧

SDP Answer (CAMERA + TERMINAL DEVICE B)

```
...
m=audio 49154 RTP/AVP 97
b=AS: 68
b=RS:0
b=RR:2000
a=rtpmap:97 EVS/16000/2
a=fmtp:97 br= 24.4 ;bw= nb-fb
a=extmap:4/sendrecv urn:head-tracking x[8] y[8]
a=sendrecv
...
m=video 49152 RTP/AVP 98
b=AS: 10000
b=RS:0
b=RR:2000
a=rtpmap:98 H265/90000
a=fmtp:98 profile-id=1; level-id=153
a=imageattr:98 send[x=3840,y=2160]
a=sendonly
...
```

FIG. 13

SDP Offer (HMD + TERMINAL DEVICE A)

```
...
m=audio 49154 RTP/AVP 97
b=AS: 68
b=RS:0
b=RR:2000
a=rtpmap:97 EVS/16000/2
a=fmtp:97 br= 24.4 ;bw= nb-fb
a=extmap:4/sendrecv urn:head-tracking 2
a=sendrecv m=video 49152 RTP/AVP 98
b=AS: 15000
b=RS:0
b=RR:2000
a=rtpmap:98 H265/90000
a=fmtp:98 profile-id=1; level-id=153
a=imageattr:98 recv [x=3840,y=2160] [x=1920,y=1080]
a=recvonly
...
```

⇩

SDP Answer (CAMERA + TERMINAL DEVICE B)

```
...
m=audio 49154 RTP/AVP 97
b=AS: 68
b=RS:0
b=RR:2000
a=rtpmap:97 EVS/16000/2
a=fmtp:97 br= 24.4 ;bw= nb-fb
a=extmap:4/sendrecv urn:head-tracking x[12] y[4]
a=sendrecv m=video 49152 RTP/AVP 98
b=AS: 10000
b=RS:0
b=RR:2000
a=rtpmap:98 H265/90000
a=fmtp:98 profile-id=1; level-id=153
a=imageattr:98 send [x=3840,y=2160]
a=sendonly
...
```

FIG. 29
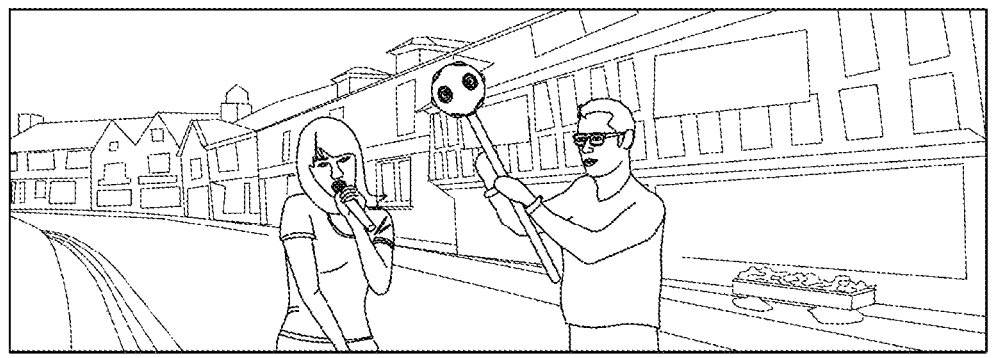
2901
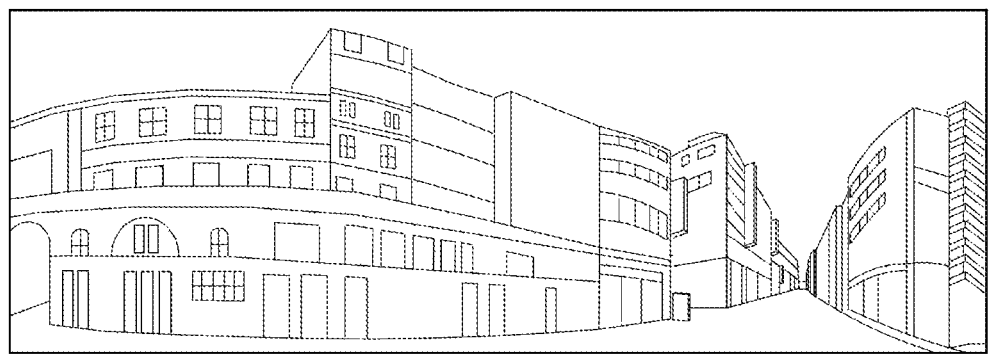
2902

FIG. 31
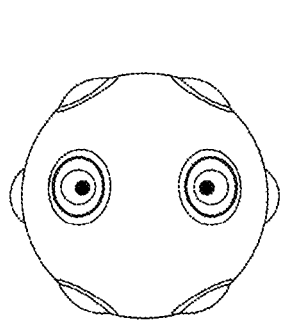 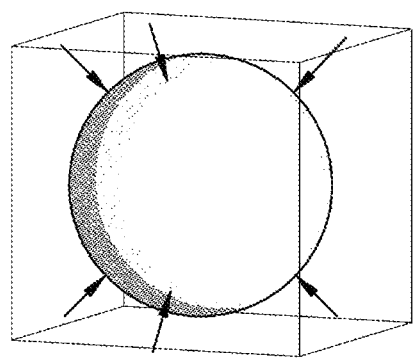 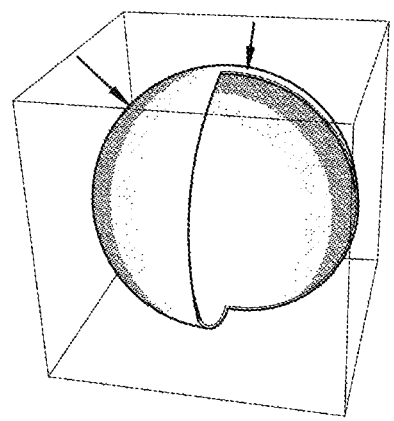
3101　　　　　　　3102　　　　　　　3103

FIG. 33

SDP Offer (HMD + TERMINAL DEVICE A)

```
m=audio 49154 RTP/AVP 97
b=AS: 147
b=RS:0
b=RR:2000
a=rtpmap:97 EVS/16000/2
a=fmtp:97 br= 64;bw= nb-fb
a=aoa:97 cylindrical; spherical;rotate=1
a=extmap:4/sendrecv urn:head-tracking2
a=sendrecv m=video 49152 RTP/AVP 98
b=AS: 15000
b=RS:0
b=RR:2000
a=rtpmap:98 H265/90000
a=fmtp:98 profile-id=1; level-id=153
a=imageattr:98 send [x=3840,y=2160] [x=1920,y=1080]
a=aov:98 cylindrical; spherical;rotate=1
a=sendonly
...
```

SDP Answer (CAMERA +| TERMINAL DEVICE B)

```
m=audio 49154 RTP/AVP 97
b=AS: 147
b=RS:0
b=RR:2000
a=rtpmap:97 EVS/16000/2
a=fmtp:97 br= 64;bw= nb-fb
a=aoa:97 spherical; lati=[0 0];longi=[80 160]; rotate=1
a=extmap:4/sendrecv urn:head-tracking yaw[8] roll[4] pitch[4]
a=sendrecv m=video 49152 RTP/AVP 98
b=AS: 9000
b=RS:0
b=RR:2000
a=rtpmap:98 H265/90000
a=fmtp:98 profile-id=1; level-id=153
a=imageattr:98 recv[x=3840,y=2160]
a=aov:98 spherical; longi=[0:240]; rotate=1
a=recvdonly
...
```

FIG. 34
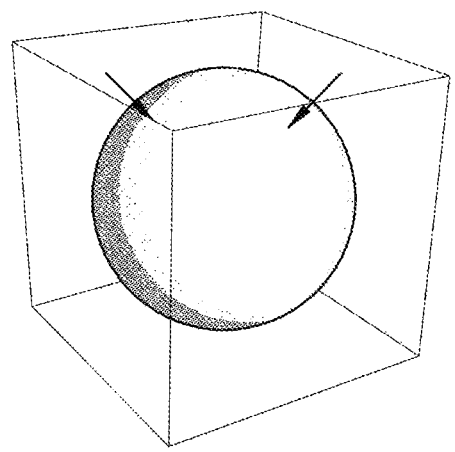
3401
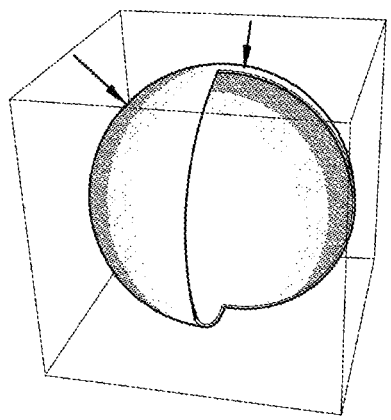
3402

FIG. 36
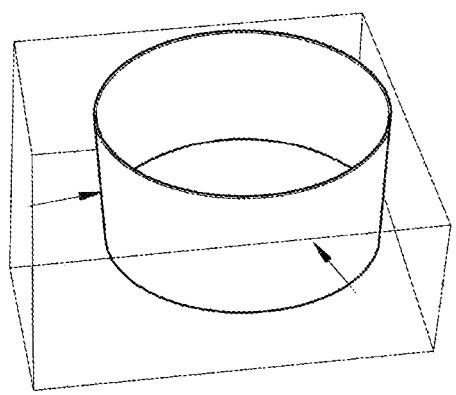 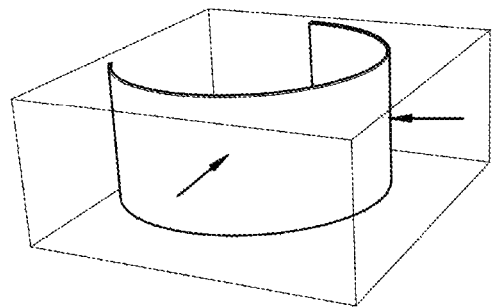
3601  3602

FIG. 41

| V | P | Subtype | PT | Length |
|---|---|---------|----|--------|
| | | | SSRC of Packet Source | |
| | | | NAME | |
| RTCP_APP_REQ_MCH | | Max. Channel Number | | Max. Bit-Rate |

| V | P | Subtype | PT | Length |
|---|---|---|---|---|
| | | | SSRC of Packet Source | |
| | | | SSRC of Media Source | |
| Longitude 1 | | | Longitude 2 | Latitude 1 | Latitude 2 |

METHOD FOR TRANSMITTING AUDIO SIGNAL AND OUTPUTTING RECEIVED AUDIO SIGNAL IN MULTIMEDIA COMMUNICATION BETWEEN TERMINAL DEVICES, AND TERMINAL DEVICE FOR PERFORMING SAME

TECHNICAL FIELD

The present disclosure relates to a method and an apparatus for providing the highest call quality with minimum bit rates in an immersive multimedia communication system.

BACKGROUND ART

As it has become possible to transmit data of a large capacity at high speed due to the development in mobile communication technologies, terminal devices have become able to perform not only a voice call function, but also an image call function. In $5^{th}$ generation mobile communication, transmission speeds have been greatly increased as compared to $4^{th}$ generation mobile communication, and thus, it is possible to provide a virtual reality-based call. For example, a virtual reality-based call may be realized through a camera capable of providing a wide-angle image generated from images input through a plurality of lenses and sound with a sense of realism that is input through a plurality of microphones, and a head-mounted display (HMD) through which it is possible to view the sound and the image that are received.

In a virtual reality-based call provided by $5^{th}$ generation mobile communication, omnidirectional media have to be transmitted. However, due to a limited frequency resource, it may be difficult to transmit the omnidirectional media. Also, as a head direction of a user wearing the HMD changes during a call, content of an image and sound viewed by the user has to be changed.

DESCRIPTION OF EMBODIMENTS

Technical Problem

Highest call quality with minimum bit rates in an immersive multimedia communication is required.

Solution to Problem

According to an aspect of the present disclosure, an immersive multimedia communication system may enable a user wearing a head mounted display (HMD) to hear sound corresponding to an image in a head direction of the user, as the head direction of the user is changed. According to another aspect of the present disclosure, an immersive multimedia communication system may output audio signals to a user such that sound in a user's direction of interest is clearly heard when the sound is a voice, and sound in a user's direction of interest is realistically heard when the sound is background noise.

According to another aspect of the present disclosure, an immersive multimedia communication system may maximize the sound quality of audio signals output to a listener, by compressing and transmitting ambisonic coefficients indicating a sound field mainly constructed based on sound sources in a direction of a listener's high interest.

BRIEF DESCRIPTION OF DRAWINGS

FIG. 4 illustrates an angle parameter indicating a head direction, according to an embodiment.

FIG. 5 illustrates an arrangement of microphones included in a camera, according to an embodiment.

FIG. 6 illustrates an arrangement of microphones included in a camera, according to an embodiment.

FIG. 7 illustrates a coordinate system used to indicate head tracking information, according to an embodiment.

FIGS. 10 through 13 illustrate a process of determining a format of head tracking information through call condition negotiation between terminal devices, according to an embodiment.

FIG. 29 illustrates a case in which a field of view (FOV) of an image transmitted to a terminal device at the side of an HMD has to be limited, according to an embodiment.

FIG. 31 is a view for describing a method of controlling an FOV of an image transmitted to a terminal device at the side of an HMD and directions of audio channels, according to an embodiment.

FIGS. 33 through 36 illustrate a process in which directions of audio channels and an FOV of an image are determined through call condition negotiation between terminal devices, according to an embodiment.

FIGS. 40 and 41 illustrate a format of a control packet via which a terminal device at the side of an HMD requests a terminal device at the side of a camera to adjust bit rates used to transmit an audio signal, according to an embodiment.

FIG. 42 illustrates a format of a control packet via which a terminal device at the side of an HMD requests a terminal device at the side of a camera to adjust an FOV of an image, according to an embodiment.

BEST MODE

Figure 1:
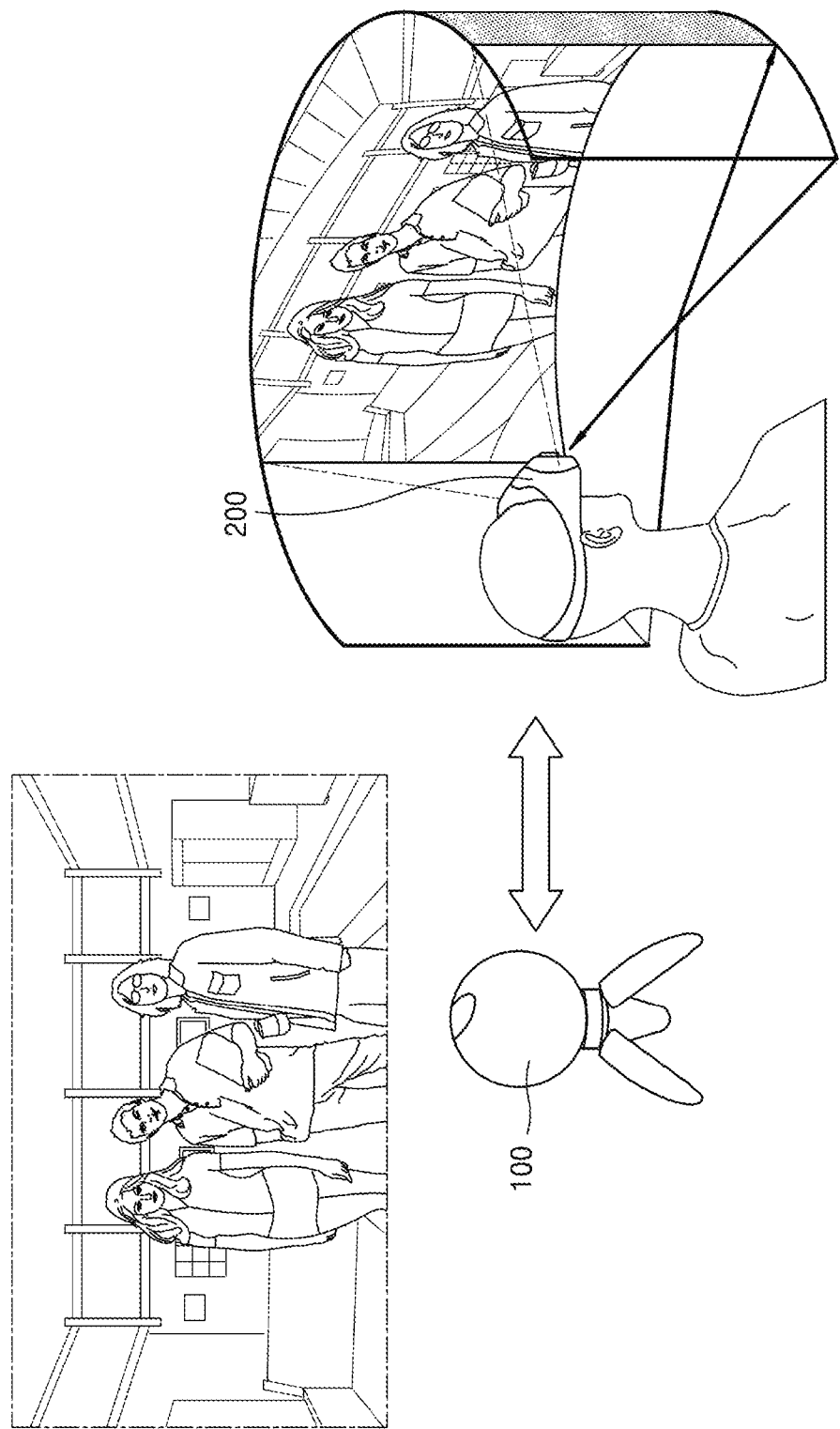
FIG. 1 is a view for describing immersive multimedia communication.

According to one or more embodiments, a method of transmitting, by a terminal device, an audio signal to a counterpart terminal device includes: extracting head tracking information of a user of the counterpart terminal device, from a packet received from the counterpart terminal device; predicting a head direction of the user of the counterpart terminal device after a predetermined time period, based on the extracted head tracking information; generating audio output signals by combining audio input signals received via a plurality of microphones, based on the predicted head direction; and transmitting information about the predicted head direction and a sound frame in which the audio output signals are compressed, to the counterpart terminal device.

According to one or more embodiments, a terminal device for performing a call function with a counterpart terminal device includes: at least one processor configured to generate audio output signals by extracting head tracking information of a user of the counterpart terminal device, from a packet received from the counterpart terminal device, predicting a head direction of the user of the counterpart terminal device after a predetermined time period, based on the extracted head tracking information, and combining audio input signals received via a plurality of microphones, based on the predicted head direction; at least one camera configured to receive an image signal; at least one microphone configured to receive the audio input signals; and a communicator configured to transmit information about the predicted head direction, a sound frame in which the audio output signals are compressed, and a video frame in which the image signal is compressed, to the counterpart terminal device.

According to one or more embodiments, a terminal device for performing a call function with a counterpart terminal device includes: at least one processor configured to generate audio output signals by extracting head tracking information of a user of the counterpart terminal device, from a packet received from the counterpart terminal device, predicting a head direction of the user of the counterpart terminal device after a predetermined time period, based on the extracted head tracking information, and combining audio input signals received via a plurality of microphones, based on the predicted head direction; and a communicator configured to receive an image signal and the audio input signals from a camera connected to the terminal device and transmit information about the predicted head direction, a sound frame in which the audio output signals are compressed, and a video frame in which the image signal is compressed, to the counterpart terminal device.

According to one or more embodiments, a method of outputting, by a terminal device, an audio signal received from a counterpart terminal device includes: extracting head tracking information and a sound frame from a packet received from the counterpart terminal device; determining information about a head direction of a user of the terminal device; correcting audio signals included in the sound frame, based on a result of comparing the extracted head tracking information with the determined information about the head direction; outputting the corrected audio signals; and transmitting the determined information about the head direction to the counterpart terminal device.

According to one or more embodiments, a head-mounted display (HMD) for performing a call function with a counterpart terminal device includes: at least one processor configured to extract head tracking information, a sound frame, and an image signal from a packet received from the counterpart terminal device, determine information about a head direction of a user of the terminal device, and correct audio signals included in the sound frame based on a result of comparing the extracted head tracking information with the determined information about the head direction; a speaker configured to output the corrected audio signals; a display configured to output the image signal; and a communicator configured to transmit the determined information about the head direction to the counterpart terminal device.

According to one or more embodiments, a terminal device for performing a call function with a counterpart terminal device includes: at least one processor configured to extract head tracking information, a sound frame, and an image signal from a packet received from the counterpart terminal device, determine information about a head direction of a user of the terminal device, and correct audio signals included in the sound frame based on a result of comparing the extracted head tracking information with the determined information about the head direction; and a communicator configured to transmit the corrected audio signals and the image signal to a head-mounted display (HMD) connected to the terminal device and transmit the determined information about the head direction to the counterpart terminal device.

According to one or more embodiments, a method of transmitting, by a terminal device, an audio signal to a counterpart terminal device includes: determining directions of audio channels arranged on a three-dimensional space; transmitting information about the determined directions of the audio channels to the counterpart terminal device; generating audio output signals corresponding to the determined directions of the audio channels by combining audio input signals received through a plurality of microphones; and transmitting a sound frame in which the audio output signals are compressed to the counterpart terminal device.

According to one or more embodiments, a terminal device for performing a call function with a counterpart terminal device includes: at least one processor configured to determine directions of audio channels arranged on a three-dimensional space; at least one camera configured to receive an image signal; at least one microphone configured to receive audio input signals; and a communicator configured to transmit information about the determined directions of the audio channels, wherein the at least one processor is further configured to generate audio output signals corresponding to the determined directions of the audio channels by combining the audio input signals, and the communicator is further configured to transmit a sound frame in which the audio output signals are compressed to the counterpart terminal device.

According to one or more embodiments, a terminal device for performing a call function with a counterpart terminal device includes: at least one processor configured to determine directions of audio channels arranged on a three-dimensional space; and a communicator configured to transmit information about the determined directions of the audio channels, wherein the at least one processor is further configured to generate audio output signals corresponding to the determined directions of the audio channels by combining audio input signals received through a plurality of microphones of a camera connected to the terminal device, and the communicator is further configured to transmit a sound frame in which the audio output signals are compressed to the counterpart terminal device.

According to one or more embodiments, a method of outputting, by a terminal device, an audio signal received from a counterpart terminal device includes: receiving information about directions of audio channels arranged on a three-dimensional space from the counterpart terminal device; receiving audio signals corresponding to the directions of the audio channels; and outputting the audio signals.

According to one or more embodiments, a head-mounted display (HMD) for performing a call function with a counterpart terminal device includes: a communicator configured to receive information about directions of audio channels arranged on a three-dimensional space from the counterpart terminal device and receive audio signals and an image signal corresponding to the directions of the audio channels; a speaker configured to output the audio signals; a display configured to output the image signal; and at least one processor configured to control the communicator, the speaker, and the display.

According to one or more embodiments, a terminal device for performing a call function with a counterpart terminal device includes: a communicator configured to receive information about directions of audio channels arranged on a three-dimensional space from the counterpart terminal device, receive audio signals and an image signal corresponding to the directions of the audio channels, and transmit the audio signals and the image signal to a head-mounted display (HMD) connected to the terminal device; and at least one processor configured to control the communicator.

MODE OF DISCLOSURE

Hereinafter, embodiments of the present disclosure will be described in detail by referring to the accompanying drawings so that one of ordinary skill in the art could easily execute the embodiments. However, the disclosure may be realized in various different embodiments and is not limited to the embodiments described herein. Also, in order to clearly describe the disclosure, aspects that are not related to the descriptions are omitted in the drawings, and throughout the specification, like reference numerals refer to the like elements.

One or more embodiments of the present disclosure may be described as functional block structures and various processing operations. All or part of the functional blocks may be implemented by various numbers of hardware and/or software components performing specific functions. For example, the functional blocks of the present disclosure may be implemented by one or more microprocessors or circuit components for predetermined functions. Also, for example, the functional blocks of the present disclosure may be realized as various programming or scripting languages. The functional blocks may be realized as algorithms executed by one or more processors. Also, the present disclosure may adopt the related art for electronic environment setting, signal processing, and/or data processing.

Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

In this specification, an "image" may include all of a still image, a video, a video frame, and a vide stream captured by a camera and transmitted to a head-mounted display (HMD)

In this specification, an "HMD" is a display device that may be worn to a head of a user. For example, the HMD may have the form of glasses, a goggle, a helmet, or the like. The HMD may be temporarily fixed to the head of the user via a frame, etc.

Hereinafter, the present disclosure will be described in detail with reference to the accompanying drawings.

An immersive multimedia communication system may include a camera capable of providing a wide angle image generated from images input through a plurality of lenses and realistic sound input through a plurality of microphones, and an HMD capable of watching the received sound and image. The HMD and the camera may be connected to terminal devices for multimedia communication or may be terminal devices performing communication. A user wearing the HMD may freely glance at upward/downward, front/rear, and right/left directions, and head tracking information of the user may be measured and continually transmitted by the HMD.

For example, when the immersive multimedia communication system performs multimedia streaming, the HMD may transmit the head tracking information to a streaming server. The streaming server may transmit 360-degree omnidirectional image information by particularly increasing the image quality of an image corresponding to a head direction of the user of the HMD. In the case of audio signals, the streaming server may transmit omnidirectional audio signals when a network capacity is sufficient, or the HMD may select audio signals corresponding to a current head direction from among received audio signals and output the selected audio signals to the user. Image content watched by the user through the HMD and audio content listened to by the user have to correspond to each other.

If it is difficult for the streaming server to store the omnidirectional audio information or for the streaming server to transmit the omnidirectional audio information to the HMD, the streaming server may transmit only audio signals of two channels including a right channel and a left channel. The HMD may control the directionality of the received audio signals to correspond to the head direction of the user. In order to control the directionality of the audio signals, the HMD may apply a head-related transfer function (HRTF), which is an example of a digital filtering method. The HMD may output, to the user, the audio signals, the directionality of which is controlled, thereby providing a three-dimensional (3d) experience to the user.

An audio compression technique according to the related art, such as MPEG surround, uses a correlation of omnidirectional audio channel structures, which are well known as the 5.1 channel structure, the 7.1 channel structure, etc. The audio compression technique according to the related art may repeatedly perform a down-mixing process according to the correlation of the audio channel structures, to ultimately compress audio input signals into audio signals corresponding to two channels. The audio compression technique according to the related art may add the down-mixing process used for the audio compression and a spatial parameter to a bit stream and may transmit the bit stream. A terminal device receiving the transmitted bit stream may reconstruct audio signals corresponding to omnidirectional audio channels by using the information received altogether and may select and output audio signals of the head direction.

The immersive multimedia communication system according to an embodiment may perform real time transmission of multimedia via a wired or wireless communication network. When the immersive multimedia communication system uses a mobile communication network, it is possible to provide services anywhere and anytime. However, the mobile communication network uses a limited wireless frequency resource and investment cost is high due to base station establishment, etc. Thus, when the immersive multimedia communication system uses the mobile communication network, it is difficult to realize economical transmission costs, while transmitting audios and images of all directions toward which the user of the HMD is not.

Meanwhile, the method of transmitting audio of only two channels to the HMD has limited sound quality when providing omnidirectional audio signals. For example, even when the head of the user is toward a rear direction, audio signals of a front direction are transmitted. Thus, even when the HMD corrects the received audio signals to correspond to the rear direction by using the HRTF, since it is not that actual audio signals of the rear direction are transmitted to the HMD, the HMD may not output the same sound as the actual audio signals of the rear direction.

The immersive multimedia system according to an embodiment may be applied not only to multimedia streaming for transmitting stored audio signals, but also to a case in which a terminal device at the side of a camera compresses an audio signal in real time according to a real time head direction of a user of the HMD, and transmit the compressed audio signal to a terminal device at the side of the HMD.

FIG. 1 is a view for describing immersive multimedia communication according to an embodiment.

According to an embodiment, the immersive multimedia communication system may include a camera 100 configured to provide a wide angle image generated from images input via a plurality of lenses and a realistic sound input through a plurality of microphones, and an HMD 200 configured to watch the sound and the image that are received.

A user wearing the HMD 200 may freely glance at upward/downward, front/rear, and right/left directions and head tracking information of the user may be measured by the HMD 200. The head tracking information measured by the HMD 200 may be transmitted to the camera 100 configured to transmit image information. When a network capacity is sufficient, the camera 100 may transmit audio signals of all directions and the HMD 200 may select and listen to an audio signal corresponding to a current head direction. Here, image content watched by the user and audio content listened to by the user have to correspond to each other.

However, when the immersive multimedia communication system uses the mobile communication network, it may cause the burden of transmission costs to transmit audios and images of all of the directions which the user of the HMD 200 is not toward. Thus, the immersive multimedia communication system according to an embodiment is designed to provide the utmost call quality with minimum bit rates.

A terminal device at the side of the camera 100 according to an embodiment may receive, via a network, head tracking information of the user of the HMD 200 remotely located and determine directions of audio channels. The terminal device at the side of the camera 100 may determine the directions of the audio channels, and a structure and a compression method of the audio channels, by taking into account the head tracking information of the user of the HMD 200, content of an image captured by the camera 100, and hearing directionality of the user of the HMD 200. The terminal device at the side of the camera 100 may generate audio signals corresponding to the determined directions of the audio channels and transmit the generated audio signals together with information about a determined head direction to the terminal device at the side of the HMD 200.

In the immersive multimedia communication system according to an embodiment, the camera may be connected to a terminal device capable of mobile communication or may be a terminal device directly performing mobile communication. Hereinafter, both the camera directly performing mobile communication and the terminal device connected to the camera will be referred to as the terminal device at the side of the camera.

Also, in the immersive multimedia communication system according to an embodiment, the HMD may be connected to a terminal device capable of mobile communication or may be a terminal device directly performing mobile communication. Hereinafter, both the HMD directly performing mobile communication and the terminal device connected to the HMD will be referred to as the terminal device at the side of the HMD.

Also, hereinafter, a terminal device may refer to the terminal device at the side of the camera or the terminal device at the side of the HMD, and a counterpart terminal device may refer to the terminal device at the side of the camera or the terminal device at the side of the HMD. For example, the counterpart terminal device with respect to the terminal device at the side of the camera may be the terminal device at the side of the HMD.

Figure 2:
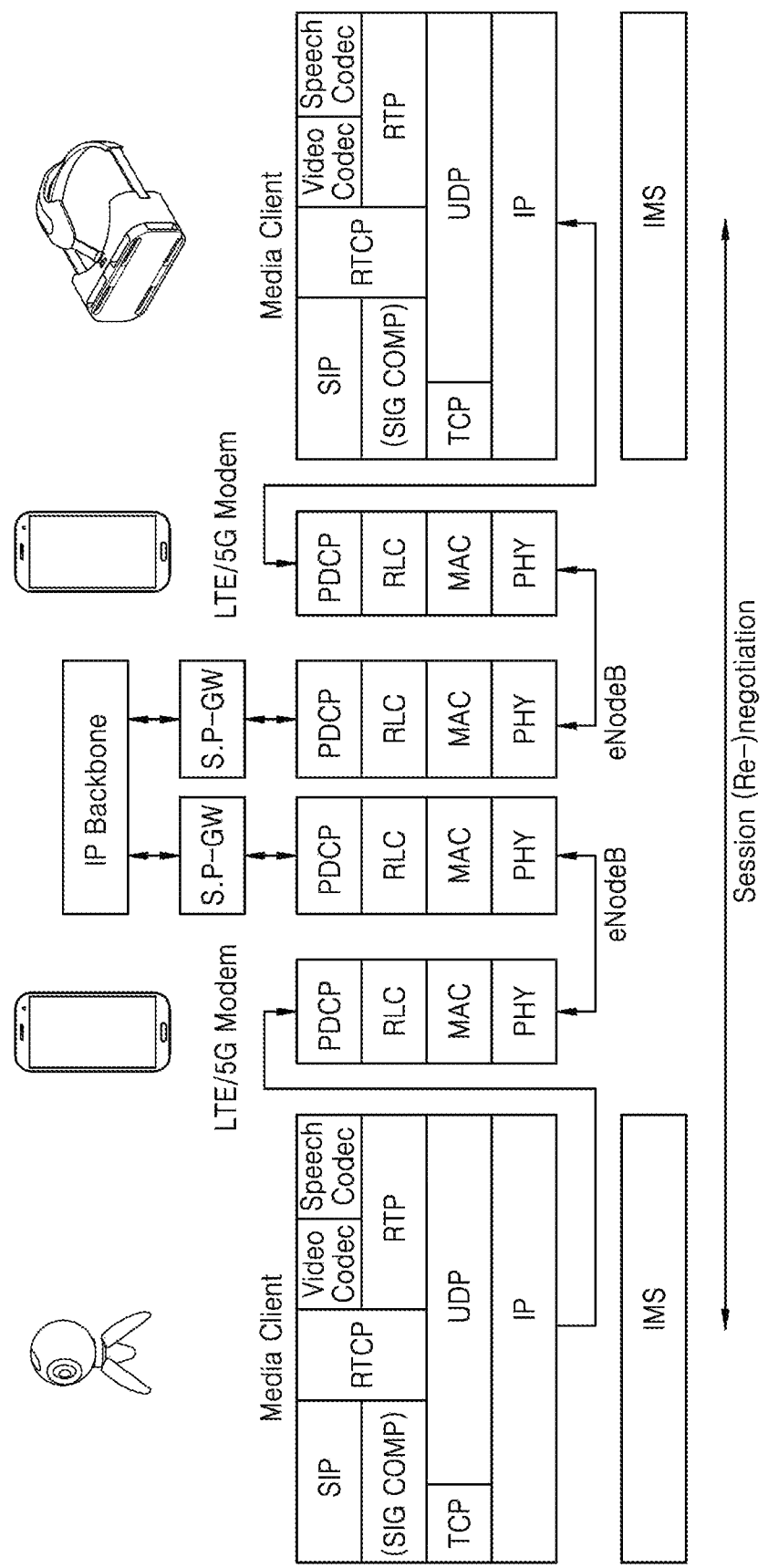
FIG. 2 illustrates a general protocol structure of an immersive multimedia communication system according to an embodiment.

FIG. 2 illustrates a general protocol structure of an immersive multimedia communication system according to an embodiment.

A voice over LTE (VoLTE) framework may be used for the immersive multimedia communication system.

The immersive multimedia communication system differs from a multimedia communication system according to the related art in that the immersive multimedia communication system uses a plurality of audio channels rather than a one-channel (mono) audio. The immersive multimedia communication system may use one audio codec for each of the plurality of audio channels.

Also, a terminal device at the side of a camera of the immersive multimedia communication system may compress wide angle images generated by stitching images input through a plurality of lenses rather than a single lens, into an image codec. The terminal device at the side of the camera may transmit the compressed images to a terminal device at the side of an HMD.

In FIG. 2, a speech codec may denote multi-channel speech/audio codecs and a video codec may denote video codecs connected to wide angle optics and having high resolution. A real time protocol (RTP) may be used to transmit data in real time in an IP-based network, such as the Internet and the LTE. A header of the RTP may be extended to convey head tracking information or direction information equivalent thereto. A real time control protocol (RTCP) may be used to control real time data transmission in the IP-based network. The RTCP may be control packets for handling congestion of multi-channel sounds or a wide angle video. An IP multimedia subsystem (IMS) may include processes for negotiating audio channel directions and a field of view (FOV) of a video. A modem illustrated in FIG. 2 may support at least one of the 5G and the LTE. A packet data convergence protocol (PDCP), radio link control (RLC), media access control (MAC), a physical layer (PHY), etc. may be communication protocols included in the LTE modem of a terminal and a base station. A serving gateway (S-GW), a packet data network gateway (P-GW), etc. may be nodes included in a core network.

Compression of a sound and an image may be performed by the camera receiving the sound and the image, or by a terminal device, such as a smartphone, etc., connected to the camera via a wired or wireless short range network, such as Wi-Fi, HDMI, Bluetooth, etc. The compressed sound and image may be transmitted to the terminal device at the side of the HMD through the network, such as LTE, 5G, etc. A counterpart user of a user of the terminal device at the side of the camera may watch the sound and the image received through the terminal device or the HMD connected to the terminal device. In the case of a voice call, these compression, transmission, and hearing operations have to be completed within 280 ms at the most.

The terminal device at the side of the camera according to an embodiment may receive information about a head direction of the user of the HMD from the terminal device at the side of the HMD. The terminal device at the side of the camera may construct audio channels based on the received information about the head direction. The terminal device at the side of the camera may construct the audio channels by taking into account hearing characteristics based on an ear direction, by estimating the ear direction of the user based on the information about the head direction. The terminal device at the side of the camera may compress audio signals corresponding to the audio channels and transmit the compressed audio signals to the terminal device at the side of the HMD. In the immersive multimedia system according to an embodiment, a format in which the information about the head direction is to be transmitted and received may be determined in an operation of negotiating a call condition.

The information about the head direction according to an embodiment may be used for two purposes.

The first purpose is for the terminal device at the side of the HMD to notify the terminal device at the side of the camera about a current head direction of the user of the HMD so that the terminal device at the side of the camera constructs the audio channels based on a head direction predicted based on the current head direction.

The second purpose is to be used by the terminal device at the side of the camera. The terminal device at the side of the camera may receive the information about the head direction from the terminal device at the side of the HMD and predict a future head direction by taking into account a transmission delay. The terminal device at the side of the camera may use the predicted future head direction as the basis for capturing audio signals and constructing the audio channels. The terminal device at the side of the camera may transmit the predicted head direction used for processing a sound frame together with the sound frame.

Thus, the information about the head direction according to an embodiment has to be continually transformed in bi-lateral directions in the same format and has to be generated by reflecting a structure of the camera.

Figure 3:
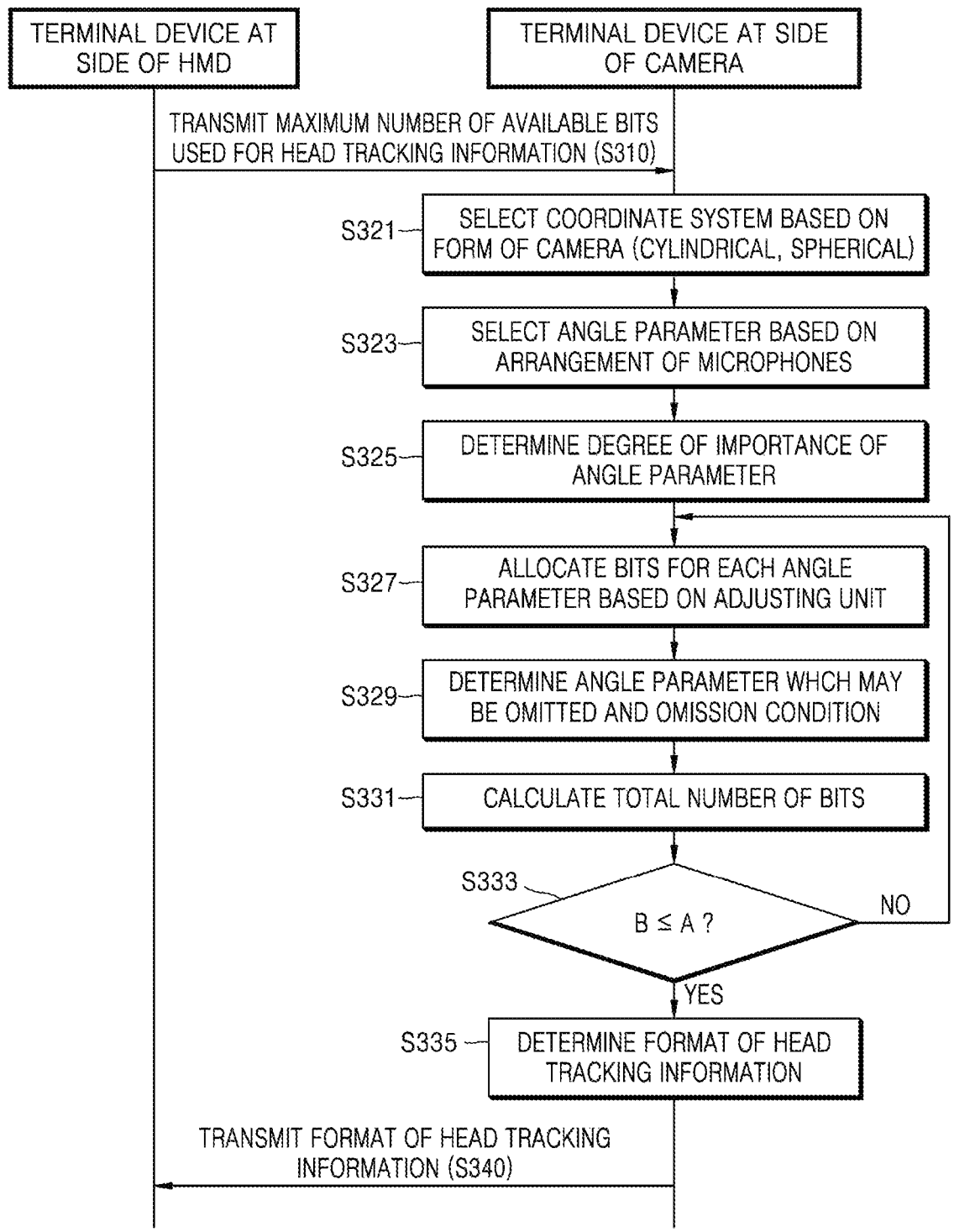
FIG. 3 is a flowchart of a method of negotiating a call condition, according to an embodiment.

FIG. 3 is a flowchart of a method of negotiating a call condition according to an embodiment.

FIG. 3 illustrates a process in which a terminal device at the side of a camera receives the maximum number of bits which may be used to indicate head tracking information from a terminal device at the side of an HMD, constructs the head tracking information by taking into account the received information, and allocates the bits. When the format of the head tracking information determined by the terminal device at the side of the camera is agreed to by the counterpart terminal device in a session negotiation operation, the terminal device and the counterpart terminal device may exchange the head tracking information according to the determined format.

In operation S310, the terminal device 200 at the side of the HMD according to an embodiment may transmit the maximum number of bits available for the head tracking information.

In operation S321, the terminal device 100 at the side of the camera according to an embodiment may select a coordinate system based on a form of the camera. For example, the terminal device 100 at the side of the camera may select the coordinate system as a cylindrical coordinate system or a spherical coordinate system, based on the form of the camera.

In operation S323, the terminal device 100 at the side of the camera may select an angle parameter which is to indicate a head direction of the user, based on arrangement of microphones included in the camera. In operation S325, the terminal device 100 at the side of the camera may determine a degree of importance of the angle parameter, and in operation S327, may determine the number of bits allocated to each angle parameter by taking into account an adjusting unit of the camera.

In operation S329, the terminal device 100 at the side of the camera according to an embodiment may determine the angle parameter which may be omitted and an omission condition. In operation S331, the terminal device 100 at the side of the camera according to an embodiment may calculate the number of bits required to transmit a determined at least one angle parameter and determine whether the calculated number of bits is less than the maximum number of bits that are available. In operation S335, when the calculated number of bits is equal to or less than the maximum number of available bits, the terminal device 100 at the side of the camera according to an embodiment may determine the determined at least one angle parameter and the number of bits allocated to the corresponding angle parameter as the format of the head tracking information.

In operation S340, the terminal device 100 at the side of the camera may transmit the determined format of the head tracking information to the terminal device 200 at the side of the HMD.

FIG. 4 illustrates an angle parameter indicating a head direction according to an embodiment.

As illustrated in an image 401 of FIG. 4, a terminal device according to an embodiment may indicate head tracking information as three angle parameters, which are yaw, roll, and pitch indicating rotation directions of a head. Alternatively, as illustrated in an image 402 of FIG. 4, the terminal device according to an embodiment may indicate the head tracking information by using a coordinate of a gaze cursor within a visual angle of an HMD, the coordinate being illustrated as (X,Y).

Compared to the case in which the parameters, namely, yaw, roll, and pitch, are used, when the coordinate of the gaze cursor is used, not all of the 3d direction information may be indicated, but a noise level during measurement may be reduced. According to an embodiment, the head tracking information may include a coordinate in which the gaze cursor is located or a coordinate of a block in which the gaze cursor is located from among same-sized blocks dividing an image. When the coordinate of the block in which the gaze cursor is located is transmitted, the number of bits used may be decreased compared to when the coordinate of the gaze cursor is transmitted.

FIGS. 5 and 6 illustrate an arrangement of microphones included in a camera according to an embodiment.

FIG. 5 illustrates a sphere-shaped camera 501 in which eight lenses and eight microphones are mounted. The camera 501 of FIG. 5 may compress 360-degree omnidirectional images and sounds. An image 502 of FIG. 5 illustrates locations of the microphones of the camera 501 illustrated in FIG. 5 in a 3d space. A sound signal or an audio signal may be input in a direction of each arrow.

FIG. 6 illustrates a cylinder-shaped camera 601 in which eight lenses and eight microphones are mounted. The camera 601 of FIG. 6 may compress 360-degree omnidirectional images and sounds. Unlike the camera 501 illustrated in FIG. 5, in the camera 601 illustrated in FIG. 6, the microphones are arranged on a side surface of the cylindrical body. An image 602 of FIG. 6 illustrates locations of the microphones of the camera 601 illustrated in FIG. 6 in a 3d space.

An audio compression method according to the related art, such as MPEG surround, may be applied to one or more audio channels having a flat structure, such as a 5.1 channel structure, a 7.1 channel structure, etc. However, as illustrated in FIGS. 5 and 6, in a situation in which a number of microphones are arranged on various 3D structured surfaces of a camera, the audio compression method according to the related art may be difficult to be applied. That is because, in the audio compression method according to the related art, down-mixing has to be performed in an optimized way for a limited number of audio channels having the flat structure. Also, sound and audio compression methods used in mobile communication, such as AMR, AMR-WB, EVS, etc., were developed to minimize the time taken for compression for real time transmission, and thus, a process of extracting common information by comparing audio signals in different directions are not used.

Thus, according to an embodiment to solve this problem of the related art, a method of transceiving an audio signal, the method being suitable for immersive multimedia communication in which a sound and a video are captured or presented in a 3d structure rather than a flat structure, is provided.

FIG. 7 illustrates a coordinate system used to indicate head tracking information according to an embodiment. According to an embodiment, a spherical coordinate system or a cylindrical coordinate system may be used to indicate the head tracking information.

The coordinate system used to transmit the head tracking information may be selected based on a structure of a camera. When microphones are arranged on a surface of a camera having a spherical structure, such as the camera 501 of FIG. 5, the head tracking information may be indicated on a space by using the spherical coordinate system. When microphones are arranged on a surface of a camera having a cylindrical structure, such as the camera 601 of FIG. 6, the head tracking information may be indicated on a space by using the cylindrical coordinate system.

Directions designated by yaw and pitch angle parameters of the image 401 of FIG. 4 may be indicated in both the spherical coordinate system and the cylindrical coordinate system. When the camera is fixed, it may not be required to transmit a roll parameter. However, in the case of a camera installed in a moving object, such as a robot, drone, etc., it may be required to transmit the roll parameter. Like this, angle parameters used to transmit the head tracking information may be selected based on the structure of the camera.

Figure 8:
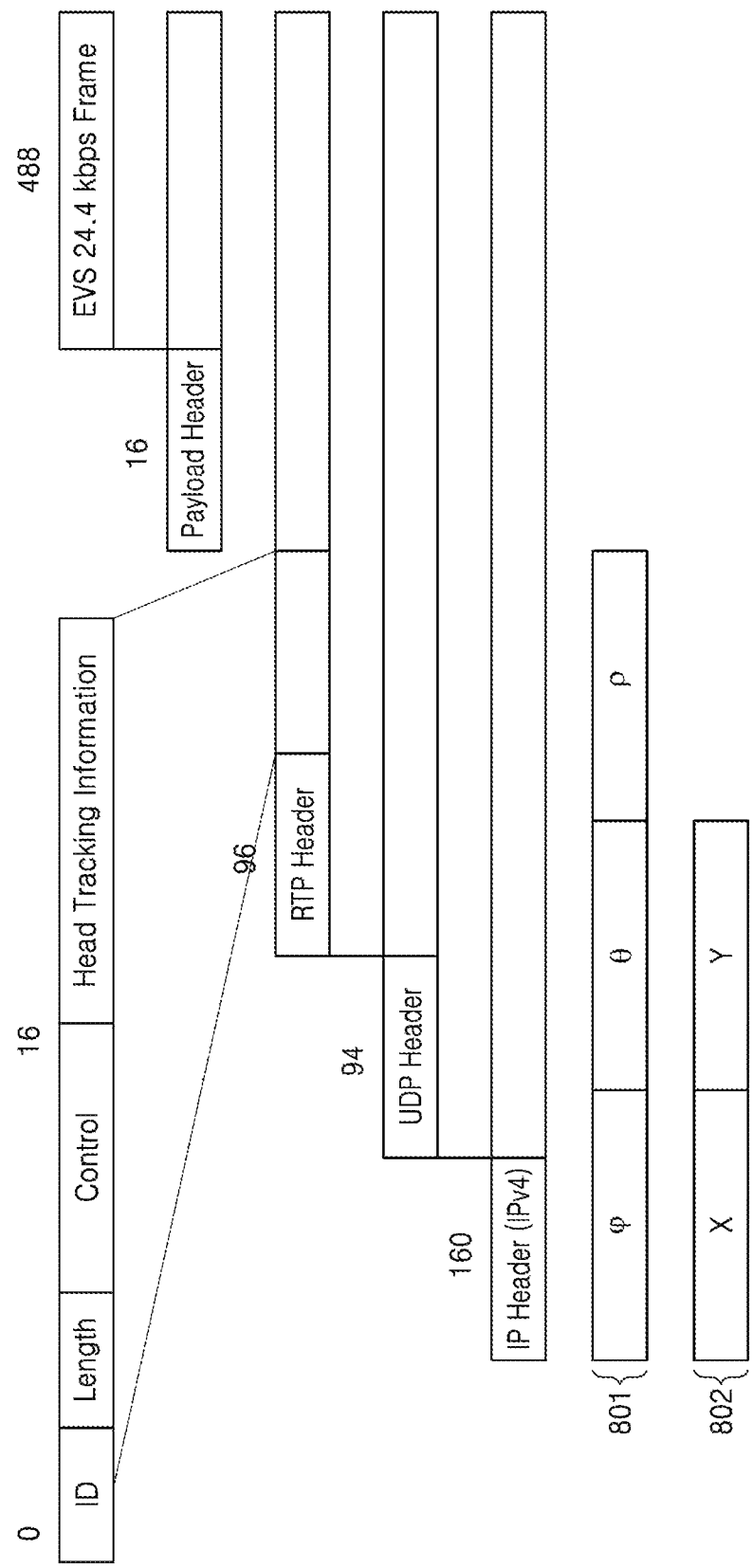
FIG. 8 is a view for describing a method performed by a terminal device to load head tracking information to an extended real-time protocol (RTP) header, according to an embodiment.

FIG. 8 is a view for describing a method performed by a terminal device to load head tracking information onto an extended real time protocol (RTP) header, according to an embodiment.

The terminal device according to an embodiment may use an additional communication channel that is different from a communication channel for transmitting a sound frame, in order to transmit the head tracking information. Alternatively, the terminal device according to an embodiment may transmit the head tracking information together with the sound frame. As illustrated in FIG. 8, according to an embodiment, a method of loading the head tracking information by extending the RTP header, defined by the internet standard technique RFC 5285 (a general mechanism for RTP header extensions), may be used.

An image 801 of FIG. 8 illustrates a case in which yaw, roll, and pitch parameters are transmitted to a counterpart terminal device as the head tracking information. An image 802 of FIG. 8 illustrates a case in which a coordinate of a gaze cursor is transmitted to a counterpart terminal device as the head tracking information. For example, as illustrated in FIG. 8, the head tracking information may be located next to a header of one byte including an ID and a length, and control information of one byte.

The head tracking information has to be continually transmitted. The head tracking information may consume bit rates, which may be used for sound compression when the head tracking information is not transmitted. Thus, it is required to minimize transmission of the head tracking information.

In order to minimize the amount of head tracking information, it is required not to transmit parameters that are not required. By taking into account a relative importance of each of the parameters, bits have to be differently allocated to each parameter.

For example, in the cylinder-shaped camera 601 illustrated in FIG. 6, only yaw information determining right and left directions may be required. As another example, in the sphere-shaped camera 501 illustrated in FIG. 5, it may be required to indicate the yaw information more precisely than the pitch information.

In addition, the bits have to be allocated to corresponding directions only by an amount required to indicate an adjustable operation of the camera in each direction. When directional information indicating a more precise angle than a unit of an angle adjustable by the camera is transmitted, bit rates may be wasted. For example, when 8 bits which may indicate 256 directions are allocated to transmit the head tracking information to a camera which may adjust directions in 16 operations, 4 bits may be wasted.

Figure 9:
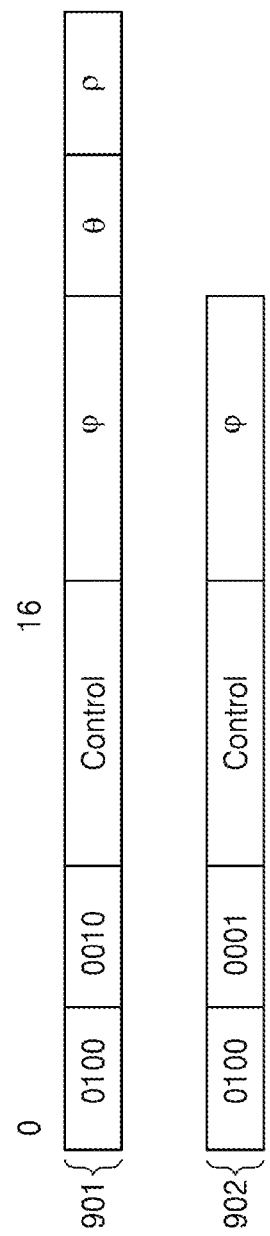
FIG. 9 is a view for describing a method performed by a terminal device to transmit head tracking information, according to an embodiment.

An image 901 of FIG. 9 illustrates a case in which 8, 4, and 4 bits are allocated to yaw, roll, and pitch parameters, respectively, based on importance of the parameters. An image 902 of FIG. 9 illustrates a case in which only the yaw parameter is transmitted. Meanwhile, even when a terminal device according to an embodiment transmits all of the three parameters as the image 901 of FIG. 9, only at least one parameter may be transmitted as the image 902 of FIG. 9 according to a situation. For example, when the roll information is not required and the pitch information is not changed from a previous frame or has a default value, the terminal device may not transmit the roll parameter and the pitch parameter. The structure of the head tracking information and a condition to omit the parameters have to be determined in an operation of negotiating a call condition by taking into account a structure of the camera.

The HMD and the camera may directly communicate with each other to negotiate the call condition or negotiate the call condition through the terminals connected thereto, respectively. The call condition negotiation may be a process of determining a characteristic of transmission paths of a mobile communication network, such as LTE, 5G, etc., and a wired network, a codec to be used, a bit rate, a bandwidth, a packetization method, etc, via mutual negotiation of the terminal devices. The call condition negotiation may use an IMS.

Proxy call session control function (P-CSCF), session call session control function (S-CSCF), interrogating call session control function (I-CSCF), and policy and charging rules f unction (PCRF) are network nodes included in the IMS.

For the call condition negotiation, a session initiation protocol (SIP) message is exchanged between the terminal devices. A protocol describing media-related information in the SIP message is a session description protocol (SDP). FIGS. 10 through 13 illustrate a procedure in which a terminal device at the side of an HMD and a terminal device at the side of a camera negotiate a method of constructing head tracking information by using the SDP, in an immersive multimedia system, according to an embodiment. In FIGS. 10 through 13, a method in which the camera responds to a proposal of the HMD is illustrated, but the opposite method is also possible.

Terminal device A connected to the HMD in FIGS. 10 through 13 proposes to terminal device B connected to the camera that a sound stream including two audio channels each compressed by using an EVS codec at 24.4 kbps may be transceived at up to 68 kbps and a video stream compressed at a resolution of 4K or 1080p by using an HEVC codec may be transceived at up to 15 Mbps. Terminal device A proposes to terminal device B that a sound stream including the two audio channels each compressed by using the EVS codec to 24.4 kbps and IP overhead may be accommodated at up to total 68 kbps.

In response to the proposal of terminal device A, terminal device B responds to accept the sound stream and the video stream that are proposed, under a condition in which bit rates of a received video are reduced to 10 Mbps. b=AS indicates a summed value of the bit rates of the sound or the video frame and bit rates of RTP/UDP/IP headers. As illustrated in FIG. 8, b=AS may be constantly 68 kbps even when head tracking information of 1 to 3 bytes is added next to bytes of an ID, a length field, and control information. This is because round-up is performed to a most approximate integer value in the calculation process of b=AS.

FIGS. 10 through 13 illustrate an example in which terminal device A proposes to use 2 or 3 bytes for the head tracking information. FIGS. 10 through 13 illustrate an example in which terminal device B responds to use the head tracking information of 1 to 2 bytes by using an in-band signal minimizer process by taking into account the structure of the camera.

FIG. 10 illustrates a response of terminal device B to use 1 byte for each of yaw, roll, and pitch, with respect to the proposal of terminal device A to use three bytes for the head tracking information. FIG. 11 illustrates a response of terminal device B to use 1 byte for each of yaw and pitch and not to use roll, with respect to the proposal of terminal device A to use 3 bytes for the head tracking information.

Although FIGS. 10 and 11 illustrate the examples in which a same number of bits are allocated to the angle parameters, embodiments are not limited thereto. Terminal device B may allocate a different number of bits to each angle parameter, based on a degree of importance of each angle parameter. For example, with respect to the proposal of terminal device A to use 3 bytes for the head tracking information, terminal device B may respond to use 1 byte for yaw and 4 bits for each of roll and pitch.

FIG. 12 illustrates a response of terminal device B to indicate each of coordinates of blocks in which a gaze cursor is included as 1 byte, with respect to a proposal of A to use 2 bytes for head tracking information. When a resolution of an image transmitted in an immersive call is a pixel of X in a horizontal direction and Y in a vertical direction, a size of each block may be the smallest integer, which is greater than $X/2^8=X/256$. FIG. 13 illustrates a response of terminal device B to indicate a location of a block in which the gaze cursor is included as 12 bits in a horizontal direction and 4 bits in a vertical direction, with respect to the proposal of terminal device A to use 2 bytes for the head tracking information.

Figure 14A:
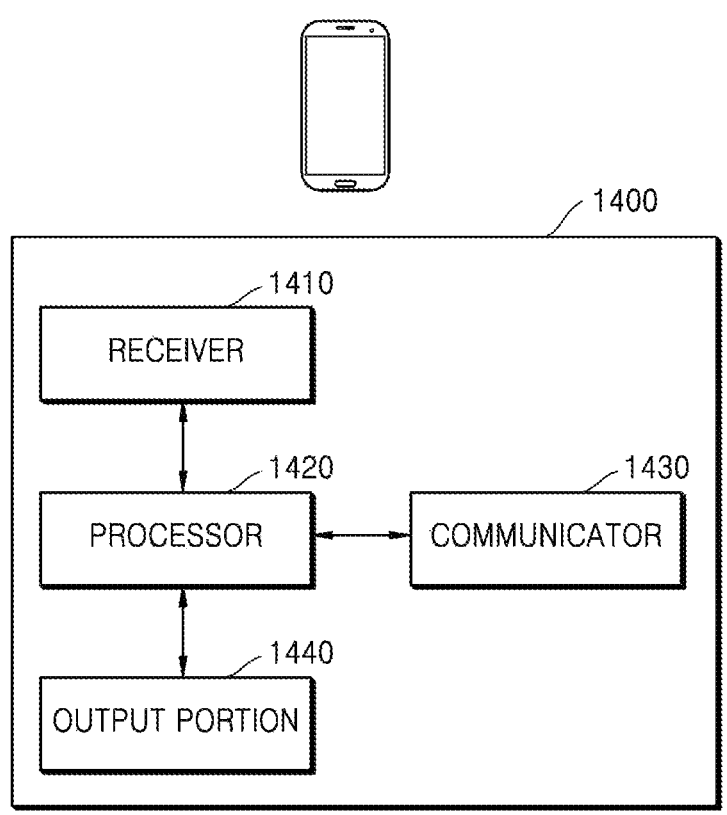
FIG. 14A is a block diagram of a terminal device according to an embodiment.
Figure 14B:
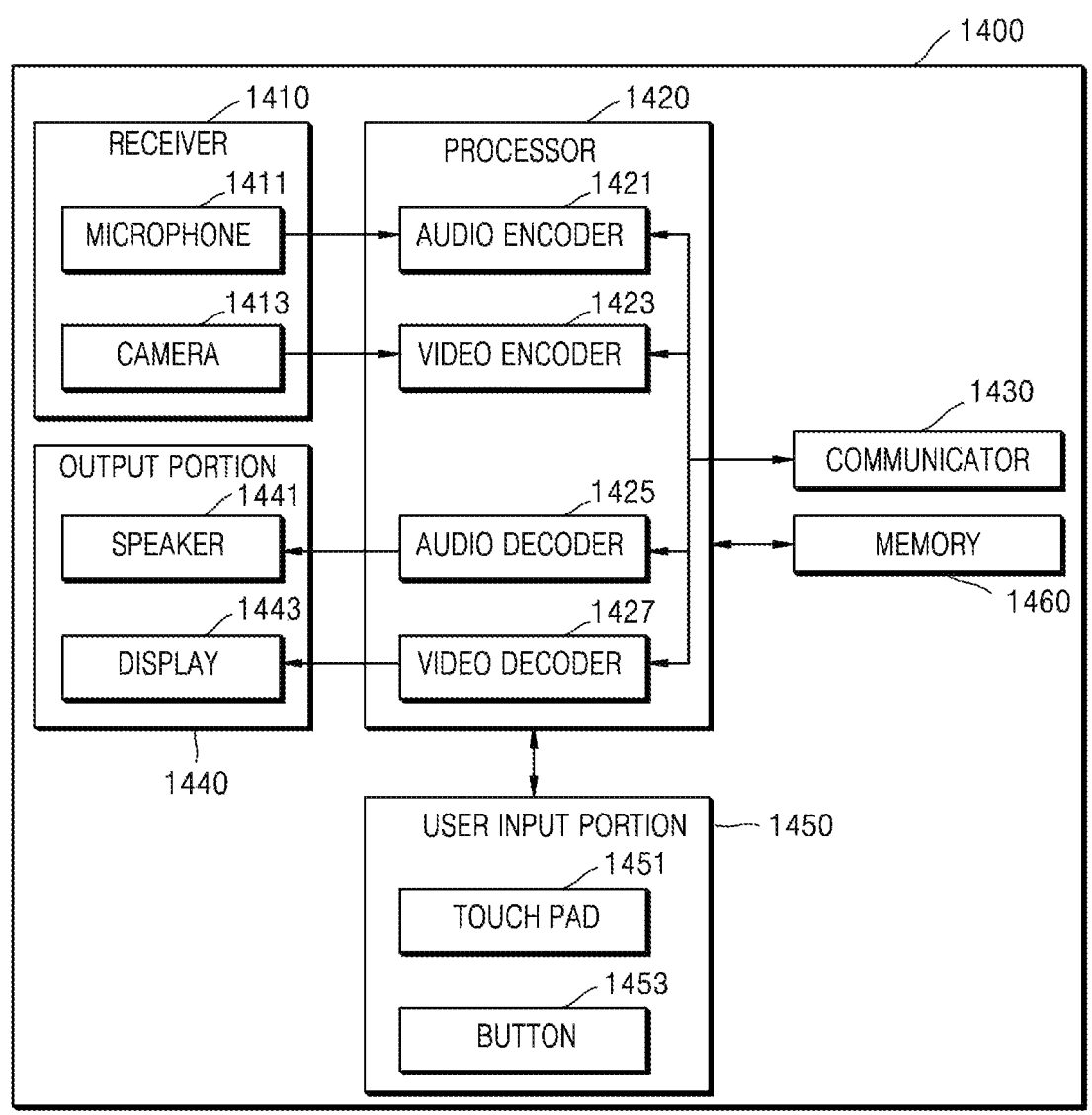
FIG. 14B is a detailed block diagram of a terminal device according to an embodiment.

FIGS. 14A and 14B are block diagrams of a terminal device 1400 for performing immersive multimedia communication, according to an embodiment. The terminal device 1400 according to an embodiment may support multimedia communication.

The terminal device 1400 included in the immersive multimedia communication system according to an embodiment may include a receiver 1410, a processor 1420, a communicator 1430, and an output portion 1440. However, the terminal device 1400 may be realized by including more or less components than the components illustrated in FIG. 14A. For example, as illustrated in FIG. 14B, the terminal device 1400 according to an embodiment may further include a user input portion 1450 and a memory 1460.

For example, the terminal device 1400 according to an embodiment may include a smartphone, a wearable device, a tablet personal computer (PC), a PC, a smart television (TV), a personal digital assistant (PDA), a lap-top, a media player, a microserver, a global positioning system (GPS) device, an electronic book terminal, a digital broadcasting terminal, a navigation device, an MP3 player, a digital camera, etc., but is not limited thereto. The terminal device 1400 may be other mobile computing devices or non-mobile computing devices than the devices described above.

Interfaces for transmitting data and multimedia may be formed in the terminal device 1400 supporting the multimedia communication. For inputting and outputting a sound, a microphone 1411, a speaker 1441, codecs 1421 and 1425 for compressing an audio signal are required. For inputting and outputting a still image and a video, a camera 1413, a display 1443, and codecs 1423 and 1427 for compressing the still image and the video are required. These interface devices are connected to a modem to be connected to a mobile communication network, such as LTE, 5G, etc., as the 3GPP layer 2 interface.

The receiver 1410 may receive at least one of a sound transmission signal and an image transmission signal. At least one of the sound transmission signal and the image transmission signal that are received may be a signal received from the outside of the terminal device to be transmitted to an external device. The receiver 1410 may receive the sound transmission signal by converting an external sound into electrical sound data by using a microphone. Alternatively, the receiver 1410 may receive an image capturing objects outside of the terminal device as the image transmission signal by using a camera. For example, the receiver 1410 may receive at least one of a face of a user, a background image, a voice of the user, and a background sound, while the terminal device 1400 performs a call function.

The processor 1420 may compress at least one of the received sound transmission signal and the received image transmission signal. When compressing the sound signal, the processor 1420 may operate in an audio mode or a voice mode. The processor 1420 according to an embodiment may enable high quality transmission of an audio signal except for a voice, by compressing the sound signal in the audio mode.

The voice mode may be a mode to use a compression method designed to compress a voice signal and the audio mode may be a mode to use a compression method designed to compress an audio signal, which is not a voice. For example, when the processor 1420 uses an enhanced voice services (EVS) codec to compress the sound signal, the voice mode may be a mode to compress the sound signal by using an algebraic code-excited linear prediction (ACELP) method and the audio mode may be a mode to compress the sound signal by using a modified discrete cosign transform (MDCT) method.

The audio mode takes a higher bit rate than the voice mode on average, thereby causing a burden to a network capacity. Also, when the processor 1420 operates in the audio mode when a voice signal is input, call quality may deteriorate due to a high level of background noise included in a compressed signal or a great bandwidth of the compressed signal. Thus, the processor 1420 according to an embodiment may operate in the audio mode only when the audio signal except for the voice is to be transmitted as high quality. The processor 1420 may operate by being automatically converted between the voice mode and the audio mode.

The processor 1420 may periodically sample at least one of the image transmission signal and the sound transmission signal. The processor 1420 may determine a screen of one scene sampled at a specific moment as a frame, in the case of the image transmission signal. The processor 1420 may determine values sampled during a predetermined time period as a frame, in the case of the sound transmission signal. The processor 1420 may process a transmission signal divided into frame units. The processor 1420 may convert each frame of the transmission signal into frequency-domain coefficients and quantize the frequency-domain coefficients to generate a bit stream.

Also, the processor 1420 may control general operations of the terminal device 1400. For example, the processor 1420 may control the receiver 1410, the communicator 1430, and the output portion 1440.

The communicator 1430 may transmit at least one of the compressed sound transmission signal and the compressed image transmission signal to an external device and may receive at least one of a sound reception signal and an image reception signal from an external device. For example, the communicator 1430 may communicate with the external device via a mobile communication network. The communicator 1430 may communicate with the external device by exchanging voices and data packets with a base station in charge of a coverage in which the communicator 1430 is located. The communicator 1430 may communicate with the external device via a mobile communication network. Alternatively, the communicator 1430 may communicate with the external device by supporting wired or wireless short range communication, such as Wi-fi, HDMI, Bluetooth, etc. For example, the communicator 1430 may transceive a sound signal and an image signal with an HMD or a camera connected to the terminal device 1400 via wires or wirelessly.

Also, the communicator 1430 may receive a call condition through a network. The communicator 1430 may receive the call condition determined by performing negotiation with an external device which is a target of the call through the network. The determined call condition may be indicated as an SDP message. The call condition may include conditions related to bit rates and bandwidths.

The output portion 1440 may output the sound reception signal received from the external device. The output portion 1440 may output a screen on which the terminal device 1400 performs a call function. The output portion 1440 may output the sound reception signal by converting the sound reception signal into a sound via a speaker. The output portion 1440 may output the sound reception signal to an earphone to be connected to the terminal device 1400.

Alternatively, the output portion 1440 may output the image reception signal via a display. For example, the output portion 1440 may output a face of a counterpart user, an image about an ambient environment in which the external device is located, a voice of the counterpart user, a background sound, etc., while the terminal device 1400 performs the call function. The signals output via the output portion 1440 may be signals reconstructed by the processor 1420 by decoding the bit stream received from the communicator 1430.

As illustrated in FIG. 14B, the terminal device 1400 according to an embodiment may further include a user input portion 1450 and a memory 1460.

The user input portion 1450 may receive a user input for controlling the terminal device 1400. For example, the user input portion 1450 may receive a touch input via a touch pad 1451 or a push input via a button 1453. However, it is not limited thereto, and the user input portion 1450 may receive various user inputs.

The memory 1460 may store at least one of a sound transmission signal, an image transmission signal, a sound reception signal, an image reception signal, and a call condition. Also, the memory 1460 may store commands executed by the processor 1420 to control the terminal device 1400.

Meanwhile, part or all of blocks included in the processor 1420 illustrated in FIG. 14B may be realized as hardware and/or software structures performing specific functions. The functions performed by the blocks illustrated in FIG. 14B may be realized by at least one microprocessor or circuit components for corresponding functions. Part or all of the blocks illustrated in FIG. 14B may be software modules including various programming languages or script languages executed by the processor 1420.

In order to input and output a sound signal, the terminal device 1400 may include a microphone 1411 configured to receive the sound signal, an audio encoder 1421 configured to compress the sound signal, an audio decoder 1425 configured to decode the compressed sound signal, and the speaker 1441 configured to output the sound signal.

In order to input and output an image signal, the terminal device 1400 may include the camera 1413 configured to receive an image signal, a video encoder 1423 configured to compress the image signal, a video decoder 1427 configured to decode the compressed image signal, and a display 1443 configured to output the image signal.

The communicator 1430 may include a packet-based network interface to transmit the signals compressed by the processor 1420 into packet units. The communicator 1430 may receive the signals compressed into the packet units via this interface. The communicator 1430 may be connected to the 3rd generation partnership project (3GPP) layer 2 interface of a modem to be connected to a communication network, such as the 2G, the 3G, or the LTE. The communicator 1430 may be connected to interfaces of corresponding other networks to be connected to the networks, such as a wired network, the Internet, Wi-Fi, etc.

Operation methods of the audio encoder 1421 and the audio decoder 1425 may be determined based on at least one of a sound signal or a image signal that is input, a user input, and a network signal. A codec, a bit rate, a bandwidth, etc., may be determined based on a negotiation operation for communication with a network and a counterpart terminal of the call performance. The terminal device 1400 may compress the sound signal based on the codec, the bit rate, and the bandwidth that are determined and may transmit the compressed sound signal through a network. The terminal device 1400 may receive the sound signal transmitted from the counterpart terminal device and reconstruct the sound signal.

FIGS. 14A and 14B illustrate an example in which the terminal device providing a camera function and a display function is used in the immersive multimedia communication system.

Meanwhile, as illustrated in FIG. 1, the immersive multimedia system according to an embodiment may include the camera specialized for capturing a sound and an image and the HMD specialized for outputting the sound and the image.

Figure 15A:
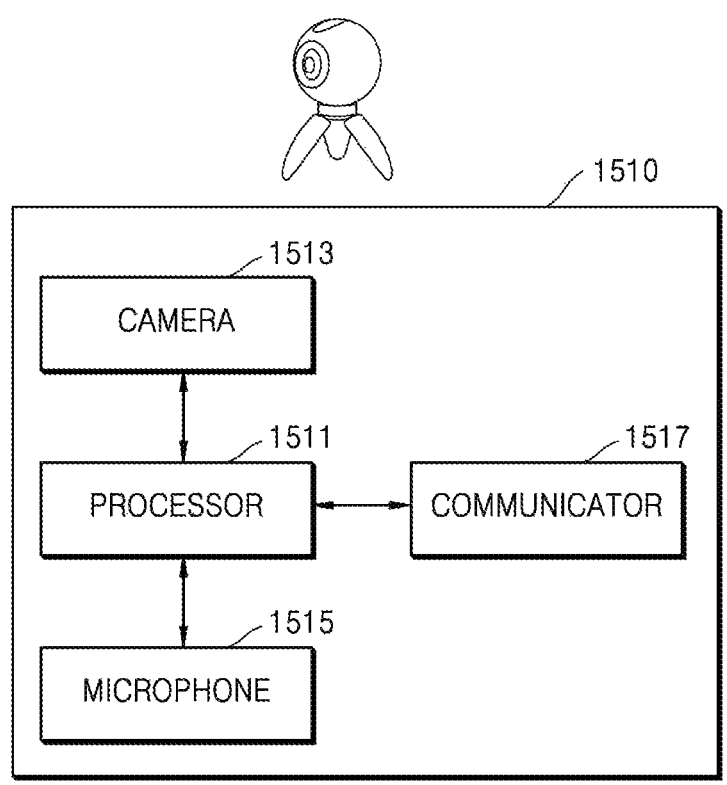
FIG. 15A is a block diagram of a structure of a camera according to an embodiment.

FIG. 15A is a block diagram of a camera according to an embodiment.

The camera 1510 included in the immersive multimedia system according to an embodiment may be a terminal device directly performing mobile communication.

The camera 1513 may receive an image signal. A microphone 1515 may receive audio input signals.

A processor 1511 may extract head tracking information of a user of a counterpart terminal device from a packet received from the counterpart terminal device. The processor 1511 may predict a head direction of the user of the counterpart terminal device after a certain time period, based on the extracted head tracking information. The processor 1511 may generate audio output signals by combining audio input signals received through a plurality of microphones based on the predicted head direction. For example, the processor 1511 may determine directions of audio channels corresponding to the predicted head direction. The processor 1511 may generate the audio output signals corresponding to the determined directions of the audio channels, by combining the audio input signals received through the plurality of microphones. For example, the processor 1511 may process ambisonic coefficients converted from the audio input signals, based on the predicted head direction, and may compress the processed ambisonic coefficients to generate the audio output signals.

The processor 1511 may determine a format in which the head tracking information is to be transmitted and received, in an operation of negotiating a call condition with the counterpart terminal device. Also, the processor 1511 may control the camera 1513, a microphone 1515, and a communicator 1517 to transmit the audio signals to the counterpart terminal device.

The processor 1511 may determine the directions of the audio channels arranged on a three-dimensional space. The processor 1511 may determine the directions of the audio channels arranged on the three-dimensional space, in the operation of negotiating the call condition with the counterpart terminal device. The processor 1511 may generate the audio output signals corresponding to the determined directions of the audio channels by combining the audio input signals received through the microphone 1515.

The communicator 1517 may transmit the audio output signals generated by the processor 1511 to the counterpart terminal device. The communicator 1517 may transmit at least one of information about the predicted head direction, the audio output signals, and the image signal to the counterpart terminal device. The communicator 1517 may transmit information about the directions of the audio channels determined by the processor 1511.

Although not shown in FIG. 15A, the camera 1510 according to an embodiment may further include an output portion (not shown). The output portion (not shown) may be located on a surface of the camera 1510. For example, the output portion (not shown) may include a plurality of light-emitting diodes (LEDs) distributed on the surface of the camera 1510. The output portion (not shown) may display a location of an eye sight of the user, received from a terminal device at the side of the HMD. However, embodiments are not limited thereto, and the camera according to an embodiment may display the location of the eye sight of the user in various ways. The camera according to an embodiment may enable a natural virtual call operation by notifying a transmitter about a current point of a receiver.

Figure 15B:
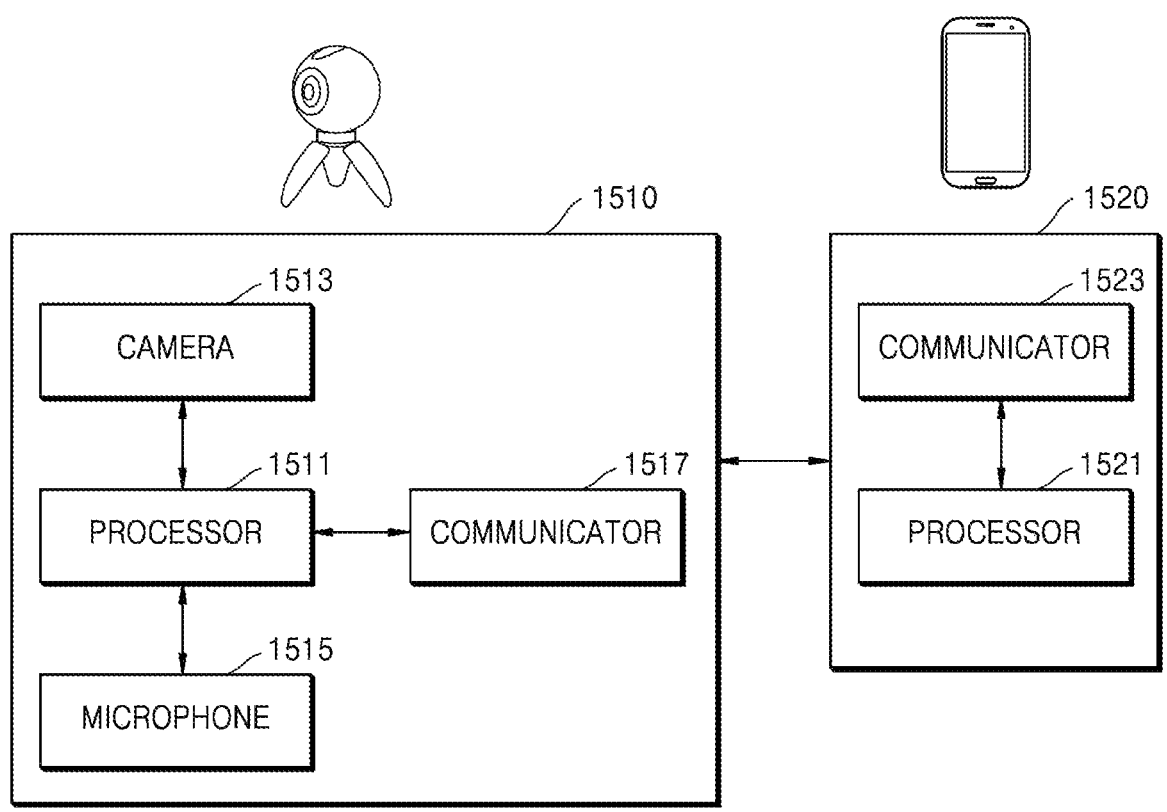
FIG. 15B is a block diagram of a camera and a terminal device according to an embodiment.

FIG. 15B is a block diagram of the camera and a terminal device, according to an embodiment.

The camera 1510 included in the immersive multimedia system according to an embodiment may operate in interconnection with the terminal device 1520.

Here, the terminal device 1520 operating in interconnection with the camera 1510 may include a processor 1521 and a communicator 1523. Although omitted in FIG. 15B, the terminal device 1520 may be included in the terminal device 1400 illustrated in FIG. 14A. Thus, with respect to FIG. 15B, the descriptions with respect to FIGS. 14A, 14B, and 15A may be applied. The same descriptions will not be given.

The processor 1521 may extract head tracking information of a counterpart terminal device from a packet received from the counterpart terminal device. The processor 1521 may predict a head direction of a user of the counterpart terminal device after a certain time period, based on the extracted head tracking information. The processor 1521 may generate audio output signals by combining audio input signals received through a plurality of microphones based on the predicted head direction.

For example, the processor 1521 may determine directions of audio channels corresponding to the predicted head direction.

The processor 1521 may determine the directions of the audio channels arranged on a three-dimensional space. The processor 1521 may determine the directions of the audio channels based on information about at least one of a type of an available coordinate system, the number of audio channels which may be received, arrangement of a plurality of microphones on a surface of the camera, ambient sound environment of the camera, an FOV of an image transmitted to the counterpart terminal device, and maximum available bit rates.

The processor 1521 may generate the audio output signals corresponding to the determined directions of the audio channels, by combining the audio input signals received by the camera 1510 through the plurality of microphones For example, the processor 1521 may process ambisonic coefficients converted from the audio input signals based on the predicted head direction and compress the processed ambisonic coefficients to generate the audio output signals.

The processor 1521 may control general operations of the terminal device 1520.

The communicator 1523 may receive at least one of an image signal and audio input signals from an external device connected to the terminal device 1520. The communicator 1523 may receive at least one of the image signal and the audio input signals from the camera 1510. The communicator 1523 may transmit at least one of the information about the predicted head direction, the audio output signals, and the image signal to the counterpart terminal device. The communicator 1523 may transmit the information about the directions of the audio channels determined by the processor 1521 to the counterpart terminal device.

Hereinafter, with reference to FIGS. 16 through 24, a detailed method performed by the terminal device at the side of the camera to transmit audio signals to the terminal device at the side of the HMD by taking into account a head direction of the user of the HMD will be described.

Figure 16:
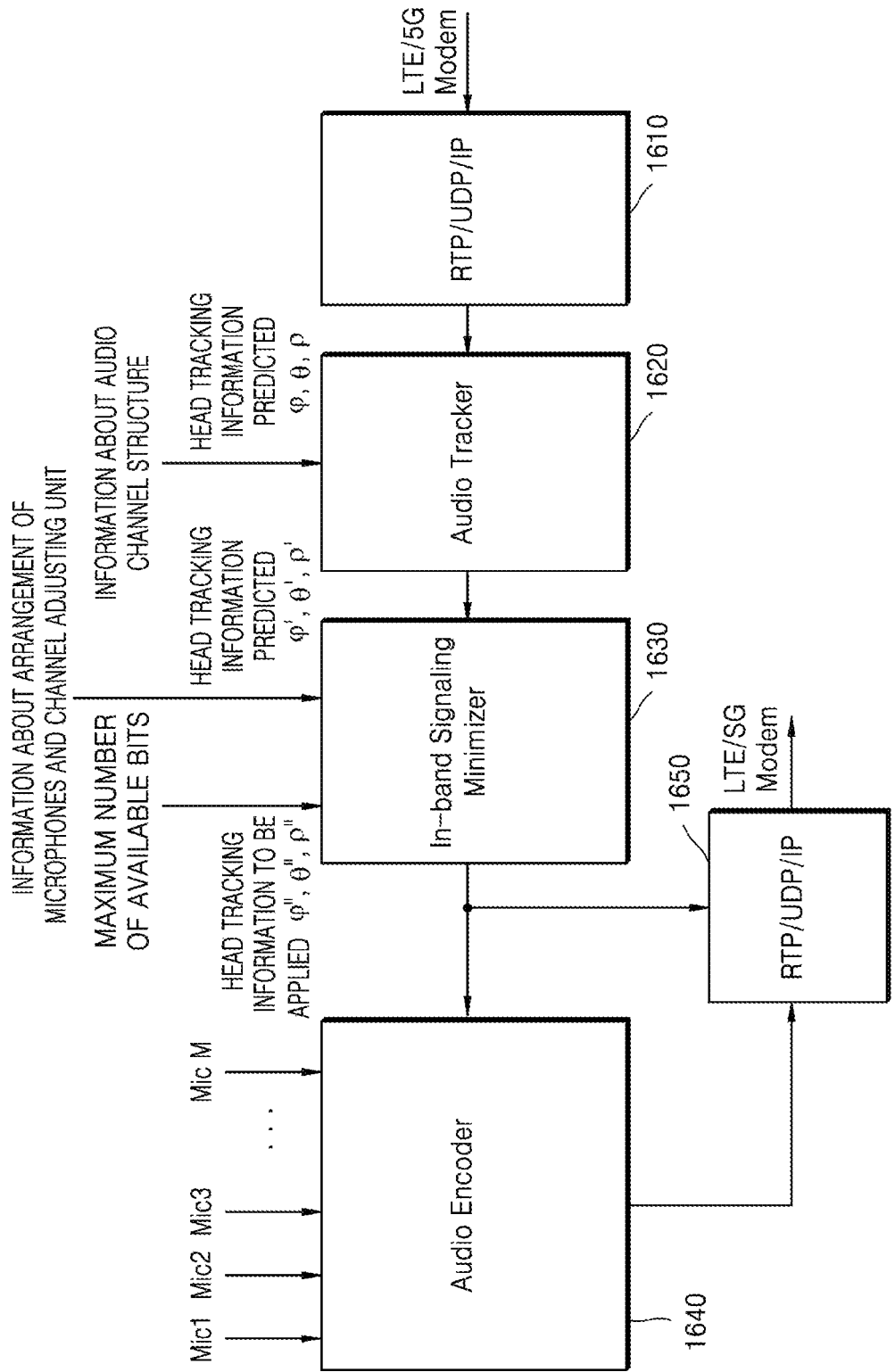
FIG. 16 illustrates a structure of a processor of a camera or a terminal device, according to an embodiment.

FIG. 16 illustrates a structure of a processor of a terminal device at the side of a camera according to an embodiment.

The terminal device at the side of the camera according to an embodiment may receive head tracking information of a user wearing an HMD, from a terminal device at the side of the HMD. The terminal device at the side of the camera according to an embodiment may determine directions of audio channels based on the transmitted head tracking information. The terminal device at the side of the camera according to an embodiment may compress and transmit audio signals corresponding to the determined audio channels.

First, in block 1610, the terminal device may remove an RTP/UDP/IP header from a received packet and extract the head tracking information from the RTP header. The head tracking information extracted from the RTP header may include an angle parameter of at least one of yaw, roll, and pitch or may include a coordinate of a gaze cursor.

An audio tracker 1620 may predict a future head direction and determine the directions of the audio channels based on the predicted head direction.

Figure 17:
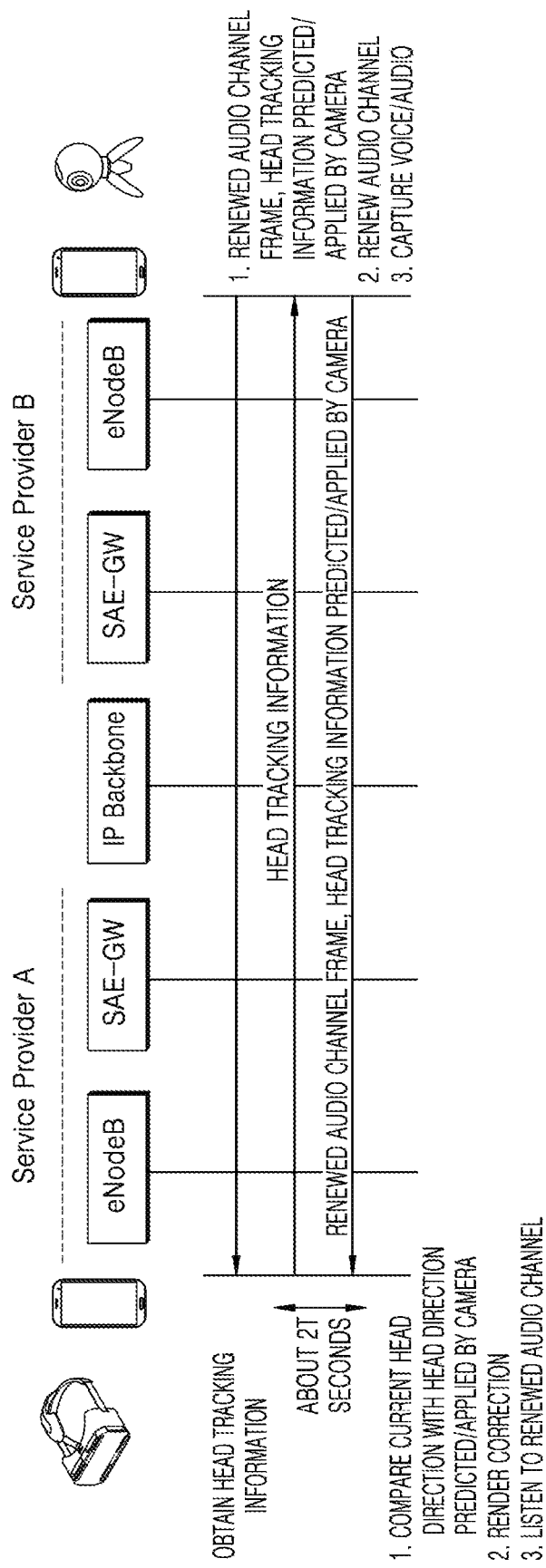
FIG. 17 illustrates that it takes time for a terminal device to transmit and receive head tracking information, according to an embodiment.

FIG. 17 illustrates service provider A operating a network to which a terminal device at the side of an HMD is connected and service provider B operating a network to which a terminal device at the side of a camera is connected.

As illustrated in FIG. 17, the head tracking information received by the terminal device at the side of the camera may be information determined by the HMD at least T seconds earlier. For example, the T seconds may be transmission time from the HMD to the camera. In the case of a mobile communication network supporting voice communication, such as LTE, etc., the T seconds may be about 150 ms.

Figure 18:
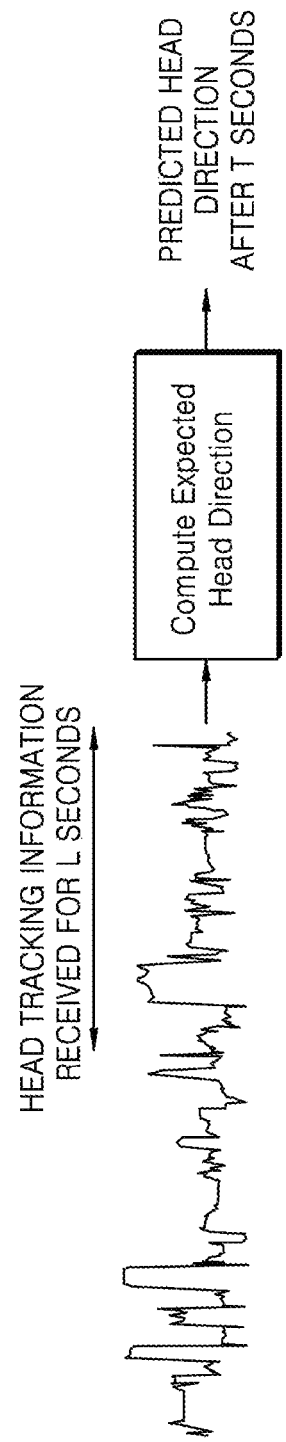
FIG. 18 is a view for describing a method of predicting a head direction, according to an embodiment.

An audio frame compressed and transmitted by the terminal device at the side of the camera may also reach the terminal device at the side of the HMD at least after the T seconds. Thus, the audio tracker 1620 may predict a head direction after about T seconds by analyzing the head tracking information received for recent L seconds as illustrated in FIG. 18. For example, the audio tracker 1620 may predict the head direction of the user of the HMD by using various signal processing methods, such as liner interpolation, etc.

Next, the audio tracker 1620 may predict the directions of the audio channels according to the predicted head direction.

Figure 19:
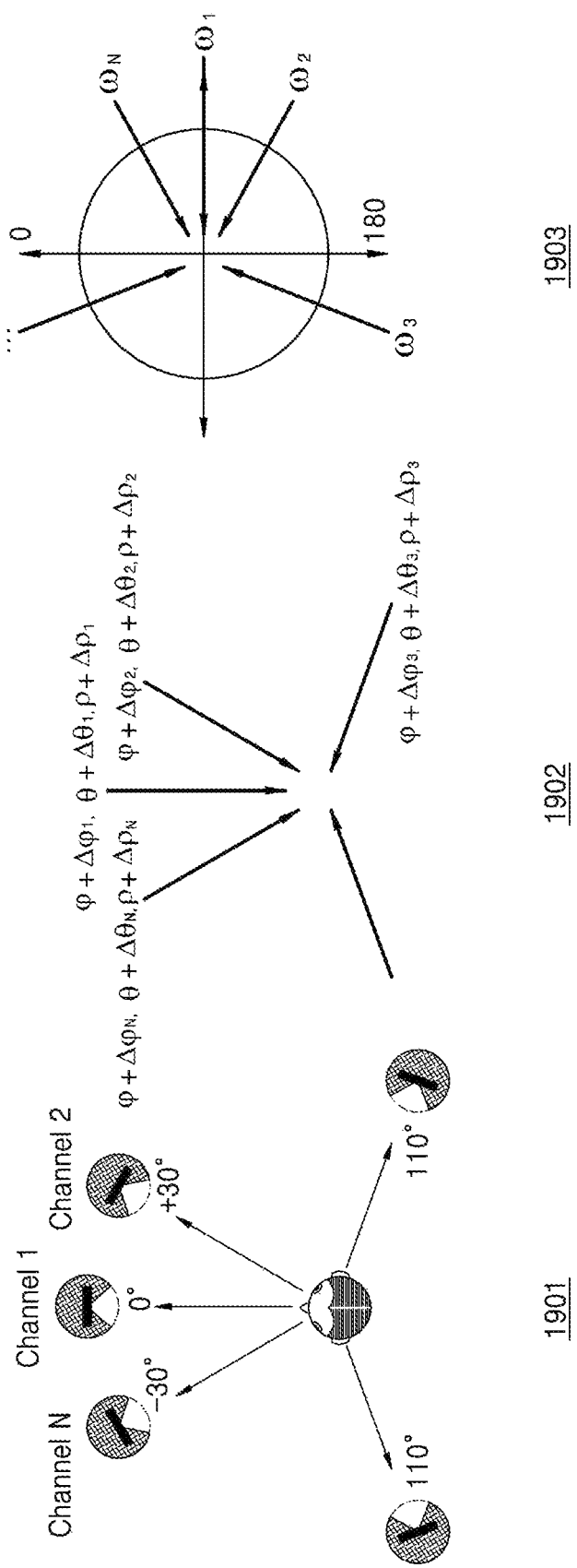
FIG. 19 illustrates relative directions of audio channels according to an embodiment.

An image 1901 of FIG. 19 illustrates an example of an audio channel structure used in an immersive multimedia communication system or a surround sound system. Audio signals may be transmitted from N directions toward a listener in the center and the signal of each direction may require one audio channel. In the audio channel structure illustrated in the image 1901 of FIG. 19, a head direction may correspond to a direction of channel 1 in the center. However, embodiments are not limited thereto, and as in the case of a stereo in which channels are located at right and left sides based on a head direction of the listener, the audio channel may not be located in a direction corresponding to the head direction. The image 1901 of FIG. 19 illustrates that the audio channels are arranged on a plane. However, embodiments are not limited thereto.

An image 1902 of FIG. 19 illustrates directions of N audio channels based on a head direction of a user of the HMD, when information of yaw, roll, and pitch indicating the head direction of the user of the HMD is ($\varphi$, $\theta$, $\rho$). As the head direction of the listener is changed, the direction of each audio channel may be changed. However, a difference of relative directions between the audio channels may be constantly maintained.

The audio tracker 1620 may receive information of Table 1 as the audio channel structure. The audio channel structure may be determined in a call condition negotiation operation and may be transmitted to the audio tracker 1620.

TABLE 1

| | Channel Number | | | |
|---|---|---|---|---|
| | 1 | 2 | ... | N |
| Yaw | $\varphi + \Delta\varphi_1$ | $\varphi + \Delta\varphi_2$ | ... | $\varphi + \Delta\varphi_N$ |
| Roll | $\theta + \Delta\theta_1$ | $\theta + \Delta\theta_2$ | ... | $\theta + \Delta\theta_N$ |
| Pitch | $\rho + \Delta\rho_1$ | $\rho + \Delta\rho_2$ | ... | $\rho + \Delta\rho_N$ |

$\Delta\varphi N$, $\Delta\theta N$, and $\Delta\rho N$ of Table 1 indicate a difference between the direction ($\varphi$, $\theta$, $\rho$) of Channel 1 and the direction of the $N^{th}$ channel.

An image 1903 of FIG. 19 illustrates a situation in which the head direction of the user is changed by a radian of $\omega 1$, compared to the image 1901 of FIG. 19. As the head direction is changed, the direction of each audio channel may be changed, but the difference of relative directions between the audio channels may be constantly maintained.

Figure 20:
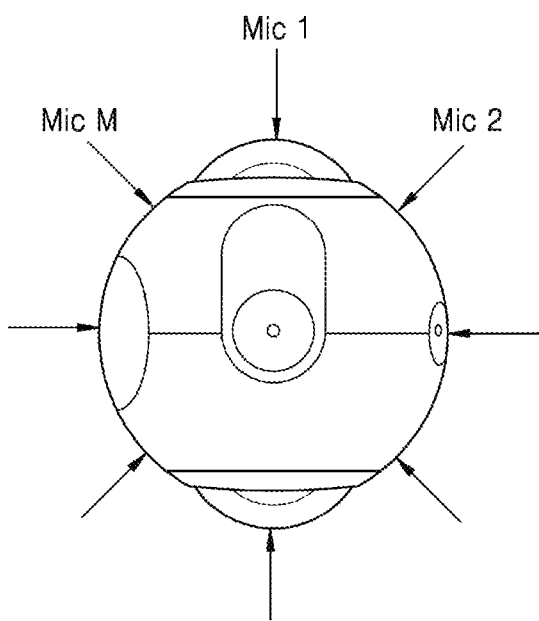
FIG. 20 illustrates a camera in which M microphones are formed, according to an embodiment.

Meanwhile, the number of audio channels is irrespective of the number of microphones installed in the camera. FIG. 20 illustrates a camera in which M microphones are installed. A terminal device at the side of the camera according to an embodiment may construct audio signals corresponding to the N audio channels illustrated in FIG. 19, by combining signals input from the M microphones.

The audio tracker 1620 may receive the head tracking information from the counterpart terminal device, predict the information about the future head direction, and convert the directions of the audio channels with respect to the future head direction.

Next, an in-band signaling minimizer 1630 may convert the head direction predicted by the audio tracker 1620 into a direction which may be used in multimedia communication. The head tracking information extracted from the received packet and transmitted to the audio tracker 1620 may be information indicated by a predetermined limited number of bits. However, the future head direction predicted by the audio tracker 1620 based on values that are input for L seconds may be a direction exceeding the limited number of bits or a direction toward which the camera may not be arranged.

The in-band signaling minimizer 1630 may convert the predicted head direction and the directions of the audio channels determined based on the predicted head direction into directions which may be practically applied and indicated, based on information about the maximum number of available bits which may be used to indicate the head direction, an arrangement of the microphones, a channel adjustment unit, etc. The in-band signaling minimizer 1630 may allocate different bits based on the degree of importance in the operation of negotiating the call condition and limit the number of bits, thereby minimizing the amount of transmitted and received head direction information.

An audio encoder 1640 may combine input signals received from the microphones based on the directions of the audio channels, the directions being converted by the in-band signaling minimizer 1630, in order to construct and encode the audio output signals corresponding to the audio channels, respectively. The audio encoder 1640 may sample the audio output signals and divide the audio output signals into frame units. The audio encoder 1640 may convert each frame into frequency-domain coefficients and quantize the frequency-domain coefficients to generate a bit stream.

In block 1650, the information about the predicted head direction converted by the in-band signaling minimizer 1630 may be transmitted to the counterpart terminal device, together with the frames of the audio channels determined based on the predicted head direction. The information about the predicted head direction may be transmitted by being loaded to an RTP header of a packet to be transmitted to the counterpart terminal device.

Figure 21:
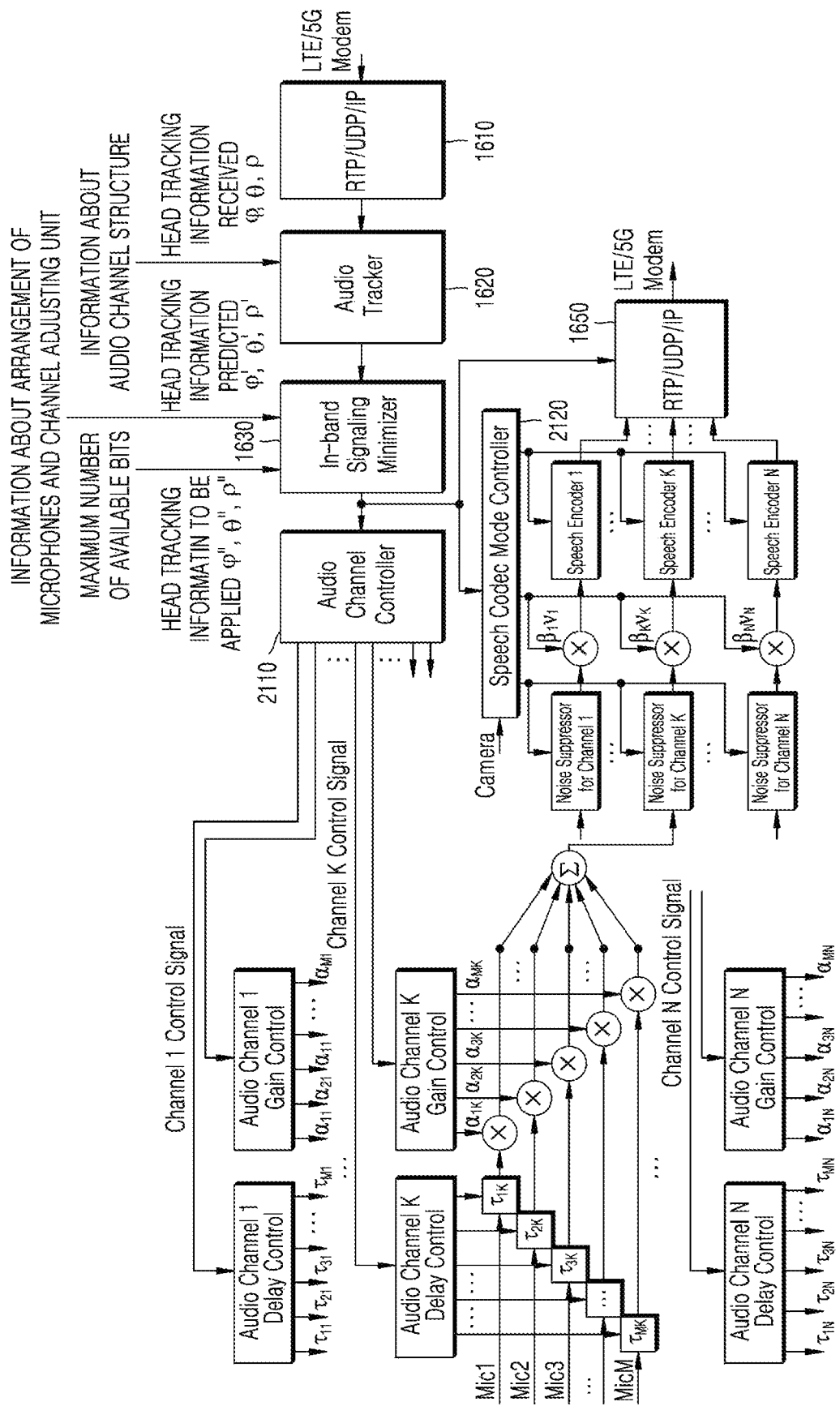
FIG. 21 illustrates a structure of a processor of a camera or a terminal device, according to an embodiment.

FIG. 21 illustrates a structure of the audio encoder 1640 of FIG. 16 in more detail.

An audio channel controller 2110 may construct the audio signals corresponding to the audio channels, respectively, by combining the input signals of the microphones based on the directions of the audio channels converted by the in-band signaling minimizer 1630. The audio channel controller 2110 may input the audio signal corresponding to each audio channel into a speech encoder. FIG. 21 illustrates a case in which audio signals corresponding to N audio channels are constructed from input signals received from M microphones. FIG. 21 illustrates the case in which the audio signals corresponding to the N audio channels are managed by a speech codec mode controller 2120.

Figure 22:
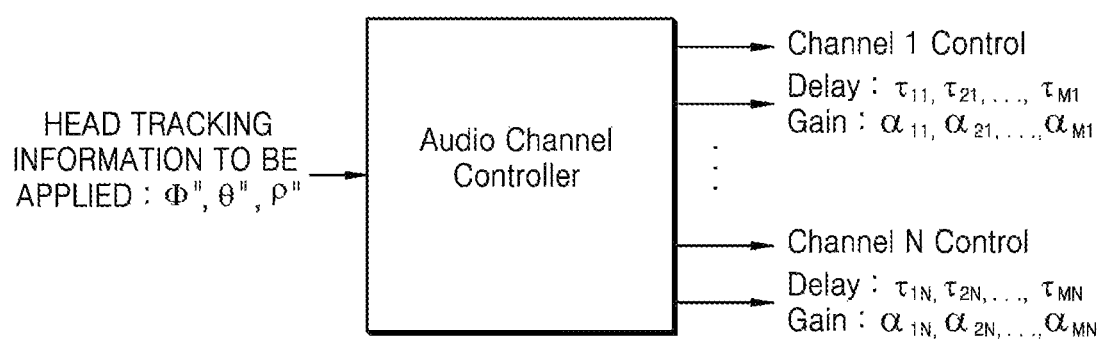
FIG. 22 is a view for describing an operation of an audio channel controller, according to an embodiment.

As illustrated in the example of FIG. 21, the audio channel controller 2110 may perform a beam forming operation to construct the audio signals corresponding to the directions of the audio channels. The beam forming operation denotes an operation of maximizing the magnitude of the audio signal in the direction of a corresponding audio channel by adjusting a delay and a gain of the input signals received from the microphones to construct the input signals of the audio channels. FIG. 21 illustrates an example in which delay-and-sum beam forming is used, as an example of the beam forming operation. As illustrated in FIG. 22, the audio channel controller 2110 may apply a high delay and a high gain to a microphone adjacent to the direction of the audio channel, thereby allowing the sound in the corresponding direction to be highly reflected.

As illustrated in FIG. 6, when the microphones are located on a side surface of a cylindrical structure, delays and gains with respect to a difference between the direction of the audio channel and the direction of the microphone may be set as shown in [Table 2]. When the microphones are located at the side surface of the cylindrical structure, only a yaw parameter may be transmitted as the head tracking information and reflected for constructing the channel. When the microphones are located in many directions of a spherical structure as in the case of the camera illustrated in FIG. 5, other parameters, such as a pitch parameter, etc., may have to be transmitted, in addition to the yaw parameter.

TABLE 2

| Yaw($\Phi$) | 0 | $\frac{360}{M}$ | $\frac{2*360}{M}$ | ... | 180 | ... | $\frac{(M-2)*360}{M}$ | $\frac{(M-1)*360}{M}$ | ... |
|---|---|---|---|---|---|---|---|---|---|
| Delay | $\tau_0$ | $\tau_1$ | $\tau_2$ | ... | $\tau_{M/2}$ | ... | $\tau_{M-2}$ | $\tau_{M-1}$ | ... |
| Gain | $\alpha_0$ | $\alpha_1$ | $\alpha_2$ | ... | $\alpha_{M/2}$ | ... | $\alpha_{M-2}$ | $\alpha_{M-1}$ | ... |

The audio channel controller 2110 may renew the beam forming operation of each audio channel according to a new head direction, when new head tracking information is received.

Each audio channel constructed by the audio channel controller 2110 may be input via a sound codec, such as EVS, etc., after going through noise suppression and channel gain adjustment. A speech codec mode controller 2120 may manage this process. The speech codec mode controller 2120 may determine whether or not to perform the noise suppression on each channel and may adjust the channel gain β, γ, by taking into account image content of the predicted head direction and hearing directionality In the noise suppression operation, signals not within a voice bandwidth are removed in order to increase the call quality by improving a signal to noise ratio of a voice signal. When the audio input signal is a background sound, music, etc., rather than a voice, the noise suppression may rather deteriorate the call quality. Thus, the terminal device according to an embodiment may suppress the noise when there is a human being capable of performing communication, in the predicted direction of the audio channel, and if not, may not use the noise suppression function.

The speech codec mode controller 2120 may analyze the content of the image in the direction of each audio channel, and when there is a human being capable of communication in the image, may use the noise suppression function, and if not, may minimize the noise suppression.

When a codec including both a voice compression core and an audio compression core, such as the EVS, is used, the speech codec mode controller 2120 may operate the codec in a voice mode for voice compression or in an audio mode for compression of a background sound, music, etc., based on the content of the image of the direction of the audio channel. The speech codec mode controller 2120 may not use functions for processing a voice signal, such as discrete transmission (DTX), noise suppression, etc., and may increase a bandwidth, with respect to the audio channels, for which the audio signals are compressed in the audio mode.

The speech codec mode controller 2120 may adjust the audio compression method by analyzing the head direction of the user of the HMD and the content of the image in the direction of each audio channel. The speech codec mode controller 2120 may analyze the content of the image of the direction of each audio channel, and when there is a human being capable of communication in the image, may compress the audio signal with respect to the corresponding audio channel in the voice mode. The speech codec mode controller 2120 may analyze the content of the image of the direction of each audio channel, and when there is no human being or two or more human beings capable of communication in the image, may compress the audio signal with respect to the corresponding audio channel in the audio mode.

Meanwhile, for a person having normal hearing, a front sound may be heard loudly and a rear sound or a sound in a direction corresponding to a blind spot of hearing may be heard less loudly. To mimic such hearing directionality, the speech codec mode controller 2120 may set a gain β of a channel of the head direction to be greater than a gain of the opposite direction or a gain of the direction corresponding to the blind spot of hearing. However, when it is determined that it is important to convey the voice information, the speech codec mode controller 2120 may even increase a gain γ of the audio channel which is not in the head direction, when a voice is compressed in the audio channel.

Figure 23:
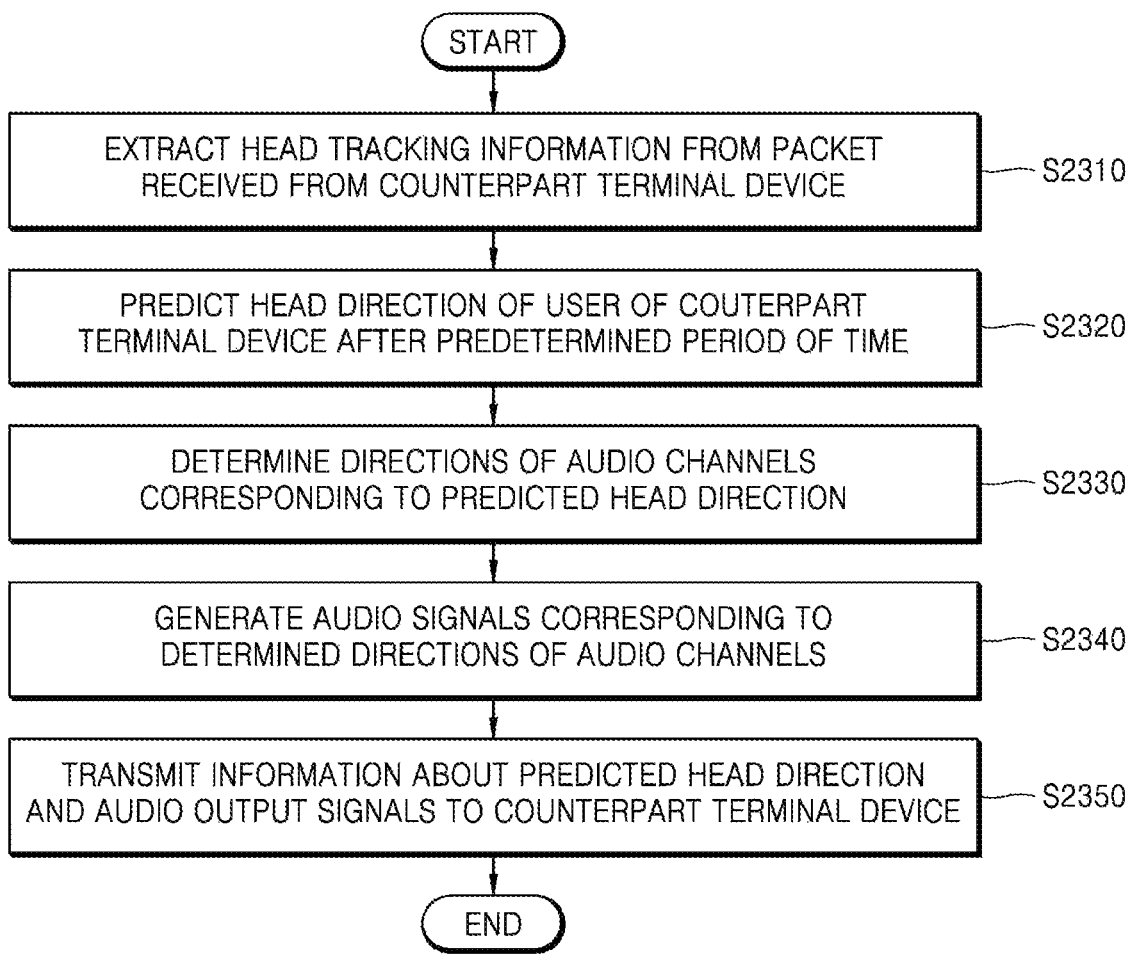
FIG. 23 is a flowchart of a method performed by a terminal device at the side of a camera to transmit audio output signals to a counterpart terminal device, according to an embodiment.

FIG. 23 is a flowchart of a method of transmitting audio output signals via a terminal device at the side of a camera to a counterpart terminal device, according to an embodiment. Hereinafter, each of operations of the method to be described hereinafter may be performed by each component of the terminal device at the side of the camera described in detail with reference to FIGS. 15A and 15B.

In operation S2310, the terminal device according to an embodiment may extract head tracking information of a user of the counterpart terminal device from a packet received from the counterpart terminal device.

The extracted head tracking information may be information constructed according to a predetermined format. The terminal device according to an embodiment may determine a format to transmit and receive information about a head direction, in an operation of negotiating a call condition with the counterpart terminal device. The terminal device may receive information about the maximum number of available bits from the counterpart terminal device, for determining the format of the information about the head direction. The terminal device may determine an angle parameter to indicate the information about the head direction and the number of bits allocated to the angle parameter, by taking into account received information about the maximum number of available bits. The terminal device may transmit information about the determined angle parameter and the determined number of bits to the counterpart terminal device.

When the format of the head tracking information determined by the terminal device is agreed to by the counterpart terminal device, the terminal device and the counterpart terminal device may exchange the head tracking information according to the determined format. The above descriptions with reference to FIG. 3 may be applied with respect to the operation of negotiating the call condition. The same descriptions will not be given.

The terminal device according to an embodiment may remove RTP/UDP/IP headers from the received packet and may extract the head tracking information from the RTP header. The head tracking information extracted from the RTP header may include the angle parameter of at least one of yaw, roll, and pitch or may include a coordinate of a gaze cursor.

The terminal device according to an embodiment may display the extracted head tracking information. Alternatively, the terminal device according to an embodiment may display a location of an eye sight of the user of the counterpart terminal device determined based on the extracted head tracking information. The terminal device according to an embodiment may enable natural virtual call by notifying the user of the terminal device about a current situation of the user of the counterpart terminal device.

In operation S2320, the terminal device according to an embodiment may predict a head direction of the user of the counterpart terminal device after a certain time period, based on the extracted head tracking information.

The terminal device may calculate the head direction after the certain time period by using the head tracking information extracted in operation S2310 and head tracking information extracted from packets previously received from the counterpart terminal device. The terminal device may predict a head direction after about T seconds by analyzing head tracking information received for recent L seconds. The terminal device may convert the calculated head direction into a predetermined number of bits.

In operation S2330, the terminal device according to an embodiment may determine directions of audio channels corresponding to the predicted head direction.

The terminal device may determine the direction of each audio channel according to a change in the head direction, based on an audio channel structure. The audio channel structure may include information about an angular difference between the direction of each audio channel and the head direction.

The terminal device may convert the predicted head direction and the determined directions of the audio channels into a predetermined format, based on information about the maximum number of available bits which may be used to indicate the head direction, an arrangement of the microphones, a channel adjusting unit, etc. The terminal device may convert the predicted head direction and the directions of the audio channels determined based on the predicted head direction into a limited number of bits in correspondence with the predetermined format.

In operation S2340, the terminal device according to an embodiment may generate audio output signals corresponding to the determine directions of the audio channels by combining audio input signals received through a plurality of channels.

The terminal device may generate the audio output signals corresponding to the directions of the audio channels by performing beam forming on the audio input signals. The terminal device may generate the audio output signals corresponding to N audio channels from the input signals received from M microphones. The terminal device may maximize the magnitude of the audio signal for the direction of each audio channel, by adjusting delays and gains of the audio input signals.

The terminal device may adjust a gain of the audio output signal corresponding to at least one of the audio channels, by taking into account the predicted head direction. The terminal device may set the gain of the audio output signal corresponding to the channel of the predicted head direction to be greater than gains of the audio output signals corresponding to the other channels.

The terminal device may analyze the content of an image in the direction of each audio channel, and when there is a human being capable of communication in the image, may use a noise suppression function, and when there is no such human being, may minimize the noise suppression. According to an embodiment, the terminal device may analyze the content of the image in the direction of each audio channel to select one of a voice mode and an audio mode. For example, when it is determined that the main content of an image transmission signal is a face of a human being, the terminal device may select the voice mode, and in the cases except for this case, may select the audio mode.

The terminal device may also increase the gain when a voice is compressed in the audio channel, even when the audio channel is not in the head direction. The terminal device may determine whether to compress the audio output signal corresponding to each audio channel in the voice mode or in the audio mode. The terminal device may increase a gain corresponding to the audio channel, for which the audio output signal is compressed in the voice mode. The terminal device may compress the audio output signal corresponding to each audio channel, based on the determined mode.

In operation S2350, the terminal device according to an embodiment may transmit information about the predicted head direction and the audio output signals to the counterpart terminal device. The terminal device according to an embodiment may transmit a sound frame in which the audio output signals are compressed to the counterpart terminal device. The information about the predicted head direction may be transmitted to the counterpart terminal device by being loaded to the RTP header of a packet to be transmitted to the counterpart terminal device.

Figure 24:
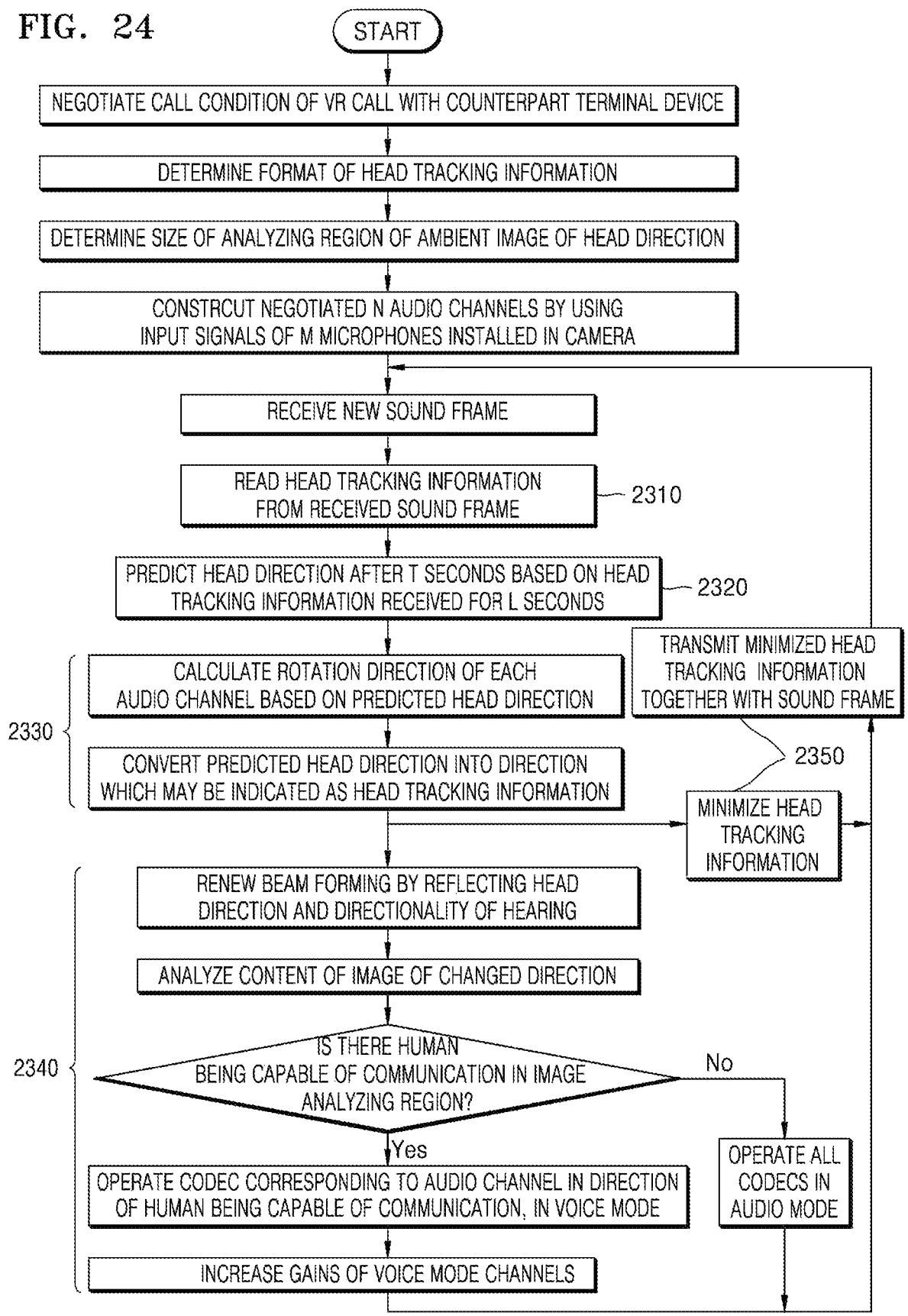
FIG. 24 is a flowchart of a method performed by a terminal device at the side of a camera to transmit audio output signals to a counterpart terminal device, according to an embodiment.

FIG. 24 is a flowchart of a method performed by a terminal device at the side of a camera to transmit audio output signals to a counterpart terminal device, according to an embodiment.

The terminal device according to an embodiment may negotiate a call condition when a virtual reality call is started with the counterpart terminal device. The terminal device may determine a format of head tracking information in the operation of negotiating the call condition.

The terminal device may determine a size of an analyzed region to analyze a peripheral image corresponding to a head direction. The terminal device may construct N audio channels determined in the operation of negotiating the call condition, by using audio input signals through M microphones installed in the camera. When a new sound frame is received, the terminal device may read the head tracking information from the received sound frame. The terminal device may predict a head direction after T seconds based on the head tracking information received for L seconds.

The terminal device may calculate a rotation direction of each audio channel based on the predicted head direction. The terminal device may convert the predicted head direction into a predetermined format. The terminal device may minimize the amount of information about the head direction, by converting the predicted head direction into a limited number of bits.

The terminal device may renew beam forming by taking into account the predicted head direction and hearing directionality. The terminal device may adjust a gain applied to the audio output signal by taking into account the predicted head direction and the hearing directionality.

The terminal device may analyze a peripheral image corresponding to the converted head direction. When there is a human being capable of communication in the analyzed region, the terminal device may compress the audio signal of the audio channel in the direction in which there is the human being capable of communication, in a voice mode. When there is no human being capable of communication in the analyzed region, the terminal device may compress the audio signal of the audio channel corresponding to the analyzed region, in an audio mode. The terminal device may increase a gain of the audio signal corresponding to the audio channel, with respect to which the audio signal is compressed in the voice mode.

The terminal device may transmit the minimized head tracking information together with the compressed sound frame.

As illustrated in FIG. 1, the immersive multimedia system according to an embodiment may include the camera specialized for capturing the sound and the image and the HMD specialized for outputting the sound and the image. The terminal device at the side of the HMD may receive the audio signal transmitted from the terminal device at the side of the camera and listen to this audio signal through a speaker or a headphone. Together with the audio signal, the terminal device at the side of the HMD may receive direction information used by the terminal device at the side of the camera to generate the corresponding audio signal.

Figure 25A:
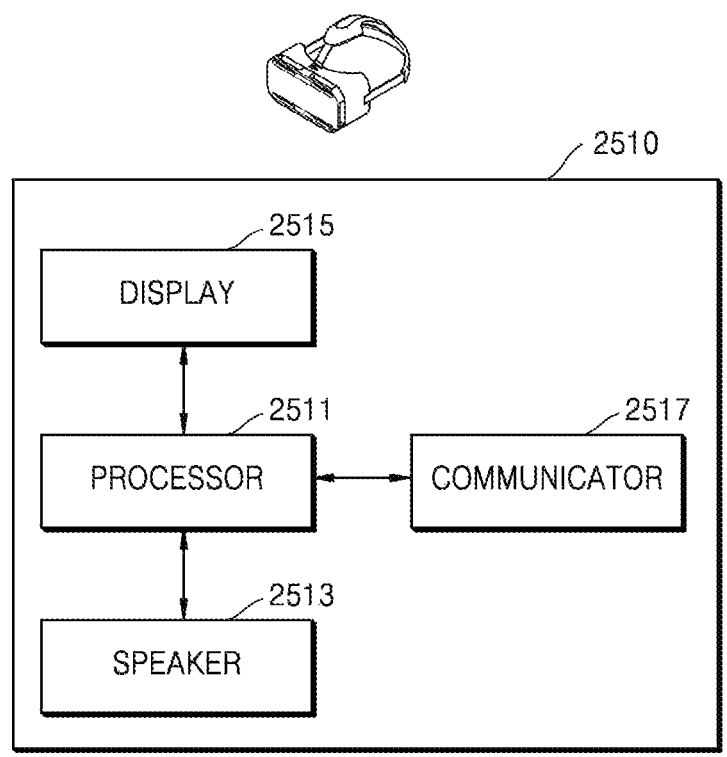
FIG. 25A is a block diagram of a structure of a head-mounted display (HMD) according to an embodiment.

FIG. 25A is a block diagram of an HMD according to an embodiment.

An HMD 2510 included in an immersive multimedia system according to an embodiment may be a terminal device directly performing mobile communication.

A processor 2511 may extract head tracking information, a sound frame, and a video frame from a packet received from a counterpart terminal device. The processor 1511 may determine a format in which the head tracking information is to be transmitted or received, in an operation of negotiating a call condition with the counterpart terminal device.

The processor 2511 may determine information about a head direction of a user of the terminal device and compare the extracted head tracking information with the measured head direction information. The processor 2511 may measure the head direction of the user based on information sensed from a motion sensor (not shown). The processor 2511 may correct audio signals included in the sound frame based on a result of the comparison.

A speaker 2513 may output audio signals received from the counterpart terminal device. The speaker 2513 may output the audio signals corrected by the processor 2511. A display 2515 may output the video frame. For example, the display 2515 may include a near-to-eye display configured to display an image within several centimeters from eyes of a user.

A communicator 2517 may transmit the determined information about the head direction to the counterpart terminal device. The communicator 2517 may receive information about directions of audio channels arranged on a three-dimensional space, from the counterpart terminal device. The communicator 2517 may receive audio signals and an image signal corresponding to the directions of the audio channels.

The processor 2511 may control the communicator 2517, the speaker 2513, and the display 2515 to output the audio signals received from the counterpart terminal device.

Figure 25B:
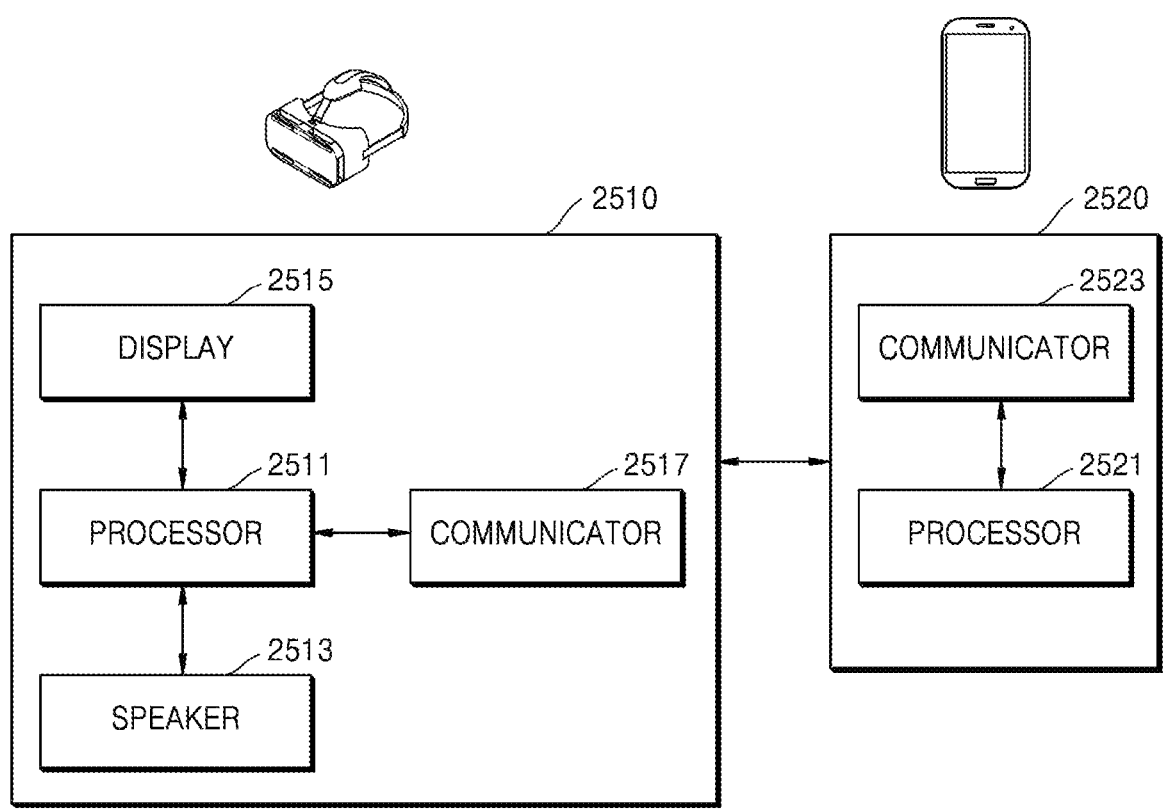
FIG. 25B is a block diagram of an HMD and a terminal device, according to an embodiment.

FIG. 25B is a block diagram of a camera and a terminal device, according to an embodiment.

An HMD 2510 included in an immersive multimedia system according to an embodiment may operate in interconnection with a terminal device 2520.

Here, the terminal device 2520 operating in interconnection with the HMD 2510 may include a processor 2521 and a communicator 2523. Although omitted in FIG. 25B, the terminal device 2520 may be included in the terminal device 1400 illustrated in FIG. 14A. Thus, the descriptions with respect to FIGS. 14A, 14B, and 25A may be applied with respect to FIG. 25B. The same descriptions will not be given.

The processor 2521 may extract head tracking information, a sound frame, and a video frame from a packet received from a counterpart terminal device. The processor 2521 may determine information about a head direction of a user of the terminal device and compare the extracted head tracking information with the determined information about the head direction. The processor 2521 may correct audio signals included in the sound frame, based on a result of the comparison. The processor 2521 may determine the information about the head direction of the user based on information about motion of the user sensed by the HMD 2510. The processor 2521 may control generation operations of the terminal device 2520.

FIGS. 14A, 14B, 15A, 15B, 25A, and 25B illustrate one processor. However, embodiments are not limited thereto. Functions and operations of the processor described above may be performed by two or more processors.

A communicator 2523 may transmit the corrected audio signals and the video frame to the HMD 2510 connected to the terminal device 2520. The HMD 2510 may output to the user the corrected audio signals and the video frame received from the terminal device 2520. The communicator 2523 may transmit the determined information about the head direction to the counterpart terminal device.

The communicator 2523 may receive information about directions of audio channels arranged on a three-dimensional space from the counterpart terminal device. The communicator 2523 may receive audio signals and an image signal corresponding to the directions of the audio channels from the counterpart terminal device. The communicator 2523 may transmit the audio signals and the image signal to the HMD 2510 connected to the terminal device 2520.

Figure 26:
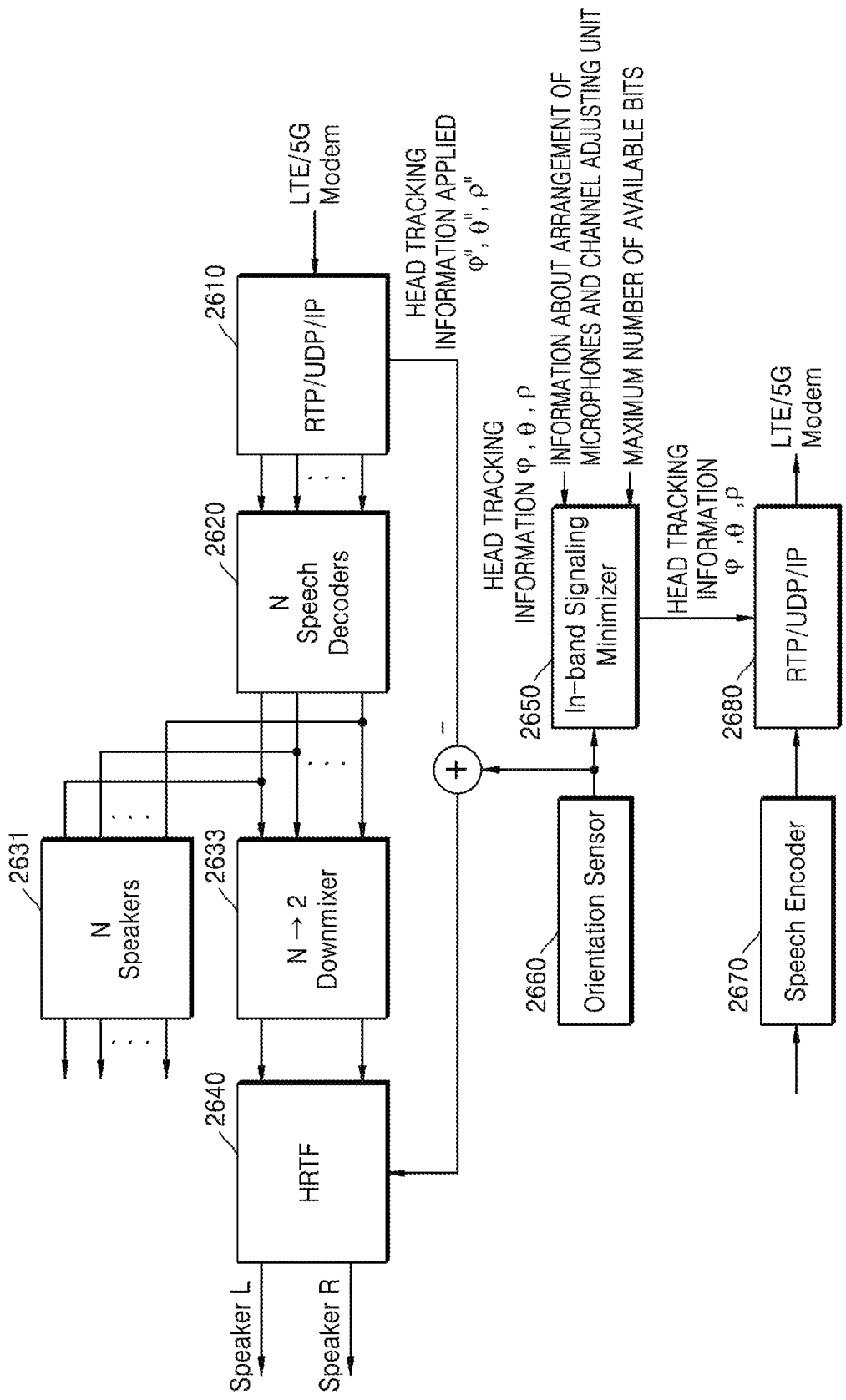
FIG. 26 illustrates a structure of a processor of an HMD or a terminal device, according to an embodiment.

FIG. 26 is a view for describing an operation of a terminal device at the side of an HMD, according to an embodiment.

In block 2610, the terminal device may remove RTP/UDP/IP headers from a packet received from a counterpart terminal device and extract head tracking information from the RTP header. The terminal device may receive the packet from LTE or a 5G modem. The head tracking information extracted from the RTP header may include at least one of angle parameters of yaw, roll, and pitch, or may include a coordinate of a gaze cursor.

An N speech decoder 2620 may extract audio signals from the received packet and decode the audio signals. The N speech decoder 2620 may extract the audio signals with respect to N audio channels from the received packet and decode the audio signals.

The terminal device may obtain sound frames of the N channels and output the obtained sound frames by using various methods.

When the audio signal is output via a headphone, first, the terminal device may downmix the N channels into two channels. FIG. 26 illustrates an N→2 downmixer 2633 configured to downmix the N channels into two channels.

The terminal device may compare the transmitted head tracking information with information about a current head direction measured by an orientation sensor 2660. The terminal device may correct a difference between the transmitted head direction and the current head direction by using a head-related transfer function (HRTF) 2640. The HRTF is a digital filtering method to adjust directionality of an audio signal in correspondence with a head direction of a listener. The terminal device may output the transmitted audio signals by rotating the audio signals based on the difference between the directions.

When the audio signals are output through N speakers 2631, the terminal device may output the audio signal of each of the N channels via the speakers corresponding to the channels, respectively.

An in-band signaling minimizer 2650 may convert the current head direction measured by the orientation sensor 2660 into an available direction. The in-band signaling minimizer 2650 may convert the current head direction measured by the orientation sensor 2660 into the direction which may be practically applied and indicated, based on information about the maximum number of available bits which may be used to indicate the head direction, an arrangement of microphones, audio channel adjustment units, etc.

A block 2680 may transmit the head tracking information converted by the in-band signaling minimizer 2650 together with the audio signals compressed by a speech encoder 2670 to the counterpart terminal device. The converted head tracking information may be transmitted to the counterpart terminal device by being loaded to the RTP header of a packet to be transmitted to the counterpart terminal device.

Figure 27:
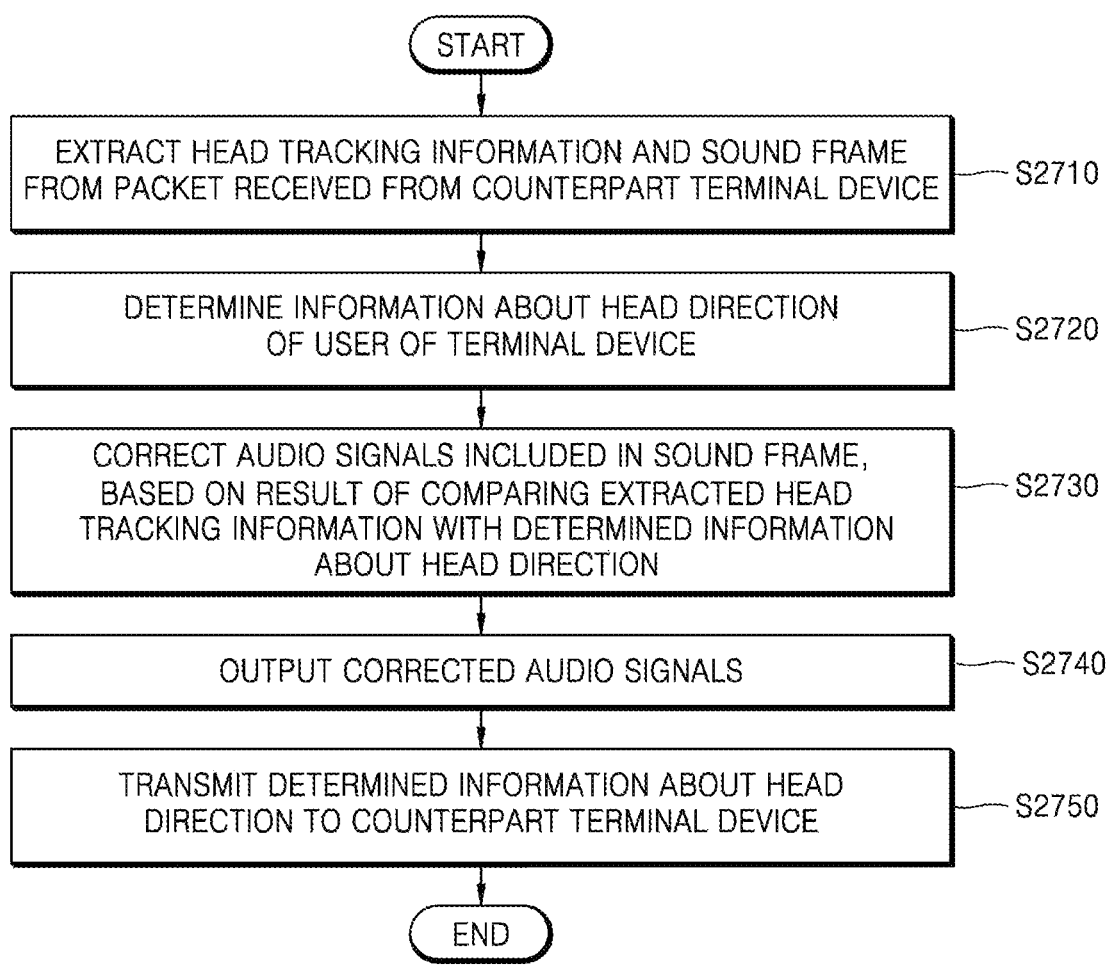
FIG. 27 is a flowchart of a method performed by a terminal device at the side of an HMD to output an audio signal received from a counterpart terminal device, according to an embodiment.

FIG. 27 is a flowchart of a method performed by a terminal device at the side of an HMD to output audio signals received from a counterpart terminal device, according to an embodiment. Each of operations described hereinafter may be performed by each of the components of the terminal device at the side of the HMD described in detail with reference to FIGS. 25A and 25B.

FIG. 27 illustrates a process in which the terminal device at the side of the HMD receives sound frames compressed by a terminal device at the side of a camera and head tracking information used to compress the sound frames and outputs the received sound frames.

In operation S2710, the terminal device according to an embodiment may extract the head tracking information and the sound frames from a packet received from the counterpart terminal device.

The terminal device according to an embodiment may separate RTP/UDP/IP headers from the packet received from LTE or a 5G modem and obtain the sound frames of N channels.

The extracted head tracking information may be information constructed based on a predetermined format. The terminal device according to an embodiment may determine the format in which information about a head direction is to be transmitted and received, in an operation of negotiating a call condition. The terminal device may transmit information about the maximum number of available bits to the counterpart terminal device, for determining the format of the information about the head direction. The terminal device may receive information about an angle parameter to indicate the information about the head direction and the number of bits allocated to the angle parameter, from the counterpart terminal device.

When the format of the information about the head direction, transmitted by the counterpart terminal device, is agreed to by the terminal device, the terminal device and the counterpart terminal device may exchange the information about the head direction based on the determined format. With respect to the call condition negotiation, the above descriptions with respect to FIG. 3 may be applied. The same descriptions will not be given.

In operation S2720, the terminal device according to an embodiment may determine the information about the head direction of the user of the terminal device.

The terminal device may sense the head direction of the user and may convert the sensed result into a predetermined number of bits. The terminal device may convert the current head direction measured by an orientation sensor into a limited number of bits based on information about the maximum number of available bits which may be used to indicate the head direction, an arrangement of microphones, a channel adjusting unit, etc.

The terminal device may sense a head direction corresponding to the angle parameter determined to indicate the information about the head direction in the operation of negotiating the call condition. The terminal device may convert the sensed result into a number of bits allocated to the angle parameter in the operation of negotiating the call condition. The information about the head direction measured by the orientation sensor may be converted into a minimized format by an inband signal minimizer block, which is the same as the in-band signaling minimizer 1630 described with reference to FIG. 16.

In operation S2730, the terminal device according to an embodiment may correct the audio signals included in the sound frame, based on a result of comparing the extracted head tracking information with the determined information about the head direction.

The terminal device may correct a difference between the extracted head direction and the determined head direction by using an HRTF. The terminal device may output the audio signals included in the sound frame extracted in operation S2710, by rotating the audio signals based on a difference between the extracted head direction and the determined head direction.

In operation S2740, the terminal device according to an embodiment may output the corrected audio signals.

When the terminal device according to an embodiment outputs the corrected audio signals through a headphone, first, the terminal device may downmix N channels into two channels, and may output the downmixed signals. When the terminal device according to an embodiment outputs the corrected audio signals through N channel speakers, the terminal device may output each of the N channel audio signals through each of the speakers in corresponding directions.

In operation S2750, the terminal device according to an embodiment may transmit the determined information about the head direction to the counterpart terminal device.

The terminal device may transmit the information about the head direction converted into the minimized format by the inband signal minimizer block in operation S2720, together with the sound frame generated by the terminal device.

As described above in detail, one or more embodiments provide the method of managing interconnection between the devices for the immersive multimedia communication, such as the camera, the HMD, etc., and the terminal devices. According to an embodiment, as the head direction of the user of the HMD is changed, an image to be watched may be changed, and the sound corresponding to the changed image may be listened to. Also, according to an embodiment, when the sound of an interest direction of the user of the HMD is a voice, the sound may be vividly heard, and when the sound of an interest direction is a background music, the sound may be realistically heard, to maximize the call quality.

Figure 28:
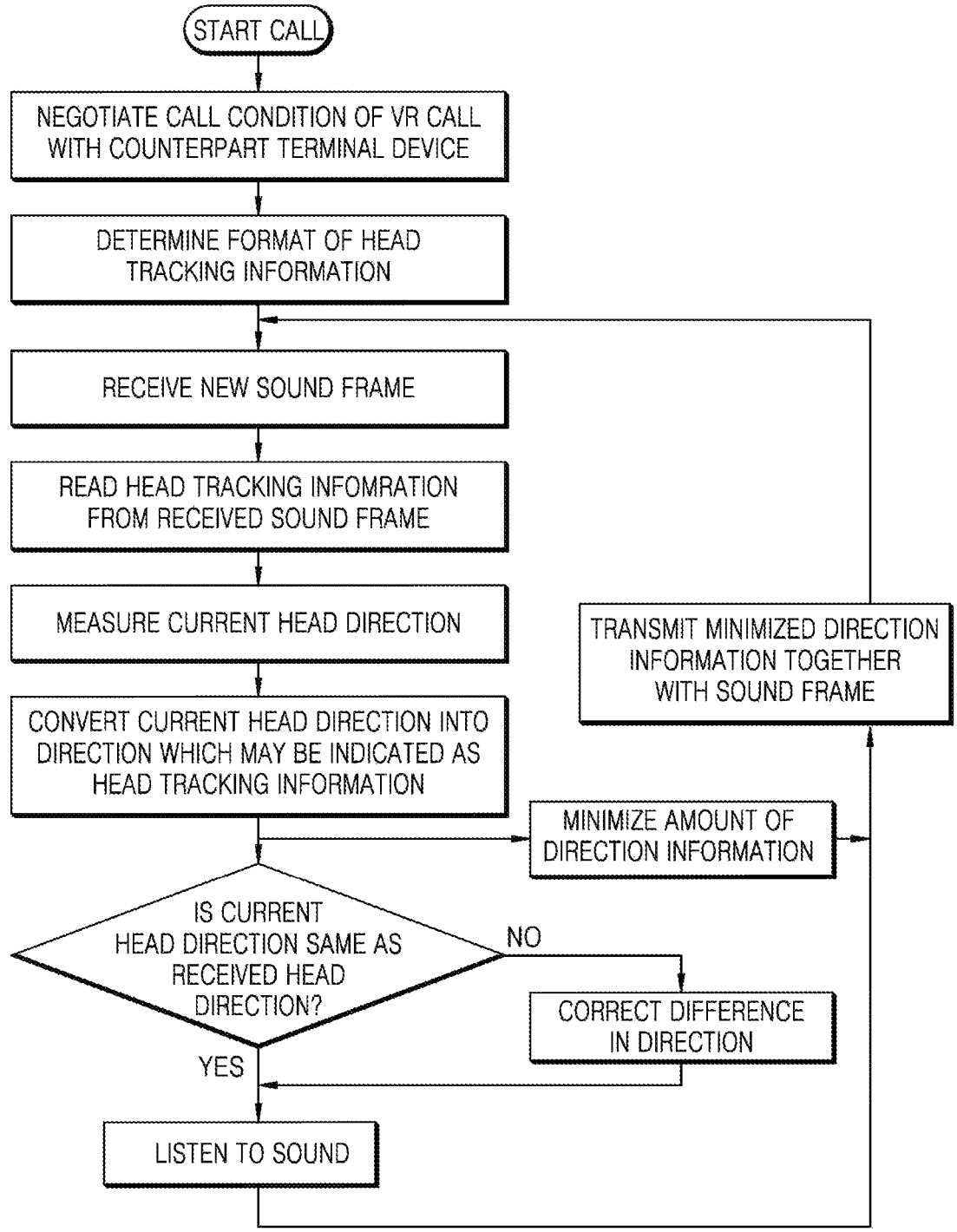
FIG. 28 is a flowchart of a method performed by a terminal device at the side of an HMD to output an audio signal received from a counterpart terminal device, according to an embodiment.

FIG. 28 is a flowchart of a method performed by a terminal device at the side of an HMD to output an audio signal received from a counterpart terminal device, according to an embodiment.

The terminal device according to an embodiment may negotiate a call condition when a virtual reality call is started with the counterpart terminal device. The terminal device may determine a format of head tracking information when the call condition is negotiated.

When a new sound frame is received, the terminal device may read the head tracking information from the received sound frame. The terminal may measure a current head direction of a user. The terminal device may convert the current head direction into a predetermined format. The terminal device may convert the measured head direction into a limited number of bits, thereby minimizing the amount of information about the measured head direction.

The terminal device may compare the converted information about the head direction with the received head tracking information. When the converted information about the head direction is the same as the received head tracking information, the terminal device may output an audio signal included in the received sound frame. When the converted information about the head direction is different from the received head tracking information, the terminal device may correct the audio signal based on the difference. The terminal device may output the corrected audio signal.

The terminal device may transmit the minimized information about the head direction information together with a compressed sound frame.

Meanwhile, in immersive multimedia communication in which capturing or presenting a sound and a video is performed in a three-dimensional structure rather than a flat surface, audio channels may be required to be efficiently arranged on a three-dimensional space, due to a limited structure of the terminal device, limited bit rates, a correlation between the sound and the image, etc.

In the general multimedia communication system, an SDP message to determine a method of compressing and packetizing the media may be exchanged between the terminal devices.

For example, terminal device A propose to terminal device B that a sound stream including 6 audio channels compressed at 24.4 kbps by using an EVS codec may be transceived at up to 211 kbps and a video stream compressed at a resolution of 4K or 1080p by using an HEVC codec may be transceived at up to 15 mbps. With respect to this proposal, terminal device B may respond to accept the sound stream and the video stream that are proposed, under a condition in which the number of bilateral sound channels is reduced to 4, sound bit rates are reduced from 211 kbps to 146 kbps, and video bit rates are reduced from 15 Mbps to 10 Mbps.

In a multimedia call system according to the related art, it may be assumed that an SDP message exchanged between two terminal devices does not include information about the directions of the audio channels and the audio channels are arranged at uniform intervals. For example, when audio signals with respect to 6 audio channels are transceived, it may be assumed that the audio channels are arranged at an interval of 60 degrees, and when audio signals with respect to 4 audio channels are transceived, it may be assumed that the audio channels are arranged at an interval of 90 degrees.

However, when microphones or speakers are not arranged at uniform intervals in 360 degrees omnidirectionally, as in the case in which the microphones or the speakers are arranged on each surface of a terminal device having a regular hexahedron shape, this assumption may not be appropriate.

Also, as illustrated in FIG. 29, it may not be required to transmit the sound or the image of all 360-degree directions.

An image 2901 of FIG. 29 illustrates a scene in which a person wearing a camera configured to capture all 360-degree directions is positioned before a moderator of an event. When sounds and images of the moderator and the participants are the object of the capturing, a sound or an image of the person wearing the camera may not be required to be captured and transmitted.

An image 2902 of FIG. 29 illustrates an example of an image captured with respect to all directions in 360 degrees. As illustrated in the image 2902 of FIG. 29, an image in the middle may be significantly distorted in an image stitching operation, in which images input through lenses in front and rear directions are combined to construct a piece of 360-degree image. Thus, the terminal device according to an embodiment may compress an image of an angle equal to or less than 360-degrees to reduce distortion occurring at the angle of 360-degrees. Also, when compressing the image of the angle less than 360-degrees, the terminal device may use reduced bit rates than when compressing the image of the angle of 360-degrees. Thus, the terminal device may allocate the bit rates reduced by compressing the image of the angle less than 360-degrees, for the image of the angle less than 360-degrees, to increase the quality of the image.

Accordingly, one or more embodiments provide the method, whereby an FOV of an image in the immersive multimedia communication system may be efficiently adjusted and the audio channels may be efficiently arranged on a three-dimensional space.

Figure 30:
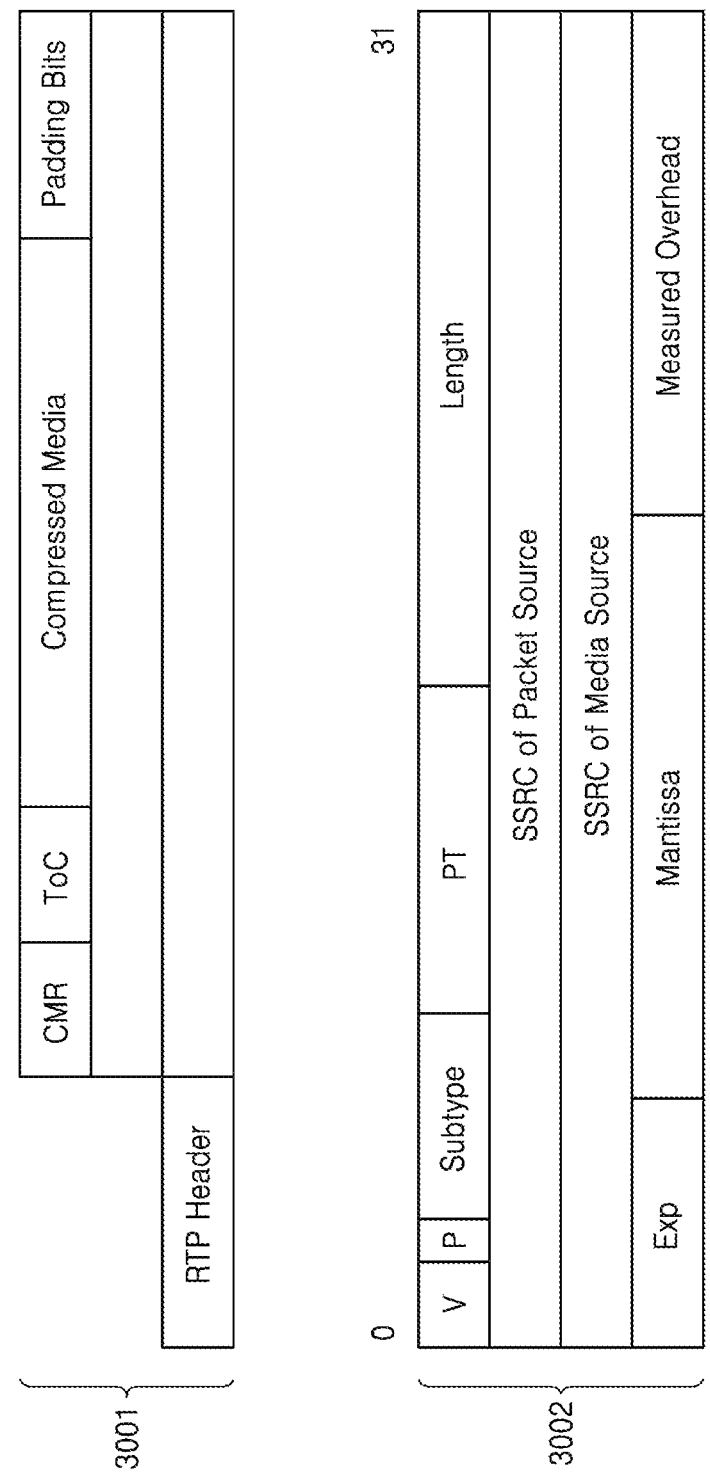
FIG. 30 illustrates structures of a codec mode request (CMR) message and a temporary maximum media bit-rate request (TMMBR) message, according to an embodiment.

FIG. 30 illustrates structures of a codec mode request (CMR) message and a temporary maximum media bit rate request (TMMBR) message, according to an embodiment.

An image 3001 of FIG. 30 illustrates the structure of the CMR message provided by codecs, such as AMR, AMR-WB, EVS, etc.

A table of content (ToC) byte including information about a bit rate currently applied is located, ahead of a compressed sound frame. A CMR byte located ahead of the ToC byte includes bit rate information requested from a counterpart terminal device. The codecs, such as the AMR, the AMR-WB, the EVS, etc., may operate at limited bit rates. The limited bit rates at which the codecs may operate may be indicated as an integer including 0.

A terminal device according to an embodiment may request the counterpart terminal device to reduce a bit rate by transmitting the CMR message to the counterpart terminal device, when it is determined that it is difficult to maintain a current bit rate because a data transmission condition is deteriorated. The terminal device may request again the counterpart terminal device to increase the reduced bit rate to its previous condition when the data transmission situation is improved.

An image 3002 of FIG. 30 illustrates the structure of the TMMBR message.

The terminal device according to an embodiment may determine that an error occurs on a path on which data is transmitted, when a situation continues, in which a bit rate of the image, the bit rate being determined in an operation of negotiating a call condition, is not maintained. The terminal device may request the counterpart terminal device to reduce the bit rate by transmitting the TMMBR message to the counterpart terminal device. The bit rate may be indicated by using a Mantissa field and an Exp field in the TMMBR message. For example, the terminal device may request the counterpart terminal device to reduce the bit rate to Mantissa·$2^{Exp}$ bps.

In the case of a multi-dimensional image signal, when the bit rate is reduced, a resolution of the image may also have to be reduced. The resolution of the image may be determined in the operation of negotiating the call condition, by using an imageattr parameter included in the SDP message.

The method of exchanging the CMR message and the TMMBR message in the multimedia communication, according to the related art, has a limit that it is not able to properly solve the problem occurring when a transmission state is deteriorated in the immersive multimedia communication in which multichannel sounds arranged on a three-dimensional space and an image of a wide FOV are transmitted.

According to the related art, when the terminal device transceives multi-channel audio signals, one CMR, ToC of a plurality of channels, and sound frames may be located in one RTP packet. Thus, the terminal device according to the related art may transmit only one CMR to a counterpart terminal device configured to transmit sound frames through a plurality of audio channels. Thus, the bit rate requested by the terminal device according to the related art has the problem in which the bit rate is uniformly applied to all audio channels.

The terminal device according to an embodiment may use the method, whereby the bit rate of an audio channel in an interest direction is maintained, while the bit rates of other audio channels are reduced, when it is difficult to maintain the bit rates of all of the audio channels located in various directions. According to an embodiment, deterioration of the call quality experienced by the user of the terminal device may be reduced, compared to the case in which the bit rates of all of the channels are uniformly reduced.

Meanwhile, when the transmission situation of the image is deteriorated, the terminal device according to an embodiment may adjust the bit rate, or may use the method of adjusting the resolution of the image through renegotiation of the call condition. Alternatively, the terminal device according to an embodiment may use a method of temporarily narrowing an FOV of a wide angle image (for example, the image of all 360-degree directions). When it is difficult to maintain the bit rate of the image of all directions, the terminal device according to an embodiment may reduce the FOV to allocate the bit rate to the image of an interest direction of the user in a concentrated fashion. According to an embodiment, deterioration of the call quality experienced by the user of the terminal device may be reduced, compared to the case in which the quality of the image of all directions is uniformly reduced.

FIG. 31 is a view for describing a method of adjusting an FOV of an image and directions of audio channels transmitted to a terminal device at the side of an HMD, according to an embodiment.

An image 3101 of FIG. 31 illustrates an example of a 360-degree camera used in an immersive multimedia communication system.

An image 3102 of FIG. 31 illustrates an FOV of an image which may be provided by a camera of the image 3101 of FIG. 31 and directions of audio channels which may be arranged on a three-dimensional space.

According to an embodiment, in order to perform immersive multimedia communication, a terminal device at the side of a camera may precisely indicate a geometric structure for compressing a sound and an image by a sound codec and an image codec installed in the terminal device at the side of the camera and may transmit the geometric structure to the terminal device at the side of the HMD. The image 3012 of FIG. 31 mathematically indicates an image compression region and the directions of the audio channels of the spherical camera illustrated in the image 3101 of FIG. 31.

The image 3102 of FIG. 31 indicates the image of all directions and all of maximum 8 audio channels which may be provided by the camera. However, according to an embodiment, according to necessity or in order to reduce a bit rate, the FOV of the image and the number of audio channels may be reduced as shown in an image 3103 of FIG. 31.

The terminal device according to an embodiment may determine the number of audio channels arranged on the three-dimensional space, a bit rate allocated to each audio channel, and the directions of the audio channels, as illustrated in the image 3103 of FIG. 31. The terminal device may determine the number of audio channels, the bit rate allocated to each audio channel, and the directions of the audio channels, by taking into account the total bit rates allocated to the audio signals.

Also, the terminal device according to an embodiment may determine the number of audio channels, the bit rate allocated to each audio channel, and the directions of the audio channels, by taking into account an ambient sound environment of the terminal device.

In order to indicate the FOV of the image and the directions of the audio channels, the terminal device according to an embodiment may define SDP parameters based on a cylindrical or spherical coordinate system illustrated in FIG. 7 as shown in Table 3, and may use the defined parameters in an operation of negotiating a call condition.

TABLE 3

| Parameter | Definition |
| --- | --- |
| aoa | angle of audio(directions of audio channels (angles)) indicate the directions of the audio channels in the format of lati = [angle1 angle2 . . . angleN], longi = [angle1 angle2 . . . angleN] used when two or more audio channels are used |
| aov | angle of video(a range of the image (angle)) indicate an FOV of the image in the format of lati = [begin end], longi = [begin end] e.g.: lati = [90 −90], longi = [0 240] transmit the image of upward, downward, right, and left 360-degree directions, when there are no parameters of lati, longti |
| lati | latitude latitude (used in a spherical coordinate system) maximum range [90 −90] |
| longi | longitude longitude (used in a spherical coordinate system and a cylindrical coordinate system) maximum range [0 360] |
| spherical | use/support a spherical coordinate system |
| cylindrical | use/support a cylindrical coordinate system |
| rotate | may be used together with aoa, aov 0: the audio channel direction or the image range is fixed 1: the audio channel direction or the image range is rotated according to a movement of the head direction |

In [Table 3], when rotate=0, the audio signal may be rendered by a reception terminal, and higher order ambisonics (HOA)-based operations may be possible. When rotate=0, the head tracking information may be used only for video signals.

In [Table 3], when rotate=1, the audio channel direction or the image range may be rotated according to the movement of the head direction. When a negotiated call condition includes rotate=1, and the image is a partial image having the FOV equal to or less than 360-degrees, the camera may provide the image in a direction corresponding to a rotated head direction to the HMD, as the head direction of the user of the HMD is rotated.

The terminal device according to an embodiment may indicate the FOV of the image and directions of the audio channels by using the parameters defined in [Table 3]. The terminal device according to an embodiment may separately adjust the bit rate of each audio channel and adjust the FOV of the image, thereby minimizing the effect of such change on the call quality and maximize the call quality, against a change in a channel situation.

Figure 32A:
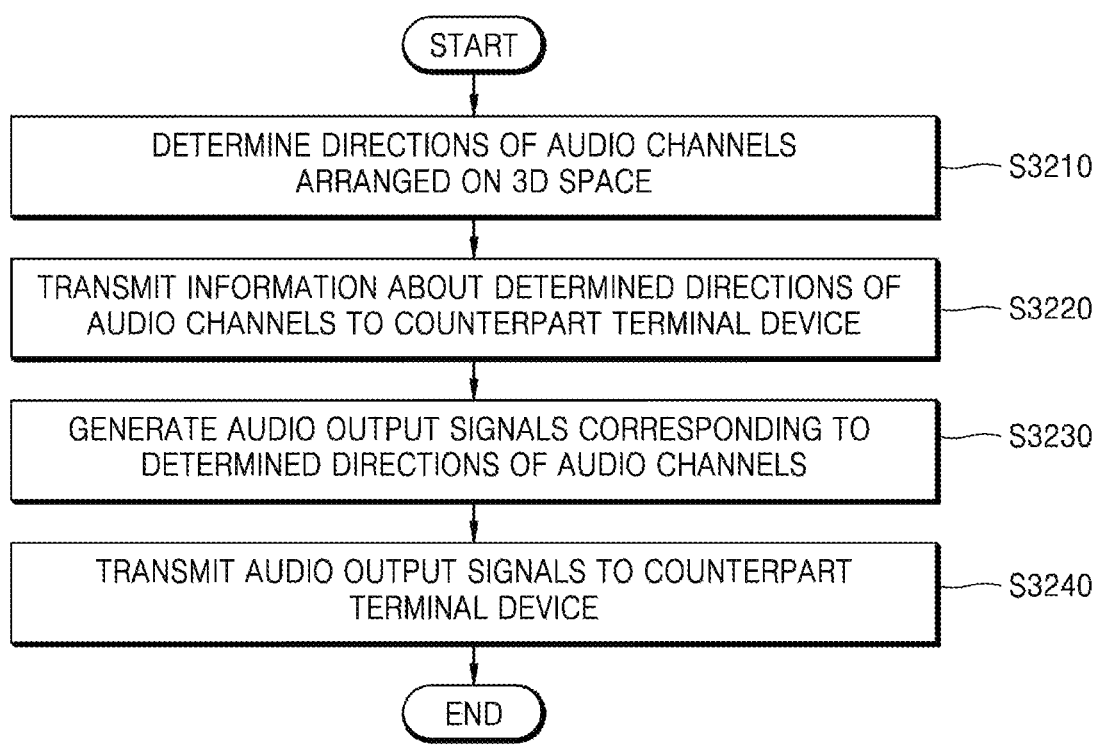
FIG. 32A is a flowchart of a method performed by a terminal device to transmit an audio signal to a counterpart terminal device, according to an embodiment.

FIG. 32A is a flowchart of a method performed by a terminal device to transmit an audio signal to a counterpart terminal device, according to an embodiment. Each of operations of the method described hereinafter may be performed by each component of the terminal device at the side of the camera described in detail with reference to FIGS. 15A and 15B.

In operation S3210, the terminal device according to an embodiment may determine directions of audio channels arranged on a three-dimensional space.

According to an embodiment, the terminal device may receive information about types of one or more available coordinate systems from the counterpart terminal device before determining the directions of the audio channels. The terminal device may select one of the types of the one or more available coordinate systems.

The terminal device may receive information about at least one of the type of the available coordinate system, the number of audio channels which may be received, and the maximum number of available bits, from the counterpart terminal device, before determining the directions of the audio channels. The terminal device may determine the directions of the audio channels based on the information received from the counterpart terminal device.

According to an embodiment, the terminal device may determine the directions of the audio channels based on at least one of arrangement of a plurality of microphones on a surface of the camera, ambient sound environment of the camera, an FOV of an image transmitted to the counterpart terminal device, and an available maximum bit rate, in the operation of negotiating the call condition. Also, the terminal device may determine at least one of the number of audio channels and a bit rate allocated to each audio channel, based on at least one of the arrangement of the plurality of microphones on the surface of the camera, the ambient sound environment of the camera, the FOV of the image transmitted to the counterpart terminal device, and the available maximum bit rate.

Also, the terminal device according to an embodiment may receive the available maximum bit rate which may be used to transmit the image to the counterpart terminal device, from the counterpart terminal device, before determining the directions of the audio channels. The terminal device may determine the FOV of the image transmitted to the counterpart terminal device, based on the available maximum bit rate which may be used to transmit the image. The terminal device may determine the directions of the audio channels based on the FOV of the image.

The terminal device according to an embodiment may receive information about the maximum number of available bits which may be used to transceive information about a head direction and information about whether the directions of the audio channels have to be rotated when the head direction is rotated, from the counterpart terminal device, before determining the directions of the audio channels. The terminal device may determine an angle parameter to indicate the information about the head direction, based on the received information. The terminal device may determine the number of bits allocated to the angle parameter based on the information about the maximum number of bits.

In operation S3220, the terminal device according to an embodiment may transmit information about the directions of the audio channels determined in operation S3210 to the counterpart terminal device.

The information about the determined directions of the audio channels may include angle values indicating the determined directions of the audio channels.

The terminal device according to an embodiment may transmit the angle values indicating the directions of the audio channels determined in operation S3210, based on a type of coordinate system selected from types of one or more available coordinate systems. The terminal device may transmit information about the selected type of coordinate system together with the information about the directions of the audio channels to the counterpart terminal device.

The terminal device according to an embodiment may transmit information about the FOV of the image together with the information about the FOV of the image and the directions of the audio channels to the counterpart terminal device.

In operation S3230, the terminal device according to an embodiment may combine audio input signals received through a plurality of microphones to generate audio output signals corresponding to the determined directions of the audio channels.

The terminal device according to an embodiment may convert a sound codec for compressing the audio output signals into a voice mode or an audio mode, according to the content of the image in the direction of each audio channel.

In operation S3240, the terminal device according to an embodiment may transmit the audio output signals to the counterpart terminal device. The terminal device according to an embodiment may transmit a sound frame in which the audio output signals are compressed to the counterpart terminal device. The audio output signals received by the counterpart terminal device may be output via a decoding process.

Figure 32B:
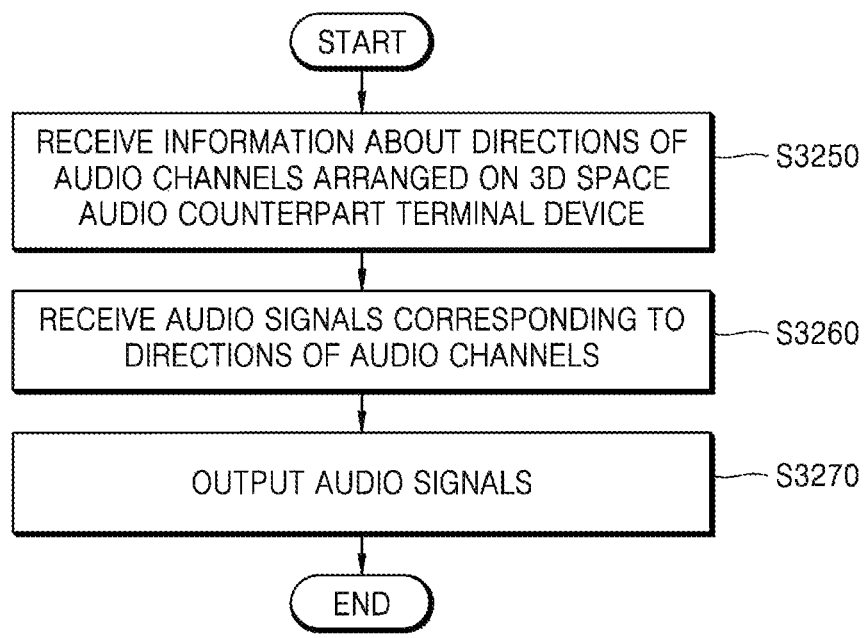
FIG. 32B is a flowchart of a method performed by a terminal device to output an audio signal received from a counterpart terminal device, according to an embodiment.

FIG. 32B is a flowchart of a method performed by a terminal device to output an audio signal received from a counterpart terminal device, according to an embodiment. Each of operations of the method described hereinafter may be performed by each of the components of the terminal device at the side of the HMD described in detail with reference to FIGS. 25A and 25B.

In operation S3250, the terminal device according to an embodiment may receive information about directions of audio channels arranged on a three-dimensional space from the counterpart terminal device.

According to an embodiment, the terminal device may transmit information about at least one of at least one type of available coordinate system, the number of audio channels which may be received, and an available maximum bit rate, before receiving the information about the directions of the audio channels from the counterpart terminal device. The counterpart terminal device may determine the directions of the audio channels based on the received information and transmit the information about the directions of the audio channels.

In operation S3260, the terminal device according to an embodiment may receive audio signals corresponding to the directions of the audio channels.

In operation S3270, the terminal device according to an embodiment may output the audio signals. The terminal device may obtain audio frames with respect to the plurality of audio channels and decode the obtained audio frames.

FIGS. 33 through 36 illustrate a process in which directions of audio channels and an FOV of an image are determined through call condition negotiation between terminal devices, according to an embodiment.

FIG. 33 illustrates a call condition negotiation process between an HMD connected to a network through terminal device A and a spherical camera connected to the network through terminal device B. An example of the spherical camera is illustrated in FIG. 5. FIG. 33 illustrates the process in which the audio channels are arranged on a space and the FOV of the image is determined by a terminal device according to an embodiment.

Referring to FIG. 33, terminal device A proposes to terminal device B that a sound stream including two audio channels compressed at 64 kbps by using an EVS codec may be transceived at up to 147 kbps and a video stream compressed at a resolution of 4K or 1080p by using an HEVC codec may be transceived at up to 15 Mbps. Terminal device A proposes to terminal device B that a sound stream including two EVS channels compressed at 64 kbps and IP overhead may be transceived at up to total 147 kbps.

Terminal device A explicitly shows that the audio channel and the FOV of the image may be indicated by a spherical or a cylindrical coordinate system, by describing "cylindrical" and "spherical" in an SDP message. Terminal device A explicitly shows that head tracking information of 2 bytes is to be transmitted together with each sound frame, by describing "head-tracking 2" in the SDP message. Also, terminal device A explicitly shows that directions of the audio channels have to be rotated when the head direction is rotated, by describing "rotate=1." For example, as illustrated in FIG. 8, the head tracking information may be loaded to the extended RTP header and transmitted.

An image 3401 of FIG. 34 illustrates the directions of the audio channels proposed by terminal device A to terminal device B in FIG. 33, and a 360-degree image, by using a spherical coordinate system.

Referring to FIG. 33, with respect to the proposal of terminal device A, terminal device B responds to accept the proposed EVS stream and 4K HEVC stream, under a condition in which a bit rate of the video to be received is reduced to 9 Mbps and the FOV is reduced from 360 degrees to 240 degrees. In FIG. 33, that the bit rate is reduced to 9 Mbps is explicitly described as b=AS:9000 and that the FOV is reduced to 240 degrees is explicitly described as longi= [0:240].

Also, terminal device B responds that the spherical coordinate system may be used and basic directions of the two audio channels may be arranged as (latitude 0 and longitude 80) and (latitude0 and longitude 160), respectively. Terminal device B responds that the directions of the audio channels may be changed from the basic directions, proportionately with a change in a head direction, when the head direction is changed, while a relative angle difference between the two audio channels may be always maintained as 80 degrees. In FIG. 33, that the spherical coordinate system is used is explicitly described as spherical, the directions of the two audio channels are explicitly described as lati=[0 0]; longi= [80 160] and that the directions of the audio channel and the image may be changed as the head direction is changed is explicitly described as rotate=1.

An image 3402 of FIG. 34 illustrates the directions of the audio channels and the image of the limited FOV responded by terminal device B in FIG. 33, by using a spherical coordinate system.

Figure 35:

FIG. 35 illustrates a process in which a cylindrical camera connected to a network arranges audio channels on a space and determines an FOV of an image by negotiating a call condition. An example of a ring-shaped camera is illustrated in FIG. 6.

Referring to FIG. 35, terminal device A proposes to terminal device B that a sound stream including two audio channels compressed at 64 kbps may be transceived at up to 146 kbps and an HEVC compressed video stream having a resolution of 4K or 1080 p may be trasceived at up to 15 Mbps. Terminal device A proposes to terminal device B that a sound stream including the two EVS channels compressed at 64 kbps and IP overhead may be transceived at up to total 146 kbps.

Terminal device A explicitly shows that the audio channels and the FOV of the image may be indicated as a spherical or cylindrical coordinate system, by describing "cylindrical" and "spherical" in an SDP message. Terminal device A explicitly shows that head tracking information of 2 bytes is to be transmitted together with each sound frame, by describing "head-tracking 2" in the SDP message. Also, terminal device A explicitly shows that the directions of the audio channels are not to be rotated even when the head direction is rotated, by describing "rotate=0." Here, since the head tracking information of 4 bytes is not transmitted per RTP packet, the total bit rate of the audio signal is 146 kbps, which is less by 1 kbps than 147 kbps illustrated in FIG. 33. Also, terminal device A explicitly shows that a direction of the image is not to be rotated even when the head direction is rotated, by describing "rotate=0."

An image 3601 of FIG. 36 illustrates the directions of the audio channels and the 360-degree image proposed by terminal device A to terminal device B in FIG. 35, by using a cylindrical coordinate system.

Referring to FIG. 35, in response to the proposal of terminal device A, terminal device B responds to accept the proposed EVS stream and 4K HEVC stream, under a condition in which the bit rate of the video to be received is reduced to 9 Mbps and the FOV is reduced from 360 degrees to 240 degrees. In FIG. 35, that the bit rate is reduced to 9 Mbps is explicitly described as b=AS:9000 and that the FOV is reduced to 240 degrees is explicitly described as longi= [0:240].

Also, terminal device B responds to use the cylindircal coordinate system and to arrange the basic directions of the two audio channels as (longitude 80) and (longitude 160), respectively. In FIG. 35, that the cylindrical coordinate system is used is explicitly described as cylindrical and the directions of the two audio channels are explicitly described as longi=[80 160].

An image 3602 of FIG. 36 illustrates the directions of the audio channels and the image having the limited FOV responded by terminal device B in FIG. 35, by using a cylindrical coordinate system.

When a terminal device at the side of an HMD negotiates a call condition with a terminal device at the side of a camera, the terminal device at the side of the HMD is not able to know a structure of the camera located at the opposite side to a transmission channel or ambient sound environment. Thus, the terminal device at the side of the HMD may propose only the number of audio channels which may be received by the HMD or the bit rate. Spatial arrangement of the audio channels may be determined by the camera by analyzing the ambient sound environment based on a variety of information.

Figure 37:
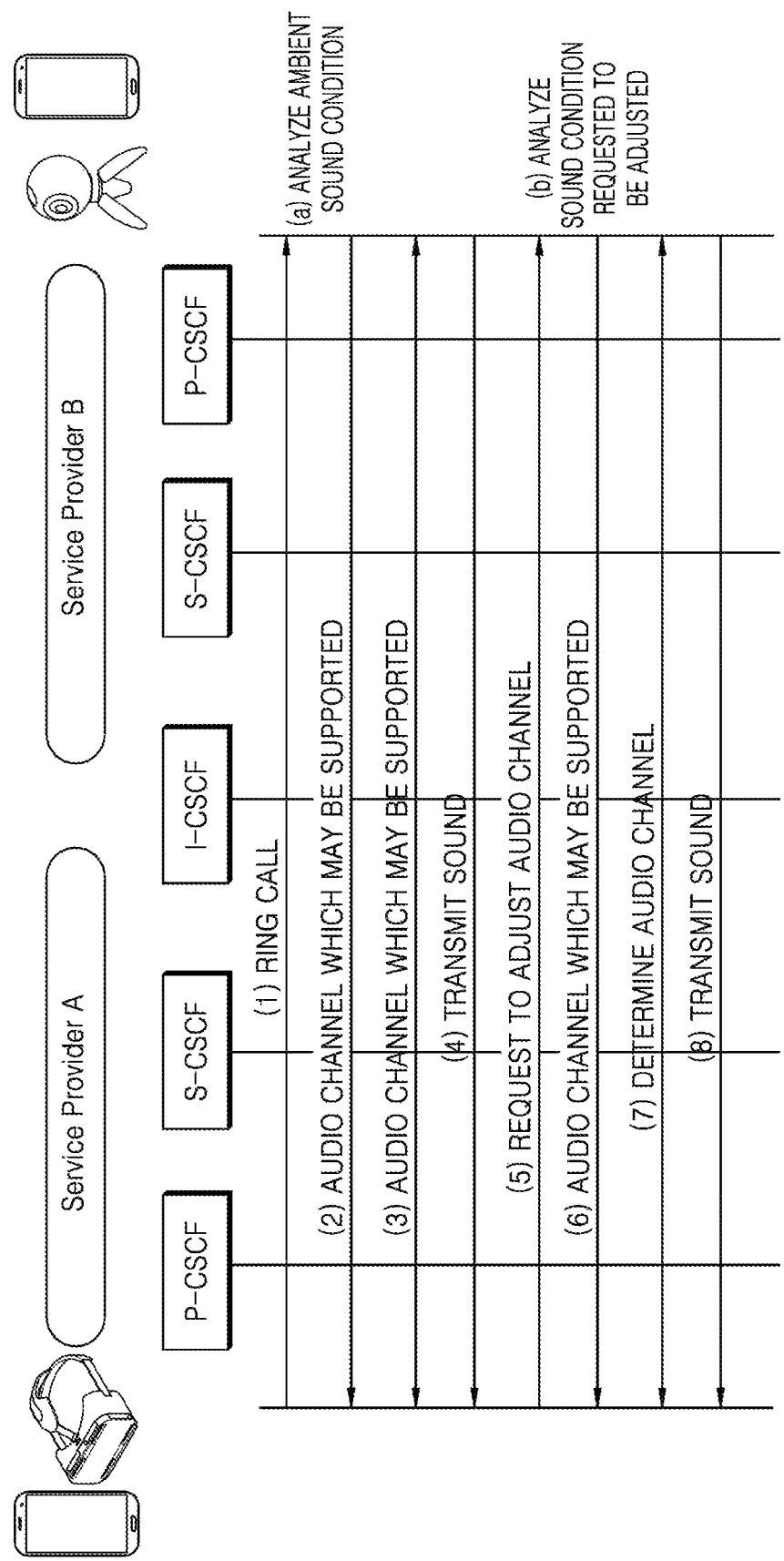
FIG. 37 is a view for describing a method of performing immersive multimedia communication between terminal devices, according to an embodiment.

FIG. 37 is a view for describing a method of performing immersive multimedia communication between terminal devices, according to an embodiment.

P-CSCF, S-CSCF, and I-CSCF of FIG. 37 are network nodes included in an IMS used for call condition negotiation. FIG. 37 illustrates service provider A operating a network to which the terminal device at the side of the HMD is connected and service provider B operating a network to which the terminal device at the side of the camera is connected.

FIG. 37 illustrates an operation of determining an arrangement of audio channels by the camera by analyzing ambient sound environment during the call condition negotiation. FIG. 37 illustrates an operation of determining the arrangement of the audio channels when a call is initially started and an operation of rearranging the arrangement of the audio channels when an FOV is adjusted or a bit rate is reduced by a user of the terminal device in the middle of the call.

Figure 38:
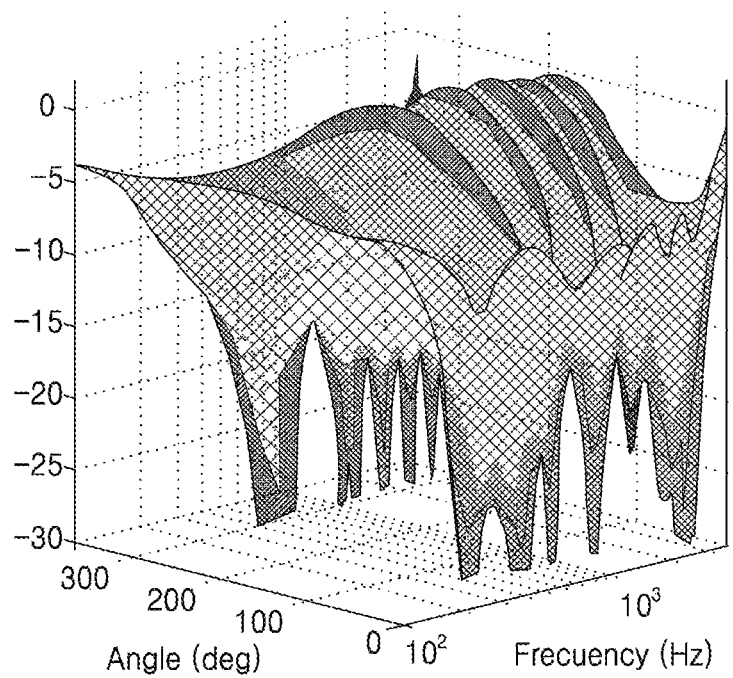
FIG. 38 illustrates a result of analyzing an ambient sound environment via a terminal device at the side of a camera, according to an embodiment.

The camera may measure a background sound around the camera. The camera may measure the background sound with respect to all 360-degree directions around the camera or directions in which the audio channels are to be arranged. When results measured by the camera are combined, a level of surrounding background music may be figured out as illustrated in FIG. 38. The ambient sound environment may be referred to for arranging the audio channels.

Figure 39:
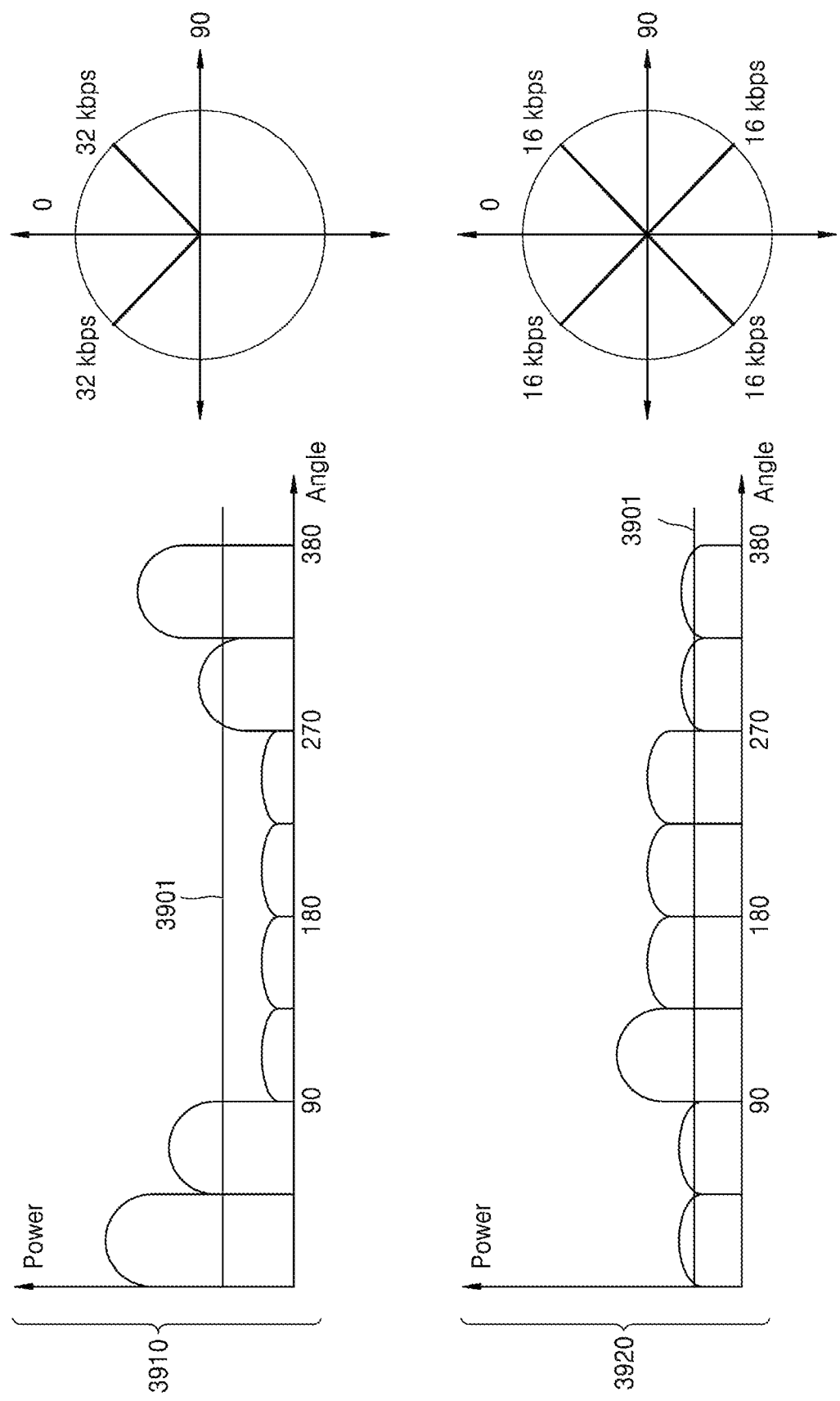
FIG. 39 is a view for describing a method performed by a terminal device at the side of a camera to arrange audio channels and allocate bit rates by taking into account an ambient sound environment, according to an embodiment.

FIG. 39 illustrates an example in which sound bit rates of total 64 kbps are divided into two or four audio channels. A level of the surrounding sound may denote power measured with respect to the surrounding sound.

In an image 3910 of FIG. 39, a background sound power of quadrants 1 and 4 is equal to or higher than a critical value indicated by a solid line 3901 and a background sound power of quadrants 2 and 3 is equal to or less than the critical value. The terminal device at the side of the camera may determine that a main sound source exists in the quadrants 1 and 4 based on the background sound. The terminal device at the side of the camera may determine the directions of the audio channels as 45 degrees and 315 degrees included in the quadrants 1 and 4 and allocate a bit rate of 32 kbps to each audio channel.

In an image 3920 of FIG. 39, the level of the background sound of each quadrant is substantially the same. Thus, the terminal device at the side of the camera may determine that the main sound source is equally distributed on each quadrant based on the background sound. The terminal device at the side of the camera may determine the directions of the audio channels as 45 degrees, 135 degrees, 225 degrees, and 315 degrees included in the quadrants 1, 2, 3, and 4, respectively, and allocate a bit rate of 16 kbps to each audio channel.

The terminal device at the side of the camera according to an embodiment may determine a maximum audio bandwidth based on the distribution of the energy of an audio input signal in a frequency domain.

FIG. 39 illustrates the example in which the audio channels are arranged with respect to all 360-degree directions of a two-dimensional plane and the bit rates are divided by the camera configured to measure the level of the background music. However, embodiments are not limited thereto, and the audio channels may be arranged and the bit rates may be divided with respect to a limited spatial region rather than the all 360-degree directions. Also, the audio channels may be arranged and the bit rates may be divided with respect to a three-dimensional space rather than the two-dimensional plane. Also, the audio channels may be arranged and the bit rates may be divided when the call condition negotiation is performed, during which a call performance is started, and may be performed in the middle of the call performance.

Referring back to FIG. 37, the terminal device at the side of the camera may transmit the audio signal according to a result of the call condition negotiation performed when the call is initially started. In the immersive multimedia communication system according to an embodiment, when a network load occurs or an FOV of an image is adjusted by the user in the middle of the call, the audio channels or the image signal may be required to be adjusted.

For example, when the network load occurs to make it difficult to maintain the bit rates determined in the operation of negotiating the call condition, the terminal device at the side of the camera may receive a request to reduce the bit rate of at least one audio channel, from the terminal device at the side of the HMD. The terminal device at the side of the camera may receive a request to reduce the bit rate of the audio channel which is not the audio channel corresponding to a head direction of the user of the HMD. A format of a control packet which may be transmitted by the terminal device at the side of the HMD to the terminal device at the side of the camera for reducing the bit rate of a specific audio channel will be described in detail below with reference to FIG. 40.

The terminal device at the side of the camera may analyze a sound condition which is requested to be adjusted by the terminal device at the side of the HMD, may determine the sound condition which may be supported by the terminal device at the side of the camera, and may transmit the determined sound condition to the terminal device at the side of the HMD. The terminal device at the side of the camera may generate audio output signals corresponding to the audio channels to which the adjusted bit rates are allocated, based on the request received from the terminal device at the side of the HMD. The terminal device at the side of the camera may transmit the audio output signals to which the adjusted bit rates are allocated, to the counterpart terminal device.

As another example, when the network load occurs to make it difficult to maintain the bit rates determined in the operation of negotiating the call condition, the terminal device at the side of the camera may receive a request to adjust at least one of the number of audio channels and the bit rates allocated to the audio channels, from the terminal device at the side of the HMD. A format of a control packet which may be transmitted by the terminal device at the side of the HMD to the terminal device at the side of the camera for reducing the at least one of the number of audio channels and the bit rates will be described in detail below with reference to FIG. 41.

The terminal device at the side of the camera may stop transmitting audio output signal corresponding to at least one audio channel from among the audio channels, based on the request received from the terminal device at the side of the HMD. Alternatively, the terminal device at the side of the camera may reduce the bit rate allocated to at least one audio channel from among the audio channels, based on the request received from the terminal device at the side of the HMD.

For example, the terminal device at the side of the camera may reduce the bit rate allocated to the audio channel which is not an audio channel corresponding to a head direction of a user of the HMD or may temporarily stop transmitting signals with respect to the audio channel which is not the audio channel corresponding to the head direction of the user of the HMD. Alternatively, the terminal device at the side of the camera may reduce the bit rates allocated to other audio channels except for an audio channel operating in a voice mode or may temporarily stop transmitting signals with respect to the other audio channels except for the audio channel operating in the voice mode. Alternatively, the terminal device at the side of the camera may analyze the content of the image and may reduce the bit rates allocated to other audio channels except for an audio channel in a direction in which there is a human being capable of communication or may temporarily stop transmitting signals with respect to the other audio channels except for the audio channel in the direction in which there is a human being capable of communication.

The terminal device at the side of the camera may transmit the audio output signals corresponding to the adjusted audio channels to the counterpart terminal device.

As another example, when the network load occurs to make it difficult to maintain the bit rates determined in the operation of negotiating the call condition, the terminal device at the side of the camera may receive a request to reduce an FOV of an image from the terminal device at the side of the HMD. A format of a control packet which may be transmitted by the terminal device at the side of the HMD to the terminal device at the side of the camera for reducing the FOV of the image will be described in detail below with reference to FIG. 42.

The terminal device at the side of the camera may generate an image output signal of the adjusted FOV and transmit the generated image output signal, in response to the request received from the terminal device at the side of the HMD.

Figure 40:
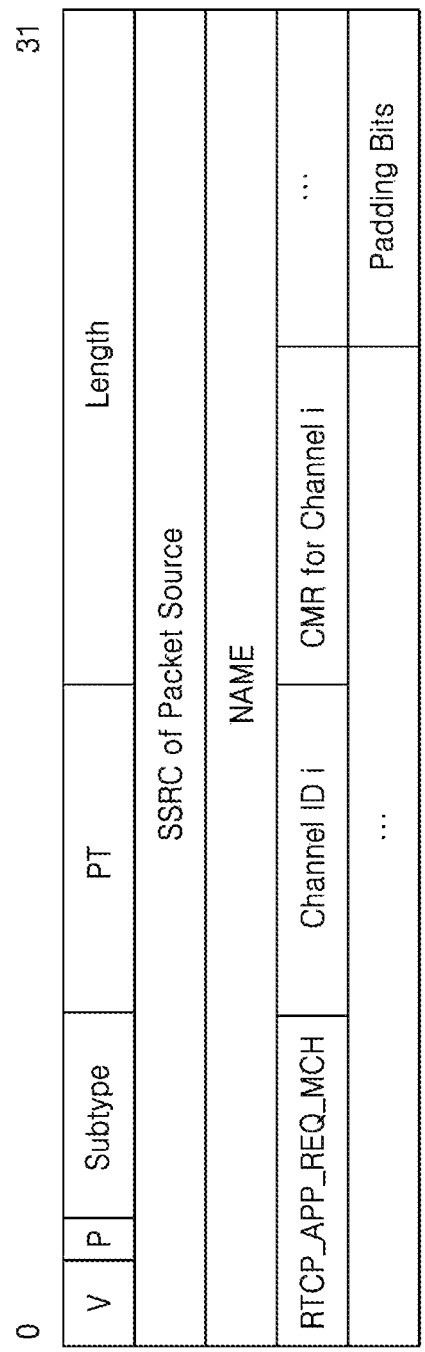

FIGS. 40 and 41 illustrate the formats of the control packets for requesting, via the terminal device at the side of the HMD, the terminal device at the side of the camera to reduce the bit rate used to transmit the audio signal, according to an embodiment.

FIG. 40 illustrates the format of the control packet which may be transmitted by the terminal device at the side of the HMD to the terminal device at the side of the camera, when a transmission channel situation is deteriorated in immersive multimedia communication in which various audio channels are used, and thus, bit rates determined in the call condition may not be maintained.

The terminal device at the side of the HMD may transmit the control packet for allocating a currently maintainable bit rate to the most important audio channels and temporarily reducing a bit rate with respect to channels having a less importance. The terminal device at the side of the HMD may transmit the control packet for increasing again the reduced bit rate after a network load situation is over or temporarily stopping transmitting signals with respect to the channels having a less importance during a predetermined time period.

RTCP_APP_REQ_MCH of FIG. 40 indicates a purpose of the transmitted packet. Channel ID i and CMR for Channel i indicate CMRs for changing a sound compression method of an $i^{th}$ channel. According to the format illustrated in FIG. 40, the CMRs with respect to various audio channels may be simultaneously transmitted by using one packet. A format of each CMR byte may be in compliance with a CMR format of a codec that is used. For example, CMRs, such as AMR, AMR-WB, EVS, etc., may be used.

According to a codec according to the related art, a parameter for reducing a bit rate of an audio channel to 0 is not defined in the CMR. According to an embodiment, a method of defining a parameter for reducing the bit rate to 0 by using a combination of bits currently not used is proposed. According to an embodiment, a new packet format to convey a plurality of CMRs with respect to multi-channels with respect to the codecs according to the related art, such as AMR, AMR-WB, EVS, etc., is provided. According to an embodiment, a method of defining an unused field of the CMR to indicate NO_DATA, in order to shut off an audio channel, is provided. For example, the terminal device at the side of the HMD experiencing temporary call quality deterioration may use the packet illustrated in FIG. 40 to initially reduce the bit rate of the audio channel in a direction far away from a current head direction of a user of the HMD.

FIG. 40 illustrates the example of the control packet transmitted when the terminal device at the side of the HMD determines a channel, a compression method of which is to be changed. However, embodiments are not limited thereto.

It may be required that the audio channel, the compression method of which is to be changed, be determined by a terminal device at the side of a camera, rather than the terminal device at the side of the HMD, in order to overcome a network load situation. For example, the network load situation may be overcome by reducing a bit rate with respect to audio channels receiving a background sound. Whether an audio input signal received through each of various audio channels is a voice or a background sound may be identified only by the camera capable of capturing and analyzing an image signal.

The terminal device at the side of the HMD may transmit the control packet illustrated in FIG. 41 to notify the terminal device at the side of the camera about the maximum number of audio channels which may be currently accommodated and the total bit rate. The terminal device at the side of the camera receiving the control packet may adjust the bit rate of each audio channel or reduce the number of audio channels based on at least one of the maximum number of audio channels requested and the maximum bit rate.

For example, while the terminal device at the side of the camera may maintain the bit rate with respect to the audio channel for which a speech codec mode controller compresses the audio input signal in a voice mode, the terminal device at the side of the camera may reduce the bit rate or temporarily stop transmitting signals with respect to the audio channel for which the audio input signal is compressed in an audio mode.

FIG. 42 illustrates a format of a control packet via which a terminal device at the side of an HMD requests a terminal device at the side of a camera to adjust an FOV of an image, according to an embodiment.

FIG. 42 illustrates an example of the control packet transmitted by the terminal device at the side of the HMD to the terminal device at the side of the camera, when a received bit rate of an image does not satisfy a condition determined in an operation of negotiating a call condition.

The terminal device at the side of the HMD may temporarily reduce the bit rate and an FOV of the image by transmitting the control packet of FIG. 42 together with TMMBR illustrated in the image 3002 of FIG. 30, to the terminal device at the side of the camera. Also, when it gets back to a normal situation after a network load situation is over, the terminal device at the side of the HMD may restore the bit rate and the FOV of the image by transmitting the TMMBR and the control packet of FIG. 42 to the terminal device at the side of the camera. The terminal device at the side of the HMD may use the control packet of FIG. 42 to reduce or expand the FOV of the image by resetting a range of latitude and a range of longitude of the image.

Longitude 1 and Longitude 2 of FIG. 42 may indicate the range of longitude of the FOV in a spherical coordinate system and Latitude 1 and Latitude 2 may indicate the range of latitude of the FOV in the spherical coordinate system. However, embodiments are not limited to the example illustrated in FIG. 42. When it is not required to adjust the latitude when the terminal device at the side of the HMD communicates with the terminal device at the side of the camera, the range of the FOV may be indicated by using only Longitude 1 and Longitude 2.

According to the immersive multimedia communication system described above with reference to FIGS. 15A through 28, the problem occurring when the EVS codec is applied to a channel-based audio may be solved. For example, in the case of the channel-based audio format, such as a 2 channel stereo method and a 5.1. channel method, an arrangement of microphones at a transmitting terminal and an arrangement of microphones at a receiving terminal have to correspond to each other in order to optimize the sound quality. According to the immersive multimedia communication system, when a head direction of a user of the HMD is changed, the user may hear a sound corresponding to an image of the head direction. Also, according to the immersive multimedia communication system, audio signals may be output to the user such that when a sound of an interest direction of the user is a voice, the sound may be vividly heard, and when the sound of the interest direction of the user is a background sound, the sound may be realistically heard.

Meanwhile, for example, in the case of a scene-based audio format such as ambisonics, when a signal of a sound source located in a non-interest direction of a listener is intense or a shape of a sound field is complex, indication of audio signals in an interest direction may become weak and the sound quality may be reduced.

The ambisonics is a technique to describe an audio scene in relation to sound pressure in each direction and to process reproducing and transmitting the audio scene. According to the ambisonics, an amplitude of a sound field is indicated as a weighted sum of a spherical harmonics function, and thus, an intense sound source may affect the general structure of the sound field. Thus, according to the ambisonics, a sound of an important direction, such as a interest direction of a listener, etc., may be less accurately indicated or lost, due to the effect of the intense sound source in other directions.

Thus, the immersive multimedia communication system according to an embodiment may compress and transmit ambisonic coefficients indicating a sound field mainly including a sound source in a high interest direction of a listener, thereby maximizing the sound quality of audio signals output to the listener.

The immersive multimedia communication system according to an embodiment may provide a real time call service based on virtual reality that is realistic and having a low delay/low bit rate, by using the multi-channel EVS codec and the ambisonics.

Figure 43:
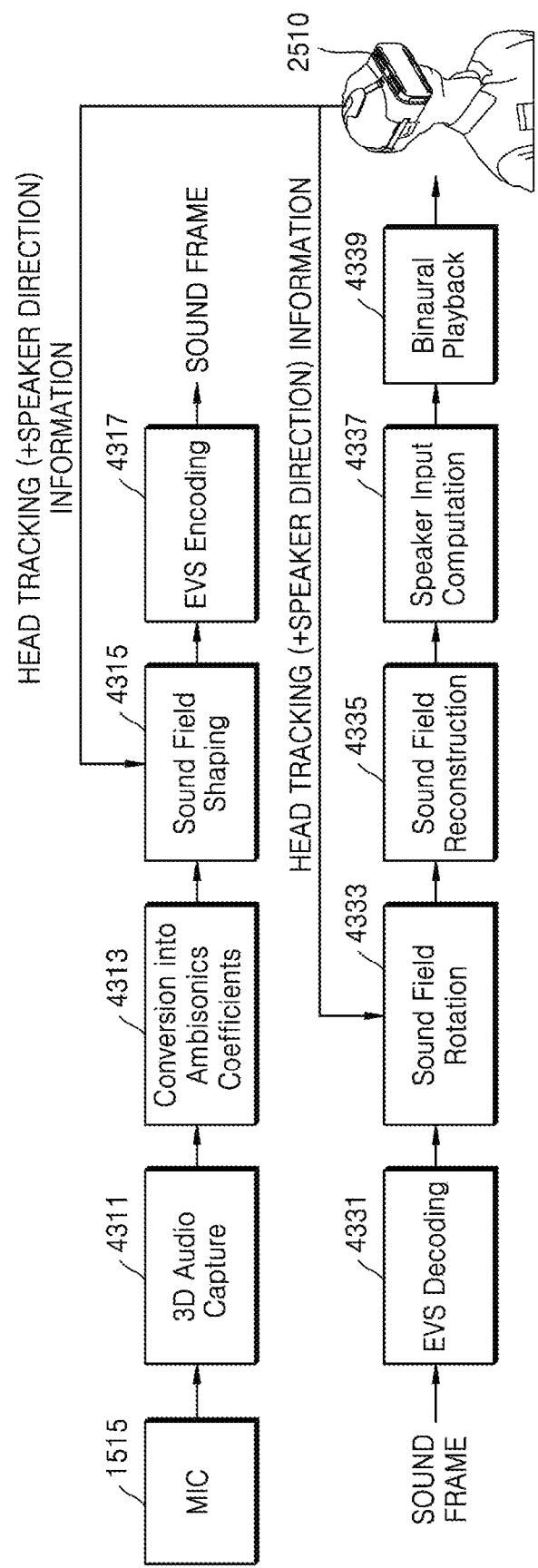
FIG. 43 is a view for describing an operation of an immersive multimedia communication system, according to an embodiment.

FIG. 43 is a view for describing an operation of an immersive multimedia communication system according to an embodiment.

As illustrated in FIG. 43, the immersive multimedia communication system according to an embodiment may transceive an audio signal based on virtual reality by using an ambisonic audio compression technique.

Operations S4311, S4313, S4315, and S4317 illustrated in FIG. 43 may be performed by the terminal device at the side of the camera illustrated in FIG. 15A or 15B.

The terminal device at the side of the camera according to an embodiment may capture a three-dimensional audio input signal received through the microphone 1515 (S4311). The terminal device at the side of the camera may convert the audio input signal into ambisonic coefficients indicating a sound field (S4313). The terminal device at the side of the camera may shape the sound field based on the head tracking information received from the terminal device at the side of the HMD 2510 (S4315). The terminal device at the side of the camera may shape the sound field by further taking into account speaker direction information received from the terminal device at the side of the HMD 2510. The head tracking information may be transmitted to the terminal device at the side of the camera from the terminal device at the side of the HMD at a specific time point, periodically, or in real time. The speaker direction information may indicate a relative angle indicating a location of a speaker with respect to a head direction. The speaker direction information may be transmitted to the terminal device at the side of the camera from the terminal device at the side of the HMD when the terminal device at the side of the HMD and the terminal device at the side of the camera negotiate a call condition.

The terminal device at the side of the camera may encode the ambisonic coefficients by using an EVS codec based on the shaped sound field and the head tracking information (S4317). The terminal device at the side of the camera may encode the ambisonic coefficients by further taking into account information about a speaker direction of the HMD 2510. The terminal device at the side of the camera may support encoding of multi-channel audio signals. The terminal device at the side of the camera may transmit a sound frame including the encoded ambisonic coefficients to the terminal device at the side of the HMD 2510. The shape of the sound field determining the sound quality of the audio signal in each direction included in the sound frame may be determined by an operation S4315 and an operation S4317.

Operations S4331, S4333, S4335, S4337, and S4339 illustrated in FIG. 43 may be performed by the terminal device at the side of the HMD illustrated in FIG. 25A or 25B.

The terminal device at the side of the HMD according to an embodiment may extract the ambisonic coefficients by decoding the sound frame received from the terminal device at the side of the camera by using the EVS codec (S4331). The terminal device at the side of the HMD may rotate the sound field by using the extracted ambisonic coefficients and head direction information (S4333). The terminal device at the side of the HMD may reconstruct the sound field of the received sound frame (S4337) and calculate a signal to be input to the speaker of the HMD 2510 (S4337). The HMD 2510 may reproduce the multi-channel audio signal corresponding to each speaker direction based on the input signal (S4339). A user of the HMD 2510 may receive the three-dimensional sound having the maximized sound quality, through the speaker.

Figure 44A:
FIGS. 44A through 44C are views for describing a sound field compressed and transmitted via an immersive multimedia communication system, according to an embodiment.
Figure 44B:
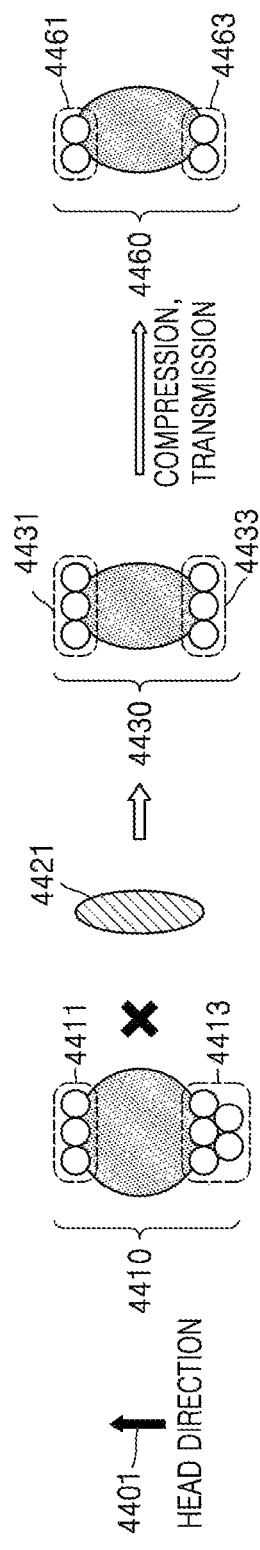
Figure 44C:
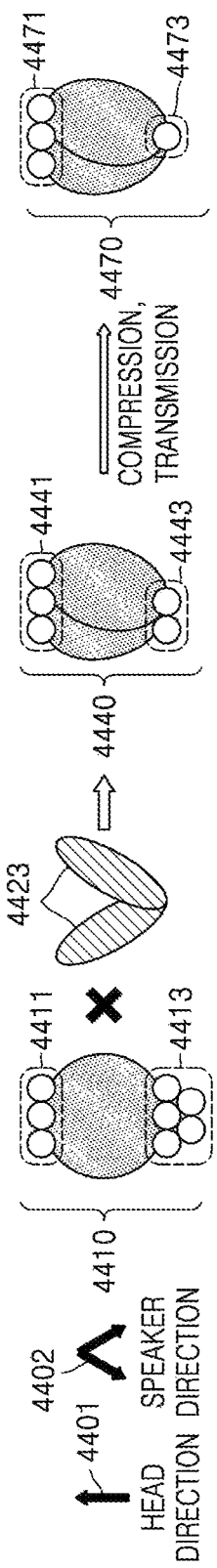

FIGS. 44A through 44C are views for describing a sound field compressed and transmitted via an immersive multimedia communication system, according to an embodiment.

An image 4410 of FIG. 44A indicates a sound field of a 3D sound captured via a microphone. An arrow 4401 indicates a head direction of a listener. For example, the listener may be a user wearing an HMD. The image 4410 illustrates an example in which the sound field is formed based on audio information 4413 in a non-interest direction which is the opposite direction to the head direction, compared to audio information 4411 in the head direction, which is an interest direction.

An image 4450 indicates a sound field reconstructed from a sound frame transmitted, after ambisonic coefficients indicating the sound field illustrated in the image 4410 are compressed and transmitted. As illustrated in the image 4450, as the ambisonic coefficients are compressed and transmitted, audio information 4451 in an interest direction may be more damaged compared to audio information 4453 in a non-interest direction.

Thus, as illustrated in FIG. 44A, when a signal of a sound source located in the non-interest direction of the listener is intense, indication of audio signals in the interest direction may become weak, and thus, the sound quality may be reduced. The immersive multimedia communication system according to an embodiment shape the sound field based on the sound source in a high interest direction of the listener to maximize the sound quality.

An image 4430 of FIG. 44B indicates a sound field in which audio information of a head direction 4401 is intensified, by applying information about the head direction 4401 of the listener to the sound field 4410 of the 3D sound captured via the microphone. The immersive multimedia communication system according to an embodiment may shape the sound field by multiplying the captured sound field 4410 by a three-dimensional plane 4421 in which signals in the head direction 4401 are intensified. As illustrated in the image 4430, the shaped sound field may be formed such that audio information 4431 in the head direction may be more intensified compared to audio information 4433 of the non-interest direction.

An image 4460 indicates a sound field reconstructed from a sound frame transmitted, after ambisonic coefficients indicating the sound field illustrated in the image 4430 are compressed and transmitted. The sound field indicated by the image 4460 may include both audio information 4461 in an interest direction and audio information 4463 in a non-interest indirection.

The audio information 4451 in the interest direction illustrated in the image 4450 of FIG. 44A may be compared with the audio information 4461 in the interest direction illustrated in the image 4460 of FIG. 44B. It may be understood that compared to the case illustrated in FIG. 44A, in which the ambisonic coefficients indicating the captured sound field are intactly compressed and transmitted, in the case illustrated in FIG. 44B, in which the ambisonic coefficients indicating the shaped sound field are compressed and transmitted, preserved audio information in the interest direction may be increased.

An image 4440 of FIG. 44C indicates a sound field in which audio information of the head direction 4401, which is an interest direction, is intensified, by applying information about a speaker direction 4402 to the sound field 4410 of the 3D audio captured via the camera. The immersive multimedia communication system according to an embodiment may shape the sound field by multiplying the captured the sound field 4410 by a three-dimensional plane 4423 in which signals in the speaker direction are intensified. As illustrated in the image 4440, the shaped sound field may be formed such that audio information 4441 in the interest direction may be more intensified compared to audio information 4443 in the non-interest direction.

An image 4470 indicates a sound field reconstructed from a sound frame transmitted, after ambisonic coefficients indicating the sound field illustrated in the image 4440 are compressed and transmitted. The sound field indicated by the image 4470 may include both audio information 4471 in an interest direction and audio information 4473 in a non-interest direction.

The audio information 4451 in the interest direction illustrated in the image 4450 of FIG. 44A may be compared with the audio information 4471 in the interest direction illustrated in the image 4470 of FIG. 44C. It may be understood that compared to the case illustrated in FIG. 44A, in which the ambisonic coefficients indicating the captured sound field are intactly compressed and transmitted, in the case illustrated in FIG. 44C, in which the ambisonic coefficients indicating the shaped sound field are compressed and transmitted, preserved audio information in the interest direction may be increased. Hereinafter, separate operating methods of the terminal device at the side of the camera and the terminal device at the side of the HMD, included in the immersive multimedia communication system, according to an embodiment, for improving the sound quality of audio signals output to a listener, will be described in detail.

Figure 45:
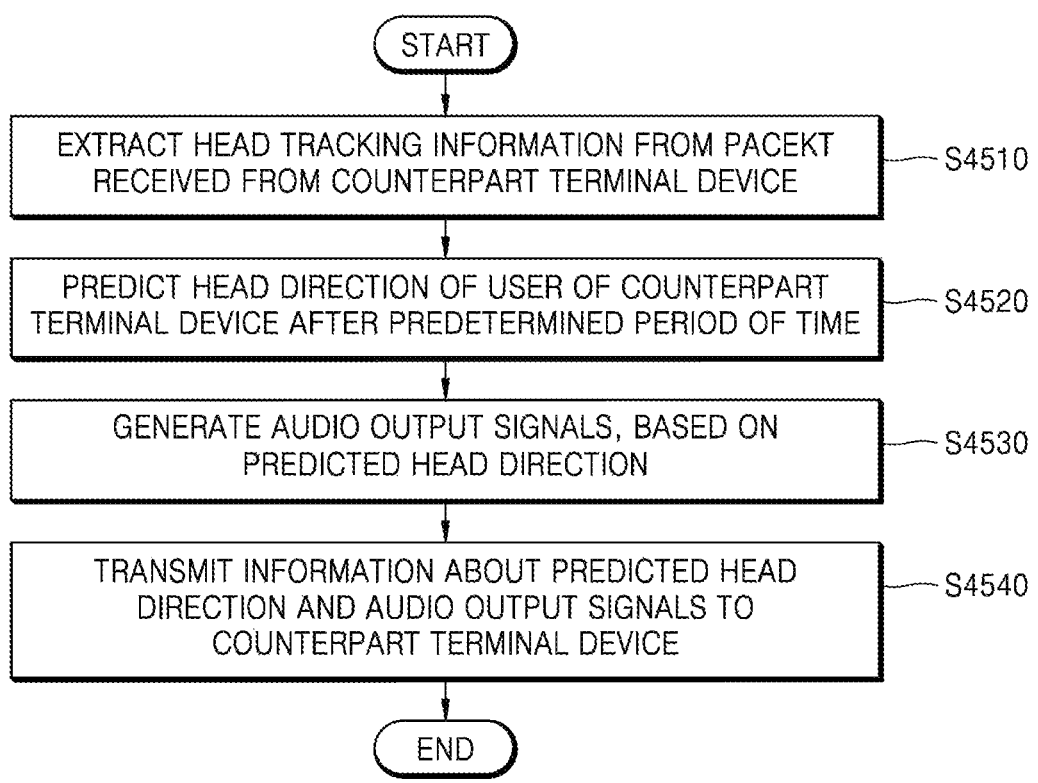
FIG. 45 is a flowchart of a method performed by a terminal device at the side of a camera to transmit audio output signals to a counterpart terminal device, according to an embodiment.

FIG. 45 is a flowchart of a method performed by the terminal device at the side of the camera to transmit audio output signals to the counterpart terminal device, according to an embodiment. Each of operations of the method described hereinafter may be performed by each component of the terminal device at the side of the camera described in detail with reference to FIGS. 15A and 15B. Also, operation S4510 and S4520 of FIG. 45 may correspond to operations S2310 and S2320 of FIG. 23 and operation S4530 of FIG. 45 may correspond to operations S2330 and S2340 of FIG. 23. Operation S4540 of FIG. 45 may correspond to operation S2350 of FIG. 23. Thus, the descriptions with respect to FIG. 23 may be applied to the method illustrated in FIG. 45.

The terminal device according to an embodiment may extract head tracking information of a user of the counterpart terminal device from a packet received from the counterpart terminal device, in operation S4510.

The extracted head tracking information may be information constructed based on a predetermined format. The terminal device according to an embodiment may determine a format to transmit and receive information about a head direction, in an operation of negotiating a call condition with the counterpart terminal device. The terminal device may receive information about the maximum number of available bits from the counterpart terminal device, for determining the format of the information about the head direction. The terminal device may determine an angle parameter to indicate the information about the head direction and the number of bits allocated to the angle parameter, by taking into account the received information about the maximum number of available bits. The terminal device may transmit information about the determined angle parameter and the determined number of bits to the counterpart terminal device.

When the format of the information about the head direction determined by the terminal device is agreed to by the counterpart terminal device, the terminal device and the counterpart terminal device may exchange the information about the head direction according to the determined format. The descriptions with reference to FIG. 3 above may be applied in relation to the negotiation of the call condition. The same descriptions will not be given.

In the virtual reality-based multimedia call system using the ambisonic compression technique, the terminal device at the side of the HMD may periodically or in real time transmit the head tracking information of the user wearing the HMD to the terminal device at the side of the camera.

The terminal device according to an embodiment may remove RTP/UDP/IP headers from the received packet and extract the head tracking information from the extended IP header. The head tracking information extracted from the extended IP header may include at least one of angle parameters of yaw, roll, and pitch, or may include a coordinate of a gaze cursor.

In operation S4520, the terminal device according to an embodiment may predict a head direction of the user of the counterpart terminal device after a predetermined time period, based on the extracted head tracking information.

The terminal device may calculate the head direction after the predetermined time period by using the head tracking information extracted in operation S4510 and head tracking information extracted from packets previously received from the counterpart terminal device. The terminal device may predict a head direction after about T seconds by analyzing head tracking information received for recent L seconds. The terminal device may convert the calculated head direction into a predetermined number of bits.

In operation S4530, the terminal device according to an embodiment may generate audio output signals by combining audio input signals received through a plurality of channels based on the predicted head direction.

For example, the terminal device according to an embodiment may determine directions of audio channels corresponding to the predicted head direction.

The terminal device may determine the directions of the audio channels as the head direction is changed, based on an audio channel structure The terminal device according to an embodiment may generate the audio output signals corresponding to the determined directions of the audio channels by combining the audio input signals received through the plurality of channels. For example, the terminal device may generate the audio output signal corresponding to each direction of each audio channel by performing beam forming on the audio input signals.

The terminal device may set a gain of the audio output signal corresponding to the channel of the predicted head direction to be greater than a gain of the audio output signal corresponding to the other channels.

As another example, the terminal device according to an embodiment may process ambisonic coefficients converted from the audio input signals based on the predicted head direction. The terminal device may generate the audio output signals by compressing and transmitting the ambisonic coefficients processed based on the predicted head direction.

For example, the terminal device at the side of the camera may capture the audio signals input from multi-channel microphones on a surface of the camera based on the real time head tracking information received from the terminal device at the side of the HMD, and then, may convert the input audio signals into the ambisonic coefficients indicating a sound field. The terminal device at the side of the camera may process the ambisonic coefficients by taking into account human's natural hearing, and encode the ambisonic coefficients by using an EVS codec, to generate the audio output signals.

The terminal device according to an embodiment may relatively intensify the audio signal in the head direction, based on the head tracking information. The terminal device may form a three-dimensional plane in which a gain of the predicted head direction is greater than gains of other directions. The terminal device may shape the sound field by applying the formed three-dimensional plane to the sound field indicated by the audio input signals. The terminal device may shape the sound field by multiplying a value of each direction of the formed three-dimensional plane by a corresponding direction of a sound field indicated by an audio frame. The terminal device may obtain ambisonic coefficients indicating the shaped sound field, from the ambisonic coefficients processed based on the predicted head direction.

Also, the terminal device according to an embodiment may receive information of a direction of at least one speaker included in the counterpart terminal device, from the counterpart terminal device, in the operation of negotiating the call condition with the counterpart terminal device. In the operation of negotiating the call condition, the terminal device at the side of the HMD may transmit the information about the direction of the at least one speaker to be used by the HMD for audio rendering, to the terminal device at the side of the camera. The terminal device may determine the order N of ambisonic coefficients to be transmitted to the counterpart terminal device, together with other call conditions, such as a bit rate, etc., in the operation of negotiating the call condition.

The terminal device according to an embodiment may generate the audio output signals by further taking into account the information about the direction of the at least one speaker and the order N.

For example, the terminal device according to an embodiment may relatively intensify the audio signal in the speaker direction based on the speaker direction information. The terminal device may form a three-dimensional plane in which a gain of the direction of the at least one speaker is greater than gains of other directions, and apply the formed three-dimensional plane to a sound field indicated by the audio input signals to shape the sound field. The terminal device may shape the sound field by multiplying a value of each direction of the formed three-dimensional plane by a value of a corresponding direction of the sound field indicated by an audio frame. The terminal device may obtain ambisonic coefficients indicating the shaped sound field.

The terminal device according to an embodiment may determine at least one of a bit rate, a bandwidth, and whether to apply DTX for compressing the ambisonic coefficients, based on at least one of the predicted head direction, the information about the direction of the at least one speaker, and the order N of the ambisonic coefficients.

In operation S4540, the terminal device according to an embodiment may transmit information about the predicted head direction and the audio output signals to the counterpart terminal device. The terminal device according to an embodiment may transmit a sound frame in which the audio output signals are compressed to the counterpart terminal device. The information about the predicted head direction may be loaded to the extended IP header of a packet to be transmitted to the counterpart terminal device and may be transmitted to the counterpart terminal device.

Figure 46:
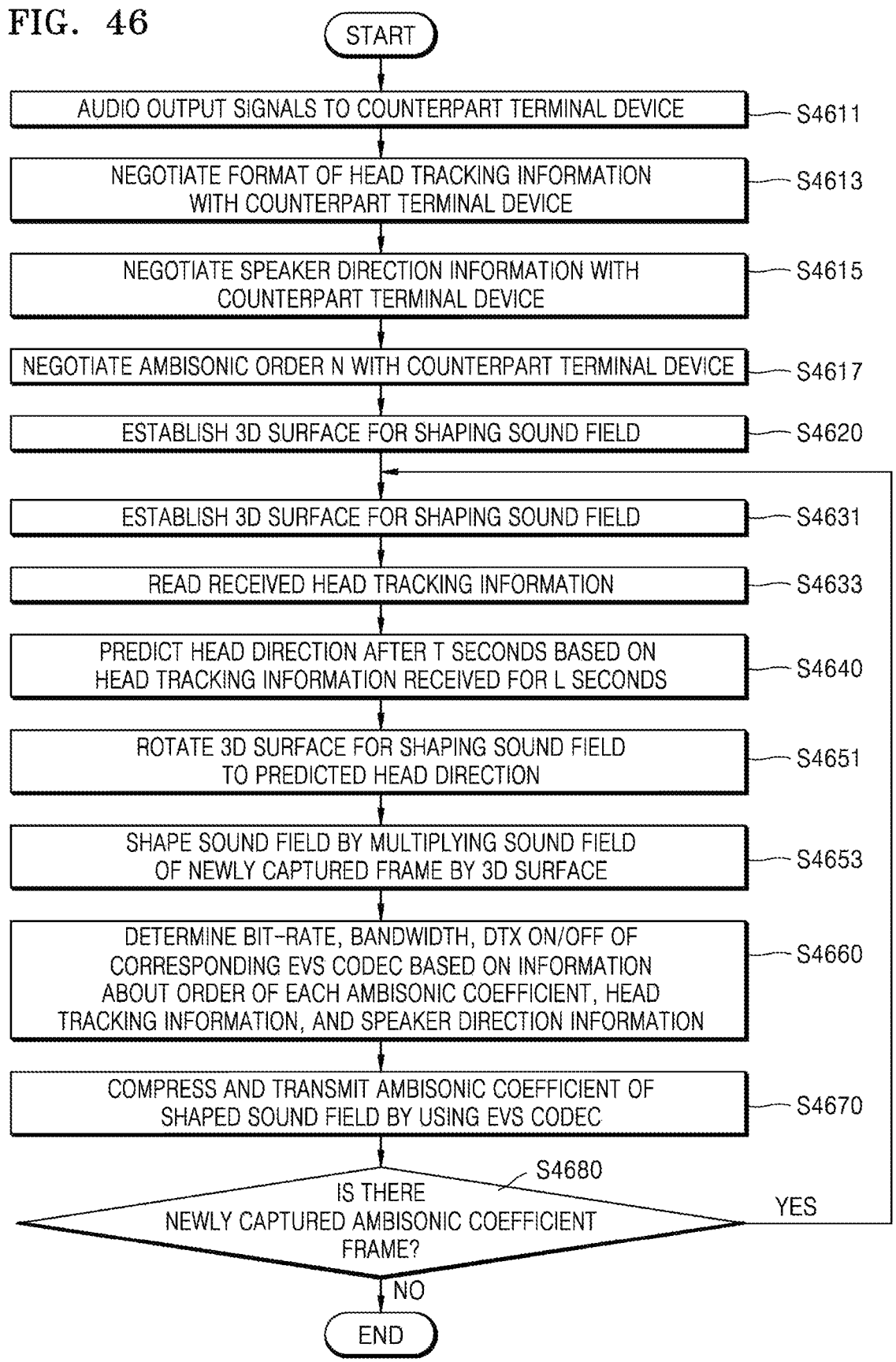
FIG. 46 is a flowchart of a method performed by a terminal device at the side of a camera to transmit audio output signals to a counterpart terminal device, according to an embodiment.

FIG. 46 is a flowchart of a method performed by a terminal device at the side of a camera to transmit audio output signals to a counterpart terminal device, according to an embodiment. Each of operations of the method described hereinafter may be performed by each component of the terminal device at the side of the camera described in detail with reference to FIGS. 15A and 15B. Also, operations S4633 and S4640 of FIG. 46 may correspond to operations S4510 and S4520 of FIG. 45 and operations S4651 through S4670 of FIG. 46 may correspond to operations S4530 and S4540 of FIG. 45. Thus, the same descriptions will not be given.

The terminal device according to an embodiment may negotiate a call condition (S4611) when a virtual reality call is started with the counterpart terminal device. The terminal device may determine a format of head tracking information in the operation of negotiating the call condition (S4613). The terminal device may negotiate information about a direction of a speaker with the counterpart terminal device in the operation of negotiating the call condition (S4615). For example, the terminal device may receive the information about the direction of the speaker from the counterpart terminal device. The terminal device may negotiate the order N of ambisonic coefficients with the counterpart terminal device in the operation of negotiating the call condition (S4617). The terminal device may determine the order N of the ambisonic coefficients to be transmitted to the counterpart terminal device.

The terminal device according to an embodiment may form a three-dimensional plane for shaping a sound field, based on at least one of the head direction, the speaker direction, and the order N of the ambisonic coefficients (S4620).

The terminal device according to an embodiment may obtain a newly captured ambisonic coefficient frame (S4631). The terminal device may obtain the ambisonic coefficients from a sound frame including audio input signals received through a plurality of microphones. The terminal device may perform a Fourier conversion operation on sound pressure values surrounding the microphones. The terminal device may assume a spherical sound field and perform approximation as a series of spherical harmonics, rather than directly capturing the sound pressure values of all directions. The terminal device may obtain the ambisonic coefficients from coefficients of the approximated series. As the order N of the ambisonic coefficients increases, the sound field may be more precisely indicated, and thus, the spatial resolution may be increased.

When a new sound frame is received, the terminal device according to an embodiment may read head tracking information from an extended IP header of a packet on which the received sound frame is loaded (S4633). The terminal device may predict a head direction after T seconds based on head tracking information received for L seconds (S4640).

The terminal device according to an embodiment may rotate the three-dimensional plane for shaping the sound field to the predicted direction (S4651). The terminal device may shape the sound field by multiplying the sound field indicated by the ambisonic coefficients obtained in operation S4631 by the three-dimensional plane (S4653). The terminal device may determine at least one of a bit rate, a bandwidth, and whether to apply DTX for compressing the ambisonic coefficients by using the EVS codec, based on at least one of the order of each ambisonic coefficient, the head tracking information, and the speaker direction information (S4660).

Figure 47:
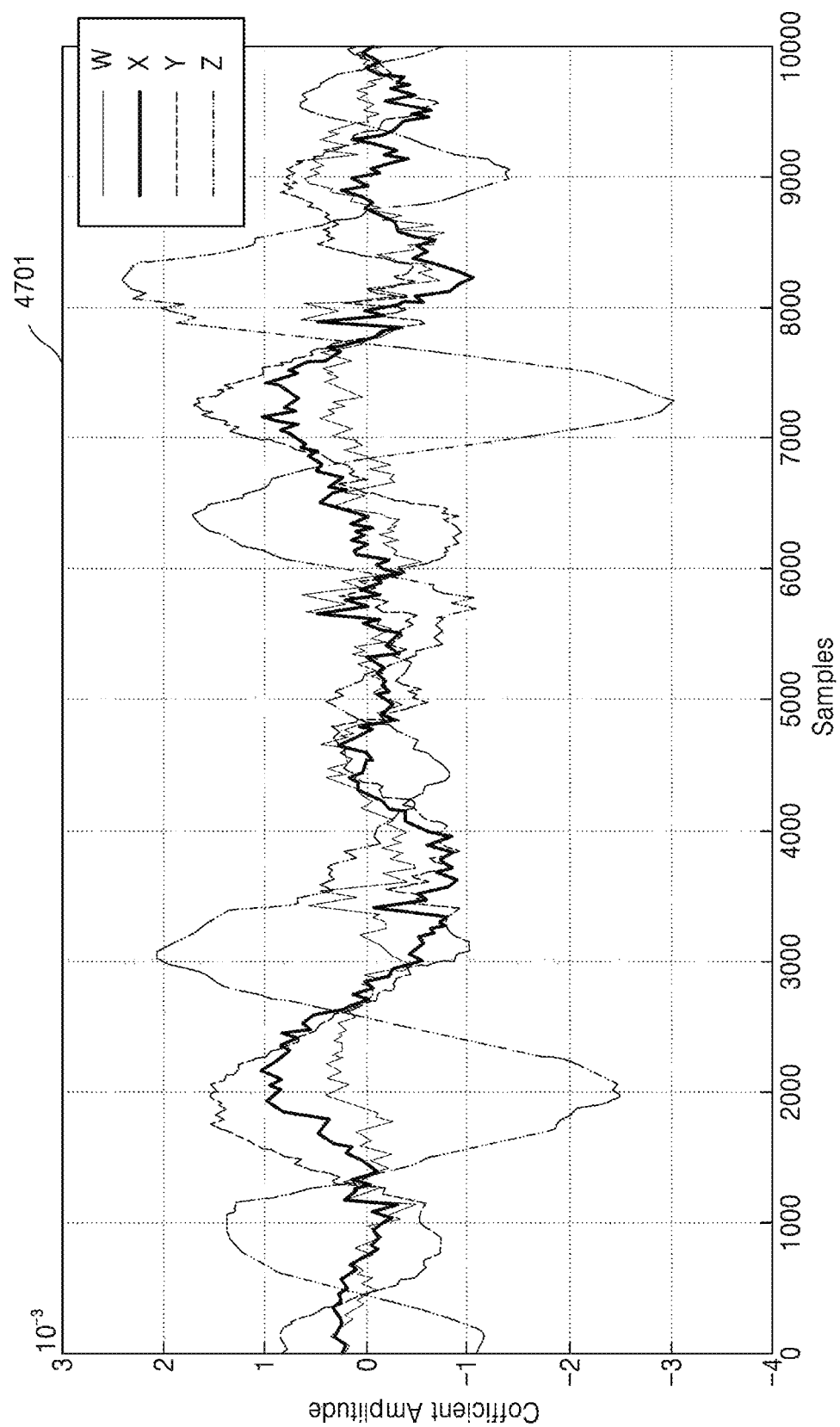
FIG. 47 illustrates a spherical coordinate system used by a terminal device at the side of a camera to induce ambisonic coefficients, according to an embodiment.

FIG. 47 illustrates an example of B-format ambisonic coefficients. In a graph 4701 of FIG. 47, W indicates a sound pressure measured through an omnidirectional microphone and X, Y, and Z indicate sound pressures of directions of coordinate axes.

The terminal device according to an embodiment may determine configuration of the EVS codec according to a characteristic of each ambisonic coefficient.

For example, the terminal device according to an embodiment may determine the bit rate and the bandwidth for compressing the ambisonic coefficients by using the EVS codec, based on the order of the ambisonic coefficient. For example, the terminal device may allocate a high bit rate and a great bandwidth to a low order ambisonic coefficient which is important for audio quality.

As another example, the terminal device according to an embodiment may change the degree of importance of the ambisonic coefficient, based on the head tracking information and the speaker direction information. For example, the terminal device may change the degree of importance of each ambisonic coefficient based on whether the sound field is shaped or not and the level of the shaping of the sound field, based on the head tracking information and the speaker direction information.

The terminal device according to an embodiment may compress the ambisonic coefficients indicating the shaped sound field by using the EVS codec and transmit the compressed ambisonic coefficients (S4670). When there is a newly captured ambisonic coefficient frame, the terminal device may repeat operations S4631 through S4670 and when there is no newly captured ambisonic coefficient frame, the terminal device may end the call (S4680).

Figure 48:
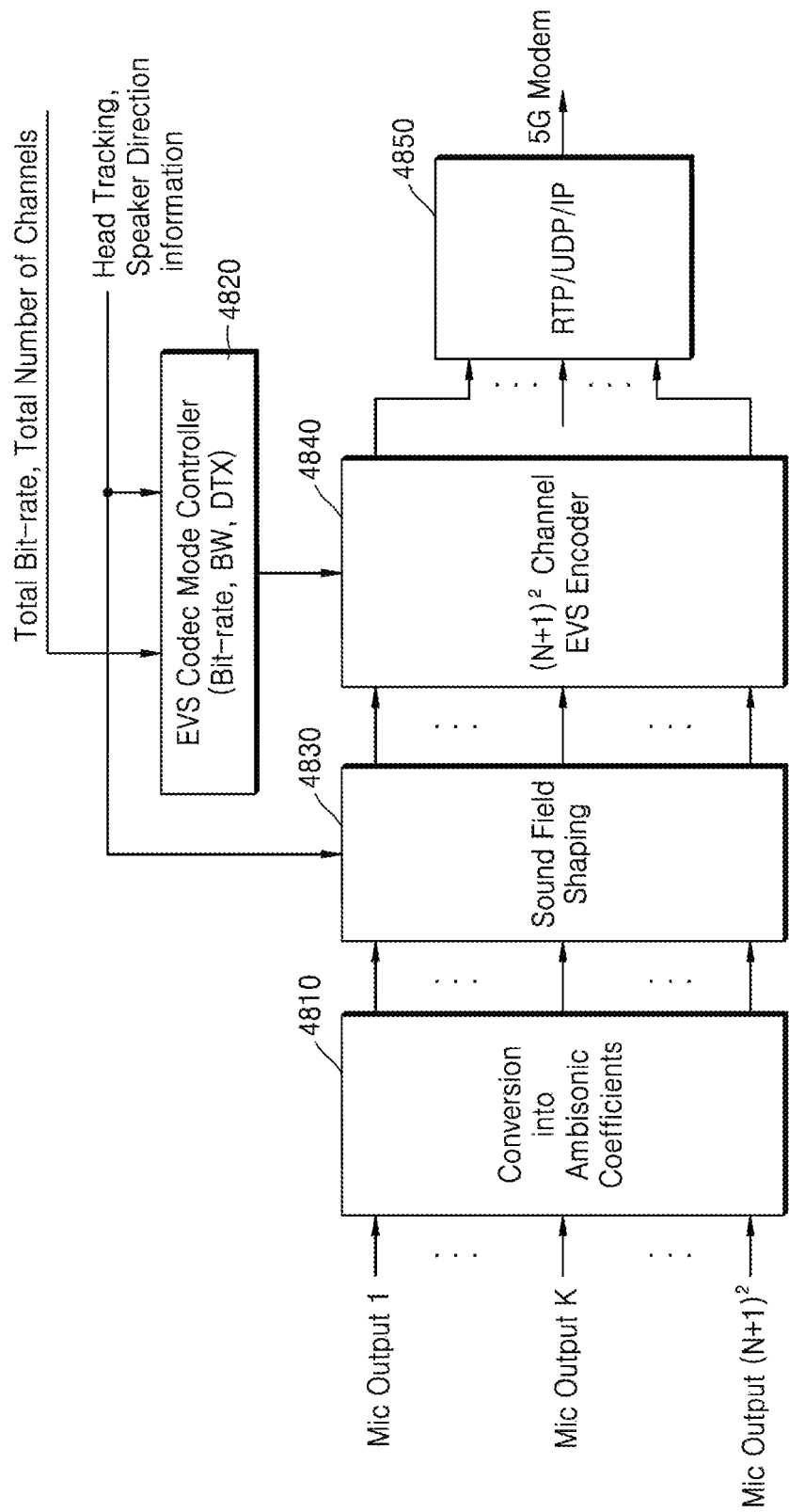
FIG. 48 illustrates a structure of a processor of a camera or a terminal device, according to an embodiment.

FIG. 48 illustrates a structure of a processor of a terminal device at the side of a camera, according to an embodiment.

The terminal device at the side of the camera according to an embodiment may receive head tracking information of a user wearing an HMD, from a terminal device at the side of the HMD. The terminal device at the side of the camera according to an embodiment may shape a sound field based on the received head tracking information. The terminal device at the side of the camera according to an embodiment may compress and transmit ambisonic coefficients indicating the shaped sound field.

First, in block 4810, the terminal device may convert audio input signals received from multi-channel microphones into the ambisonic coefficients indicating the sound field.

In block 4830, the terminal device may shape the sound field based on the head tracking information. The terminal device may shape the sound field by further taking into account speaker direction information.

An EVS codec mode controller 4820 may determine configuration of an EVS codec. The EVS codec mode controller 4820 may determine at least one of a bit rate, a bandwidth, and whether to apply DTX for compressing the ambisonic coefficients, based on at least one of a head direction of a listener, information of a direction of at least one speaker, and the order N of the ambisonic coefficients.

The terminal device according to an embodiment may determine the maximum number of available bits and the maximum number of available channels in an operation of negotiating a call condition with a counterpart terminal device. The EVS codec mode controller 4820 may determine at least one of the bit rate, the bandwidth, and whether to apply the DTX for compressing the ambisonic coefficients, based on at least one of the maximum number of available bits, the maximum number of available channels, the head direction of the listener, the information about the direction of the at least one speaker, and the order N of the ambisonic coefficients.

As illustrated in FIG. 48, the terminal device according to an embodiment may include an EVS encoder 4840 supporting multi-channel encoding. With respect to the order N of the ambisonic coefficients, $(N+1)2$ channels may be required.

An EVS codec mode controller 4820 according to an embodiment may distribute and allocate the total bit rates to each of channels, in the operation of negotiating the call condition with the counterpart terminal device.

The EVS codec mode controller 4820 may differently allocate the bit rates and the bandwidths according to the order of the ambisonic coefficients. For example, the EVS codec mode controller 4820 may allocate relatively high bit rates and great bandwidths to the ambisonic coefficients of a low order.

The EVS codec mode controller 4820 may differently allocate the bit rates and the bandwidths to the ambisonic coefficients based on at least one of the head tracking information and the speaker direction information. In block 4830, the degree of importance of each ambisonic coefficient may be changed based on whether the shaping of the sound field is applied or not or based on a level of the shaping of the sound field.

In block 4830, the terminal device may not shape the sound field based on the head tracking information, when all directions are equally important. The EVS codec mode controller 4820 may allocate the same bit rates and the same bandwidths to the ambisonic coefficients of the same order, when the shaping of the sound field is not applied in block 4830. However, when the shaping of the sound field is applied in block 4830, the EVS codec mode controller 4820 may differently allocate the bit rates and the bandwidths even to the ambisonic coefficients of the same order. For example, the EVS codec mode controller 4820 may allocate high bit rates and great bandwidths to the ambisonic coefficients in a direction having a high degree of importance.

The EVS encoder 4840 may compress the ambisonic coefficients indicating the sound field shaped in block 4830 by using the EVS codec. The EVS encoder 4840 may sample audio output signals including the ambisonic coefficients and divide the sampled audio output signals into frame units. The EVS encoder 4840 may convert each frame into frequency-domain coefficients and quantize the frequency-domain coefficients to generate a bit stream.

In block 4850, the bit stream including the audio output signals may be transmitted to the counterpart terminal device. In block 4850, information about a predicted head direction may be transmitted to the counterpart terminal device, together with the audio output signals generated based on the predicted head direction. The information about the predicted head direction may be loaded onto an extended IP header of a packet to be transmitted to the counterpart terminal device and transmitted to the counterpart terminal device.

Figure 49:
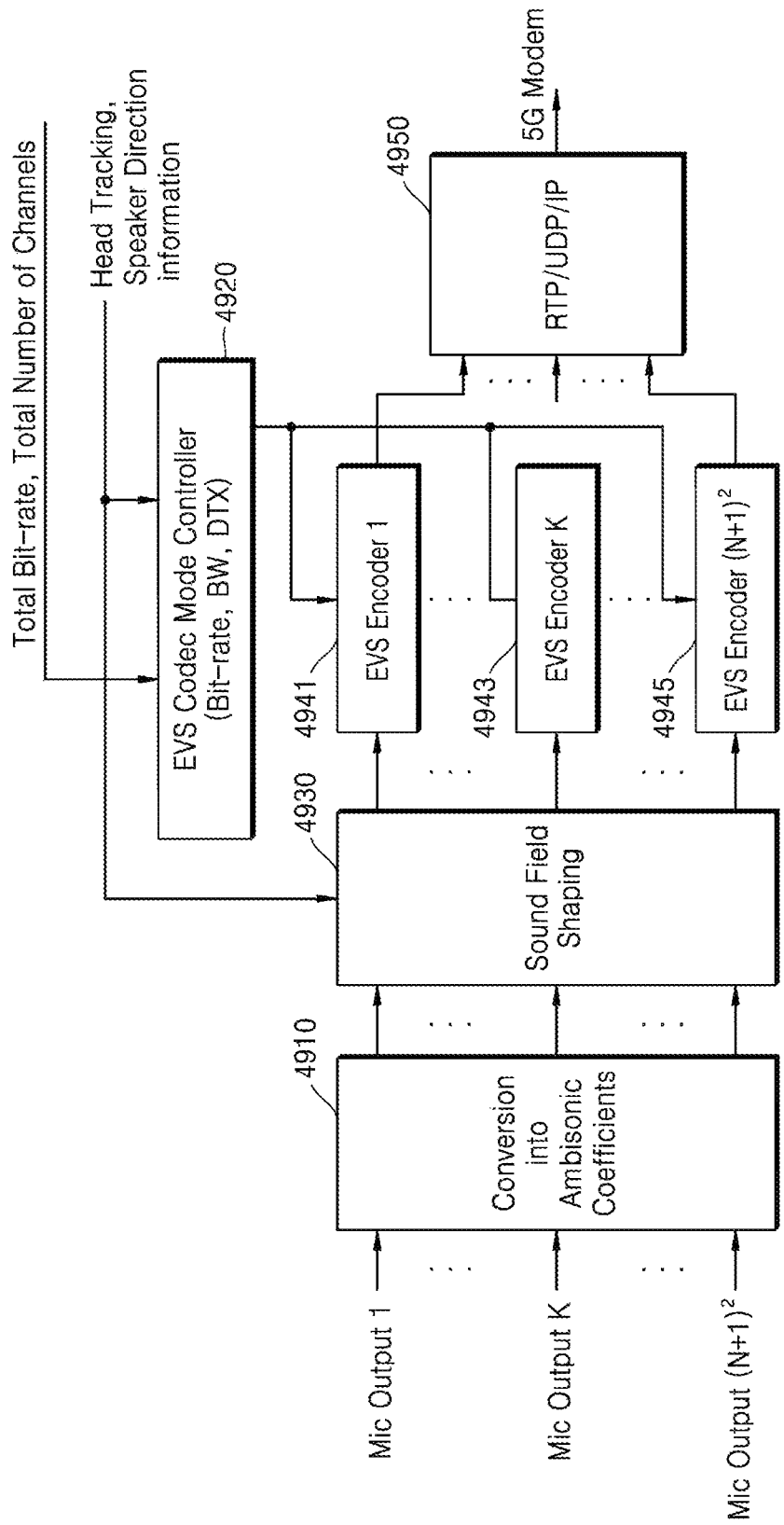
FIG. 49 illustrates a structure of a processor of a camera or a terminal device, according to an embodiment.

FIG. 49 illustrates a structure of a processor of a terminal device at the side of a camera, according to an embodiment.

As illustrated in FIG. 49, the processor of the terminal device at the side of the camera according to an embodiment may include a block 4910 configured to convert audio input signals into ambisonic coefficients, a block 4930 configured to shape a sound field based on head tracking information, an EVS codec mode controller 4920 configured to determine at least one of a bit rate, a bandwidth, and whether to apply DTX for compressing the ambisonic coefficients, and a block 4950 configured to transmit a compressed audio frame. The block 4910, the EVS codec mode controller 4920, the block 4930, and the block 4950 of FIG. 49 may correspond to the block 4810, the EVS codec mode controller 4820, the block 4830, and the block 4850 of FIG. 48, respectively, and thus, the same descriptions as the descriptions of FIG. 48 will not be given.

As illustrated in FIG. 49, the terminal device according to an embodiment may include a plurality of EVS encoders 4941, 4943, and 4945. (N+1)2 EVS encoders may be required with respect to the order N of the ambisonic coefficients. The EVS encoders 4941, 4943, and 4945 may compress the ambisonic coefficients indicating the sound field shaped in block 4930 by using the EVS codec.

Figure 50:
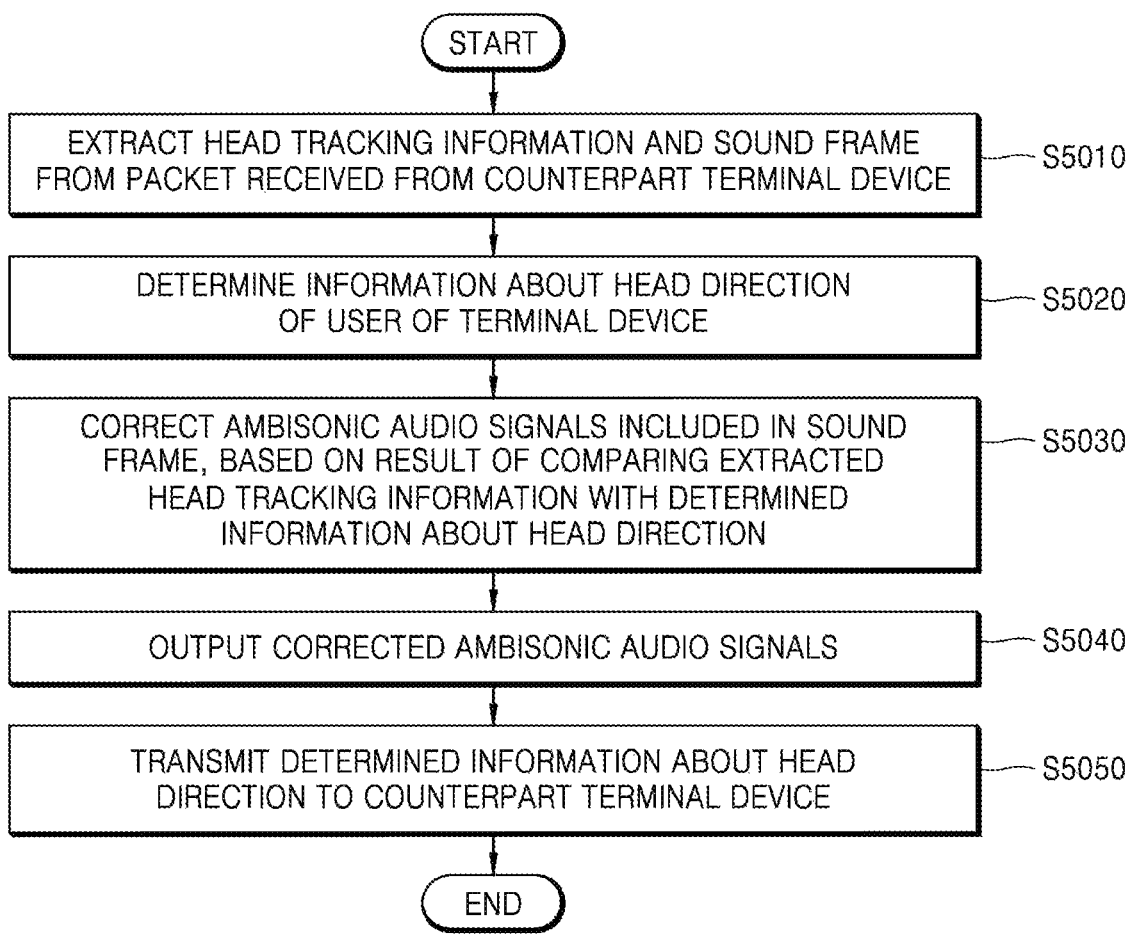
FIG. 50 is a flowchart of a method performed by a terminal device at the side of an HMD to output an audio signal received from a counterpart terminal device, according to an embodiment.

FIG. 50 is a flowchart of a method performed by a terminal device at the side of an HMD to output an audio signal received from a counterpart terminal device, according to an embodiment. Each of operations of the method described hereinafter may be performed by each component of the terminal device at the side of the HMD described in detail with reference to FIGS. 25A and 25B.

FIG. 50 illustrates a process in which the terminal device at the side of the HMD receives sound frames compressed by a terminal device at the side of a camera and head direction information used by the terminal device at the side of the camera to compress the sound frames and outputs the received sound frames.

In operation S5010, the terminal device according to an embodiment may extract head direction information and the sound frame from a packet received from the counterpart terminal device.

The terminal device according to an embodiment may separate RTP/UDP/IP headers from the packet received through LTE or a 5G modem and obtain the sound frames of N channels.

The extracted head direction information may be information constructed according to a predetermined format. The terminal device according to an embodiment may determine the format to transceive information about a head direction, in an operation of negotiating a call condition with the counterpart terminal device. The terminal device may transmit information about the maximum number of available bits to the counterpart terminal device, for determining the format of the information about the head direction. The terminal device may receive information about an angle parameter to indicate the information about the head direction and the number of bits allocated to the angle parameter from the counterpart terminal device.

When the format of the information about the head direction transmitted by the counterpart terminal device is agreed to by the terminal device, the terminal device and the counterpart terminal device may exchange the information about the head direction based on the determined format. With respect to the call condition negotiation, the descriptions with respect to FIG. 3 may be applied. The same descriptions will not be given.

In operation S5020, the terminal device according to an embodiment may determine the information about the head direction of a user of the terminal device.

The terminal device may sense the head direction of the user and convert a sensed result into a predetermined number of bits. The terminal device may convert a current head direction measured by an orientation sensor into a limited number of bits based on information about the maximum number of available bits which may be used to indicate the head direction, an arrangement of microphones, a channel adjusting unit, etc.

The terminal device may sense a head direction corresponding to the angle parameter determined to indicate the information about the head direction in the operation of negotiating the call condition. The terminal device may convert a sensed result into a number of bits allocated to the angle parameter in the operation of negotiating the call condition.

In operation S5030, the terminal device according to an embodiment may correct ambisonic audio signals included in the sound frame, based on a result of comparing the extracted head tracking information with the information about the determined information about the head direction.

The terminal device according to an embodiment may extract ambisonic coefficients from the sound frame received from the counterpart terminal device. For example, the terminal device may extract the ambisonic coefficients by decoding a bit stream received from the counterpart terminal device by using an EVS codec.

The terminal device according to an embodiment may rotate a sound field indicated by the ambisonic coefficients based on the head direction determined in operation S5020. The terminal device may rotate the sound field indicated by the ambisonic coefficients into a current head direction of a listener, by using the extracted ambisonic coefficients and the head direction information. The terminal device may generate the multi-channel audio output signals output via a plurality of speakers included in the terminal device, by reconstructing the sound field of the received sound frame. The terminal device may generate the multi-channel audio output signal corresponding to a direction of each speaker by reconstructing the sound field of the received sound frame.

In operation S5040, the terminal device according to an embodiment may output the corrected ambisonic audio signals. The corrected ambisonic audio signals may include the ambisonic coefficients indicating the sound field rotated and reconstructed based on the head direction information in operation S5030.

In operation S5050, the terminal device according to an embodiment may transmit the determined information about the head direction to the counterpart terminal device.

Figure 51:
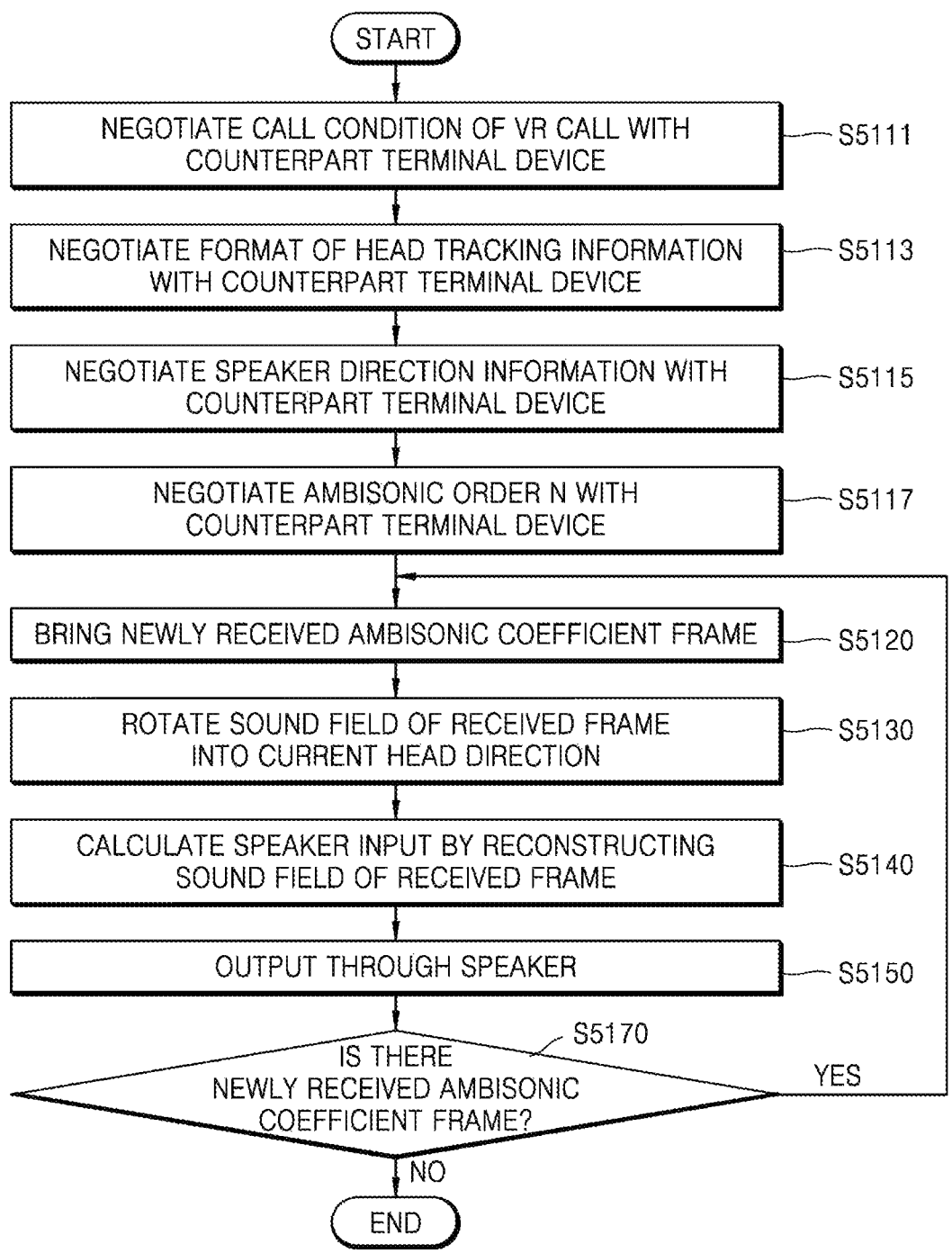
FIG. 51 is a flowchart of a method performed by a terminal device at the side of an HMD to output an audio signal received from a counterpart terminal device, according to an embodiment.

FIG. 51 is a detailed flowchart of a method performed by a terminal device at the side of an HMD to output an audio signal received from a counterpart terminal device, according to an embodiment.

The terminal device according to an embodiment may negotiate a call condition when a virtual reality call with the counterpart terminal device is started (S5111). The terminal device may determine a format of head direction information in the operation of negotiating the call condition (S5113). The terminal device may negotiate speaker direction information with the counterpart terminal device in the operation of negotiating the call condition (S5115). For example, the terminal device may transmit information about a direction of a speaker included in the terminal device to the counterpart terminal device. The terminal device may negotiate the order N of ambisonic coefficients with the counterpart terminal device in the operation of negotiating the call condition (S5117). The terminal device may receive information about the order N of the ambisonic coefficients to be received from the counterpart terminal device.

The terminal device according to an embodiment may obtain an ambisonic coefficient frame newly received from the counterpart terminal device (S5120).

The terminal device according to an embodiment may rotate a sound field of the received frame to a current head direction (S5130). The terminal device according to an embodiment may determine information about a head direction of a user of the terminal device. The terminal device may sense the head direction of the user and convert a sensed result into a predetermined number of bits. The terminal device may convert a current head direction measured by an orientation sensor into a limited number of bits based on information about the maximum number of available bits which may be used to indicate a head direction, an arrangement of microphones, a channel adjusting unit, etc.

The terminal device may sense a head direction corresponding to an angle parameter determined to indicate the information about the head direction in the operation of negotiating the call condition. The terminal device may convert a sensed result into a number of bits allocated to the angle parameter in the operation of negotiating the call condition.

The terminal device may rotate the sound field in a space by rotating a matrix including direction information of ambisonic coefficients indicating the sound field of the received frame.

The terminal device according to an embodiment may calculate an input signal input into at least one speaker included in the terminal device, by reconstructing the sound field of the received frame (S5140). The terminal device may output audio signals corrected based on the head direction information through the speaker (S5150). The terminal device may repeat operations S5120 through S5150 when there is a newly received ambisonic coefficient frame, and may end the call when there is no newly received ambisonic coefficient (S5170).

The immersive multimedia communication system according to an embodiment may construct audio channels by taking into account ambient sound environment of a camera, characteristics of human hearing, etc., in order to optimize the call quality while using limited bit rates. The immersive multimedia communication system according to an embodiment may determine at least one of the number of audio channels, a bit rate allocated to each audio channel, an angular difference between the audio channels, and a maximum bandwidth which may be used. The terminal device at the side of the camera according to an embodiment may negotiate a call condition with the terminal device at the side of an HMD through a network, by using the determined audio channel information. Also, the terminal device at the side of the camera according to an embodiment may dynamically select a compression method of audio signals based on a head direction of a user of the HMD and may apply the selected method to the compression of the audio signals.

The immersive multimedia system according to an embodiment may manage interconnection between the camera, the HMD, and the terminal devices to maximize the call quality, minimize the call negotiation time, and minimize the expense of calling. The immersive multimedia system according to an embodiment may output a more realistic sound in an interest direction of the user by taking into account a change in hearing characteristics according to a change in the eye sight of the user of the HMD. Thus, the call quality may be maximized. The immersive multimedia system according to an embodiment may prepare call condition negotiation by starting to search for ambient sound environment, when the camera is turned on. Thus, the call condition time may be minimized. Also, the immersive multimedia system according to an embodiment may not use a large number of audio channels and large bit rates beyond necessity. Thus, the frequency sources may be spared and the expense of calling may be minimized.

Meanwhile, the embodiments described in detail may be written as programs which may be executed by a computer and realized by a general-purpose digital computer operating the program by using a computer-readable medium. Also, the structures of the data used in the embodiments described in detail may be recorded in the computer-readable medium by using various means. Also, the embodiments described in detail may be realized as a recording medium including instructions executable by a computer, such as a program module executed by a computer. For example, methods realized as a software module or an algorithm are codes or program commands readable and executable by a computer and may be recorded in the computer-readable recording medium.

The computer-readable medium may be an arbitrary recording medium which may be accessed by a computer and may include volatile and nonvolatile mediums and separable and non-separable mediums. The computer-readable medium may include storage mediums, such as magnetic recording mediums, for example, ROM, a floppy disc, a hard disc, etc., and optical reading mediums, for example, CD-ROM, DVD, etc., but is not limited thereto. Also, the computer-readable medium may include a computer recording medium and a communication medium.

Also, a plurality of computer-readable recording mediums may be distributed in computer systems connected through a network, and data stored in the distributed recording mediums, for example, program instructions and codes, may be executed by at least one computer.

Specific executions described in the disclosure are described only according to an embodiment, and by no means limit the scope of the disclosure. For brevity of the specification, descriptions of electronic components, control systems, software, and other functional aspects of the systems according to the related art may not be given.

The invention claimed is:

1. A method of transmitting, by a terminal device, an audio signal to a counterpart terminal device, the method comprising:
   receiving, by the terminal device, a packet from the counterpart terminal device, and extracting, by the terminal device, head tracking information of a user of the counterpart terminal device from the received packet;
   predicting, by the terminal device, a head direction of the user of the counterpart terminal device after a predetermined time period, based on the extracted head tracking information;
   generating, by the terminal device, audio output signals by combining audio input signals received via a plurality of microphones comprised in the terminal device, based on the predicted head direction of the user of the counterpart terminal device; and
   transmitting, by the terminal device, information about the predicted head direction of the user of the counterpart terminal device and a sound frame in which the audio output signals are compressed, to the counterpart terminal device.

2. The method of claim 1, further comprising
   determining a format in which information about the head direction of the user of the counterpart terminal device is to be transmitted and received to and from the counterpart terminal device.

3. The method of claim 2, wherein the determining of the format of the information about the head direction of the user of the counterpart terminal device comprises:
   receiving information about the maximum number of available bits from the counterpart terminal device; and
   transmitting information about an angle parameter and the number of bits allocated to the angle parameter, by taking into account the maximum number of available bits, wherein the angle parameter is to indicate the information about the head direction.

4. The method of claim 1, wherein the head tracking information comprises a coordinate of a block in which a gaze cursor indicating a direction of a gaze of the user of the counterpart terminal device is located, from among blocks that have identical sizes and divide an image to be transmitted to the counterpart terminal device.

5. The method of claim 1, wherein the predicting of the head direction comprises calculating the head direction after the predetermined time period, by using the extracted head tracking information and head tracking information extracted from packets previously received from the counterpart terminal device.

6. The method of claim 5, wherein the predicting of the head direction comprises converting the calculated head direction into a predetermined number of bits.

7. The method of claim 1, wherein the generating of the audio output signals comprises:
   determining directions of audio channels corresponding to the predicted head direction; and
   generating the audio output signals corresponding to the determined directions of the audio channels, by combining the audio input signals.

8. The method of claim 7, wherein the generating of the audio output signals comprises adjusting a gain of the audio output signals corresponding to at least one channel from among the audio channels, by taking into account the predicted head direction.

9. The method of claim 7, wherein the generating of the audio output signals comprises:
   determining whether to compress the audio output signals corresponding to each audio channel in a voice mode or in an audio mode;
   increasing a gain corresponding to the audio channel in which the audio output signals are compressed in the voice mode; and
   compressing the audio output signals corresponding to each audio channel based on the determined mode.

10. The method of claim 1, wherein the generating of the audio output signals comprises:
    processing ambisonic coefficients converted from the audio input signals, based on the predicted head direction; and
    compressing the processed ambisonic coefficients to generate the audio output signals.

11. The method of claim 10, wherein the processing of the ambisonic coefficients comprises:
    shaping a sound field by applying a three-dimensional plane in which a gain of the predicted head direction is greater than gains of other directions to a sound field represented by the audio input signals; and
    obtaining the processed ambisonic coefficients representing the shaped sound field.

12. The method of claim 10, further comprising:
    receiving, from the counterpart terminal device, information about a direction of at least one speaker included in the counterpart terminal device; and
    determining an order N of the ambisonic coefficients to be transmitted to the counterpart terminal device,
    wherein the generating of the audio output signals comprises
    generating the audio output signals by further taking into account the information about the direction of the at least one speaker and the order N.

13. The method of claim 12, wherein the processing of the ambisonic coefficients comprises:
    shaping a sound field by applying a three-dimensional plane in which a gain of the direction of the at least one speaker is greater than gains of other directions to the sound field represented by the audio input signals; and
    obtaining the processed ambisonic coefficients representing the shaped sound field.

14. The method of claim 12, wherein the generating of the audio output signals further comprises,
    based on at least one of the predicted head direction, the information about the direction of the at least one speaker, and the order N, determining at least one of a bit rate, a bandwidth, and whether to apply DTX for compressing the ambisonic coefficients.

15. The method of claim 1, further comprising,
    based on the extracted head tracking information, displaying the head direction of the user of the counterpart terminal device, on a display of a camera.

16. A terminal device for performing a call function with a counterpart terminal device, the terminal device comprising:
    a communicator;

a plurality of microphones;

at least one processor configured to control the communicator to receive a packet from the counterpart terminal device, generate audio output signals by extracting head tracking information of a user of the counterpart terminal device from the receive packet, predicting a head direction of the user of the counterpart terminal device after a predetermined time period, based on the extracted head tracking information, and combining audio input signals received via the plurality of microphones comprised in the terminal device, based on the predicted head direction of the user of the counterpart terminal device; and at least one camera configured to receive an image signal;

wherein the at least one processor is configured to control the communicator to transmit information about the predicted head direction of the user of the counterpart terminal device, a sound frame in which the audio output signals are compressed, and a video frame in which the image signal is compressed, to the counterpart terminal device.

17. A method of outputting, by a terminal device, an audio signal received from a counterpart terminal device, the method comprising:

receiving, by the terminal device, a packet from the counterpart terminal device;

extracting, by the terminal device, head tracking information of a user of the terminal device and a sound frame from the received packet;

determining, by the terminal device, information about a head direction of the user of the terminal device;

correcting, by the terminal device, audio signals included in the sound frame, based on a result of comparing the extracted head tracking information with the determined information about the head direction;

outputting, by the terminal device, the corrected audio signals; and transmitting, by the terminal device, the determined information about the head direction of the user of the terminal device to the counterpart terminal device.

18. The method of claim 17, further comprising determining a format in which the information about the head direction of the user of the terminal device is to be transmitted and received to and from the counterpart terminal device.

19. The method of claim 18, wherein the determining of the format of the information about the head direction of the user of the terminal device comprises:

transmitting information about the maximum number of available bits to the counterpart terminal device; and receiving, from the counterpart terminal device, information about an angle parameter and the number of bits allocated to the angle parameter, the information being determined by taking into account the maximum number of available bits, wherein the angle parameter is to indicate the information about the head direction.

20. The method of claim 17, wherein, in the determining of the format of the information about the head direction of the user of the terminal device, the information about the head direction comprises a coordinate of a block in which a gaze cursor indicating a direction of a gaze of the user of the terminal device is located, from among blocks that have identical sizes and divide an image received from the counterpart terminal device.

* * * * *